US011912575B2

(12) United States Patent
Fedorov et al.

(10) Patent No.: US 11,912,575 B2
(45) Date of Patent: Feb. 27, 2024

(54) REACTOR FOR STEAM REFORMING AND METHODS OF USE THEREOF

(71) Applicant: Georgia Tech Research Corporation, Atlanta, GA (US)

(72) Inventors: Andrei G. Fedorov, Atlanta, GA (US); David M. Anderson, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 223 days.

(21) Appl. No.: 17/196,404

(22) Filed: Mar. 9, 2021

(65) Prior Publication Data

US 2021/0261408 A1 Aug. 26, 2021

Related U.S. Application Data

(62) Division of application No. 14/669,583, filed on Mar. 26, 2015, now Pat. No. 10,988,379.

(60) Provisional application No. 61/971,066, filed on Mar. 27, 2014.

(51) Int. Cl.
*C01B 3/38* (2006.01)

(52) U.S. Cl.
CPC ........ *C01B 3/38* (2013.01); *C01B 2203/0233* (2013.01); *C01B 2203/0261* (2013.01); *C01B 2203/041* (2013.01); *C01B 2203/0425* (2013.01); *C01B 2203/0475* (2013.01); *C01B 2203/085* (2013.01); *C01B 2203/1041* (2013.01); *C01B 2203/1058* (2013.01); *C01B 2203/1223* (2013.01); *C01B 2203/1235* (2013.01); *C01B 2203/1241* (2013.01)

(58) Field of Classification Search
CPC ....................................................... C01B 3/38
USPC ....................................................... 423/651
See application file for complete search history.

(56) References Cited

U.S. PATENT DOCUMENTS

| | | | |
|---|---|---|---|
| 6,099,621 A | 8/2000 | Ho | |
| 7,981,171 B2 | 7/2011 | Fedorov et al. | |
| 8,308,848 B1 * | 11/2012 | Alptekin | B01J 20/3204 423/244.02 |
| 8,911,519 B2 | 12/2014 | Niitsuma et al. | |
| 2002/0081235 A1 | 6/2002 | Baldwin et al. | |
| 2004/0048115 A1 | 3/2004 | Devos | |
| 2005/0023236 A1 | 2/2005 | Adams et al. | |
| 2005/0045034 A1 * | 3/2005 | Paglieri | B01D 53/22 96/10 |
| 2005/0074643 A1 | 4/2005 | Adams et al. | |
| 2005/0158595 A1 | 7/2005 | Marsh et al. | |
| 2007/0243127 A1 | 10/2007 | Fedorov et al. | |
| 2009/0324452 A1 | 12/2009 | Salinas et al. | |

(Continued)

OTHER PUBLICATIONS

Anderson DM, Kottke PA, Fedorov AG. Thermodynamic analysis of hydrogen production via sorption-enhanced steam methane reforming in a new class of variable volume batch-membrane reactor. Int J Hydrogen Energy. Oct. 22, 2014;39(31):17985-17997.

(Continued)

*Primary Examiner* — Douglas B Call
(74) *Attorney, Agent, or Firm* — Thomas & Horstemeyer, LLP

(57) ABSTRACT

The present disclosure provides compositions including method of producing $H_2$, variable volume reactors, methods of using variable volume reactors, and the like.

2 Claims, 22 Drawing Sheets

(56) References Cited

U.S. PATENT DOCUMENTS

2010/0260657 A1    10/2010    Niitsuma et al.
2011/0236303 A1    9/2011    Fedorov et al.

OTHER PUBLICATIONS

Anderson DM, Nasr MH, Yun TM, KOttke PA, Fedorov AG. Sorption-Enhanced Variable-volume Batch-Membrane Steam Methane Reforming at Low Temperature: Experimental Demonstration and Kinetic Modeling. Ind. Eng. Chem. Res. 2015, 54 (34), pp. 8422-8436.

Damm DL, Fedorov AG. Batch reactors for hydrogen production: Theoretical analysis and experimental characterization. Ind Eng Chem Res. 2009;48:5610-23.

Damm DL, Fedorov AG. Comparative assessment of batch reactors for scalable hydrogen production. Ind Eng Chem Res. Jul. 16, 2008;47(14):4665-4674.

Ding Y, Alpay E. Adsorption-enhanced steam-methane reforming. Chem Eng Sci. 2000;55:3929-40.

Ding Y, Alpay E. Equilibria and kinetics of CO2 adsorption on hydrotalcite adsorbent. Chem Eng Sci. 2000;55:3461-74.

Fayyaz, B, Harale A, Park B, Liu P, Sahimi M, Tsotsis TT. Design Aspects of Hybrid Adsorbent-Membrane Reactors for Hydrogen Production. Ind. Eng. Chem. Res. 2005, 44, 9398-9408.

Halabi MH, de Croon MHJM, van der Schaaf J, Cobden PD, Schouten JC. A novel catalyst-sorbent system for an efficient H2 production with in-situ CO2 capture. Int J Hydrogen Energy. 2012;37:4987-96.

Hufton JR, Mayorga S, Sircar S. Sorption-enhanced reaction process for hydrogen production. Aiche J. Feb. 1999;45(2):248-256.

Koumpouras GC, Alpay E, Lapkin A, Ding Y, Stepanek F. The effect of adsorbent characteristics on the performance of a continuous sorption-enhanced steam methane reforming process. Chemical Engineering Science 62 (2007) 5632-5637.

Lee KB, Beaver MG, Caram HS, Sircar S. Novel thermal-swing sorption-enhanced reaction process concept for hydrogen production by low-temperature steam-methane reforming. Ind Eng Chem Res. Jul. 1, 2007 2007;46(14):5003-5014.

Liu Z, Jun K, Hyun-Seog Roh, Sang-Eon P. Hydrogen Production for fuel Cells through Methane reforming at Low Temperatures. Journal of Power Sources 111(2002) 283-287.

Reijers HTJ, Valster-Schiermeier SEA, Cobden PD, van den Brink RW. Hydrotalcite as CO2 sorbent for sorption-enhanced steam reforming of methane. Ind Eng Chem Res. 2005;45:2522-30.

Shu J, Grandjean BPA, Kaliaguine S. Methane steam reforming in asymmetric Pd—Ag and Pd—Ag/porous SS membrane reactors. Appl Catal A-Gen. 1994;119:305-25.

Yun TM, Kottke PA, Anderson DM, Fedorov AG. Power Density Assessment of Variable Volume Batch Reactors for Hydrogen Production with Dynamically Modulated Liquid Fuel Introduction. Ind. Eng. Chem. Res. 2014, 53, 18140-18151.

Yun TM, Kottke PA, Anderson DM. Experimental investigation of hydrogen production by variable volume membrane batch reactors with modulated liquid fuel introduction. International Journal of Hydrogen Energy, 2015: 40:2601-2612.

\* cited by examiner

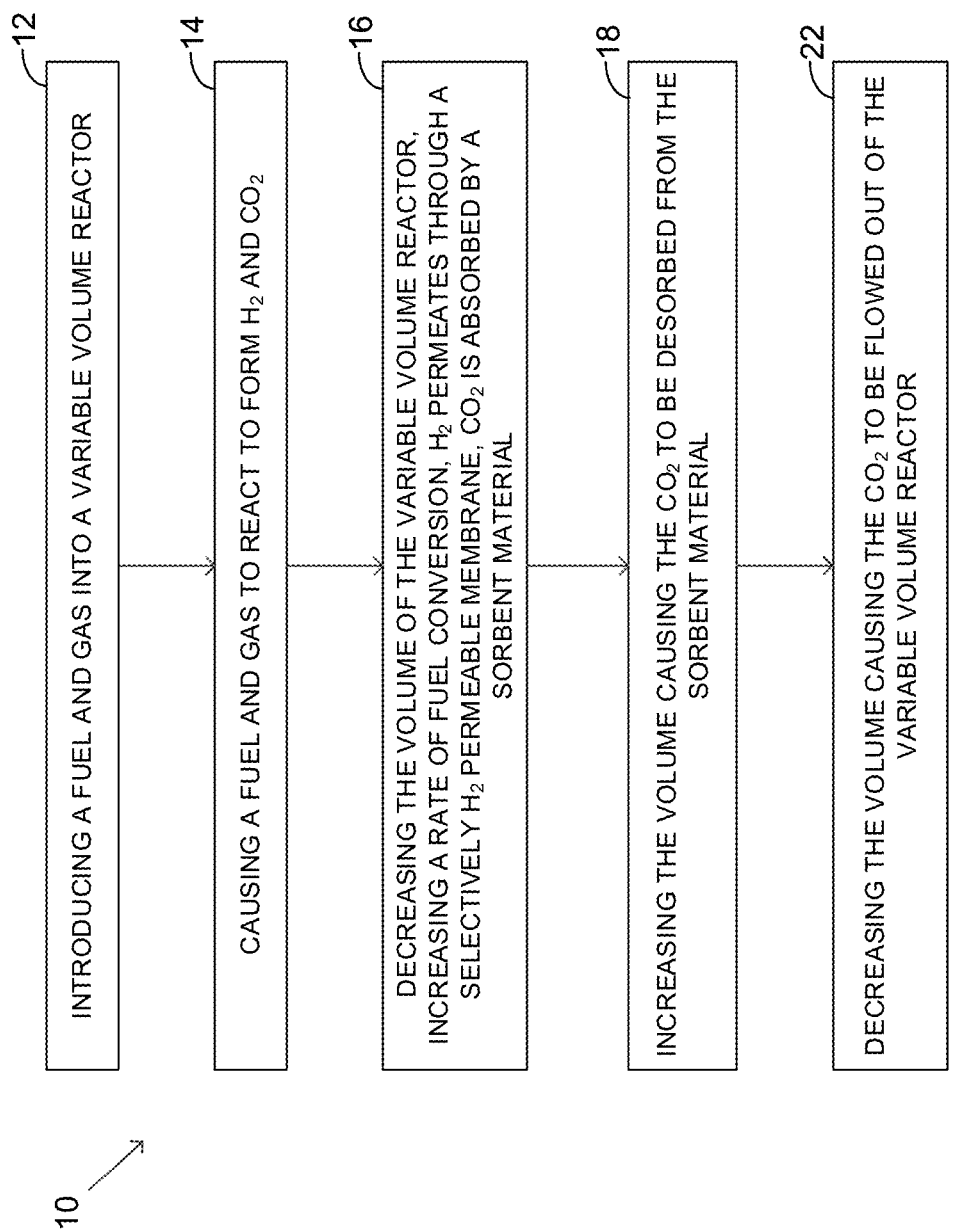
Fig. 1.1

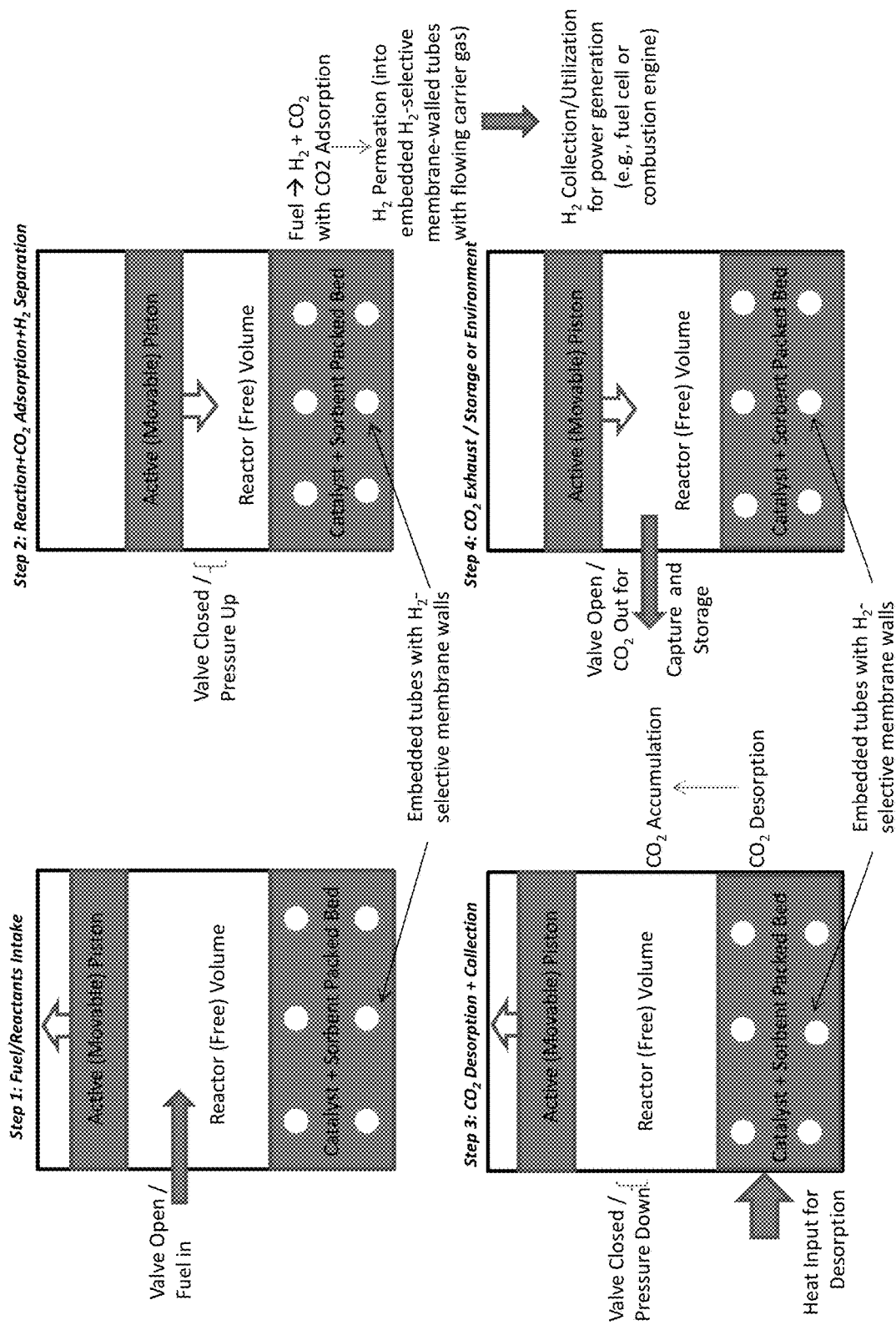
Fig. 1.2

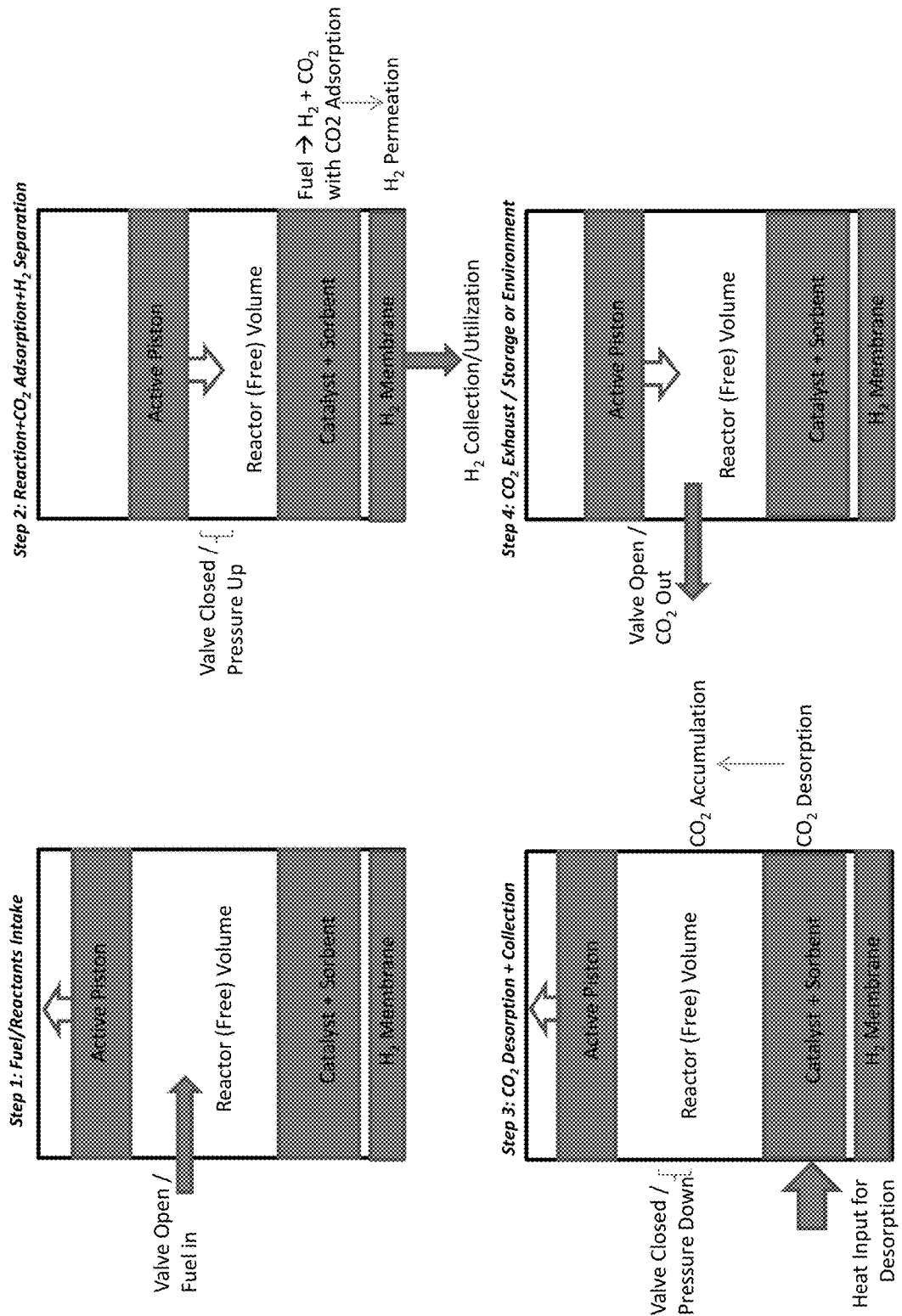
Fig. 1.3

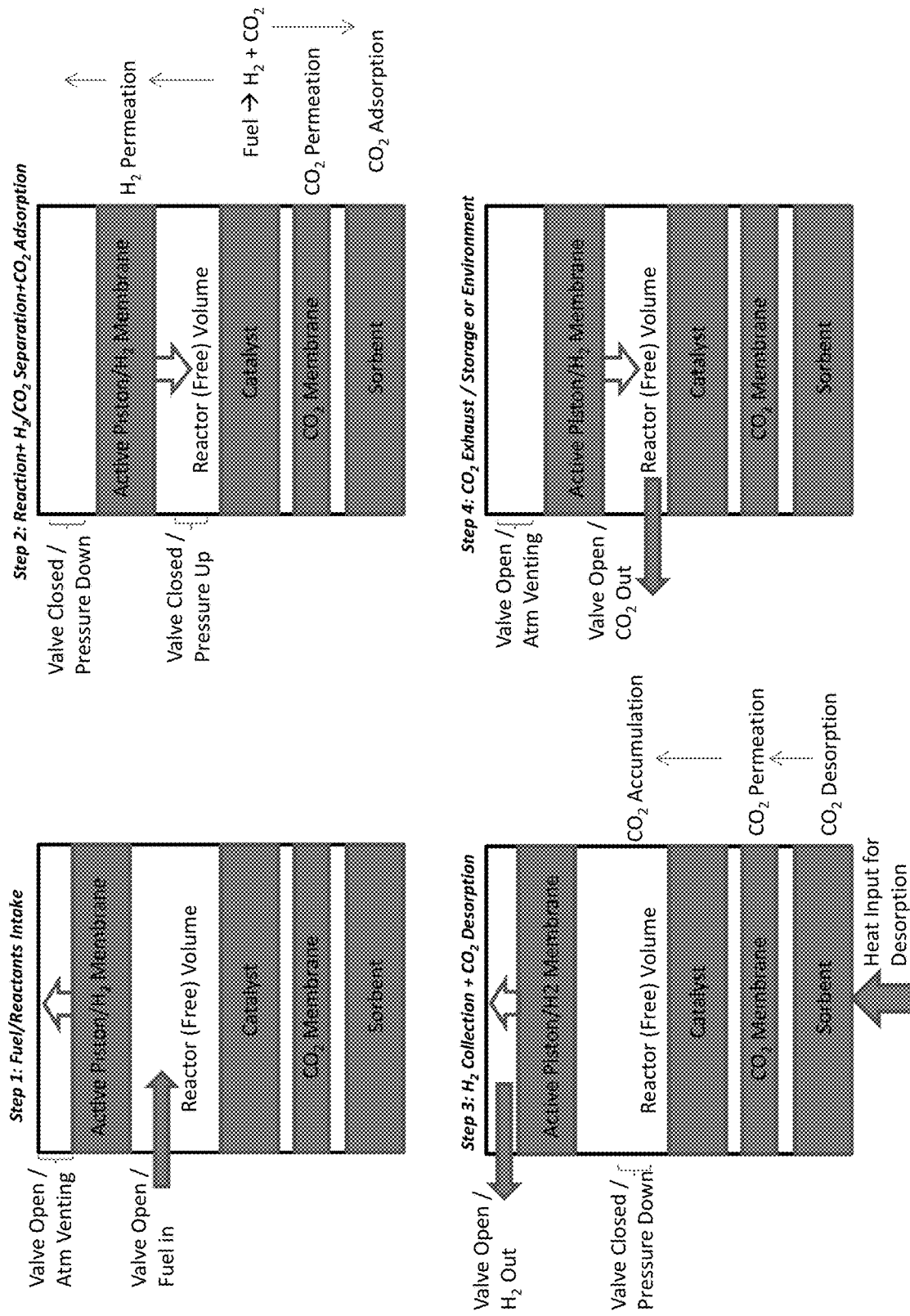
Fig. 1.4

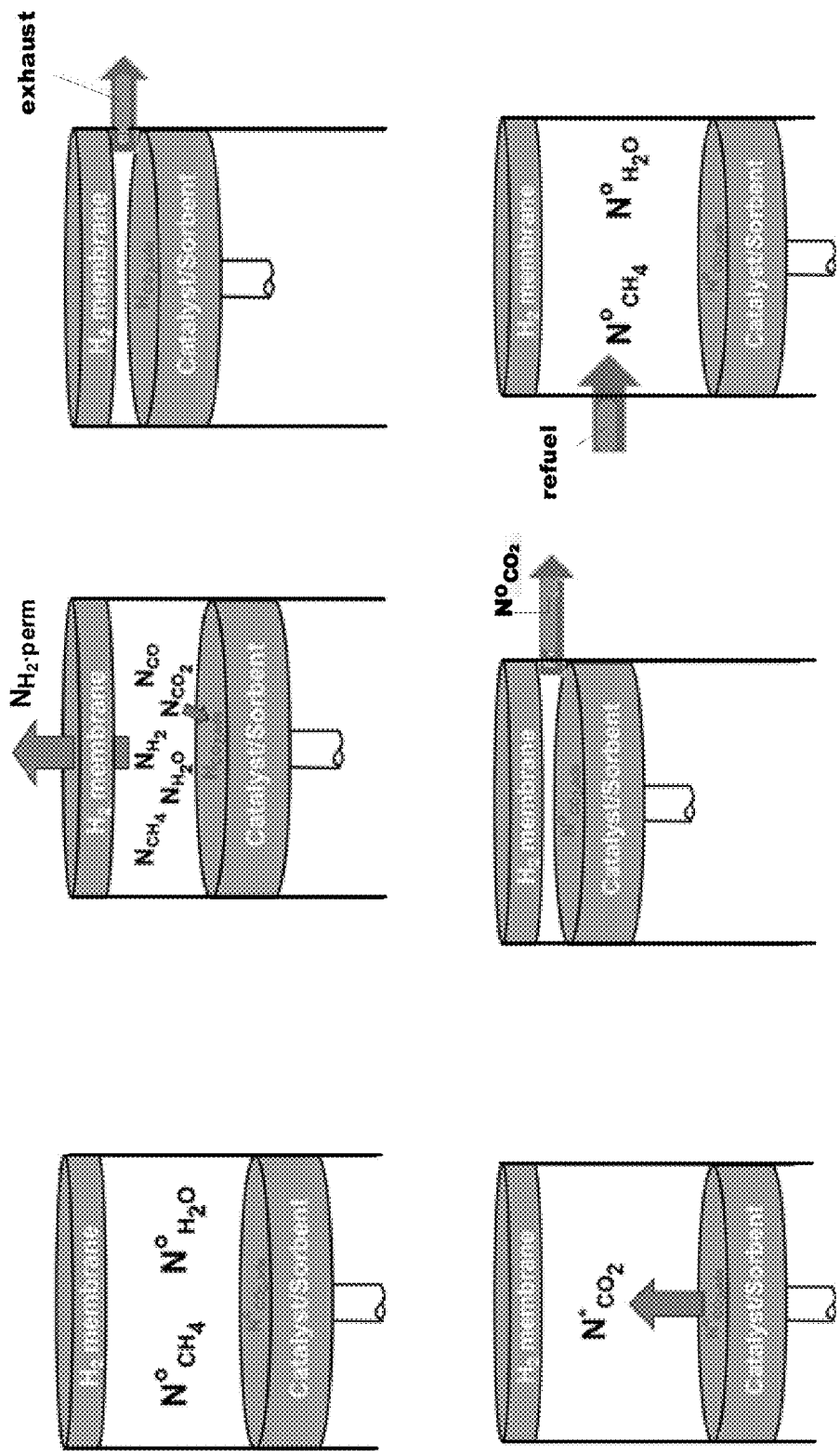
Fig. 1.5

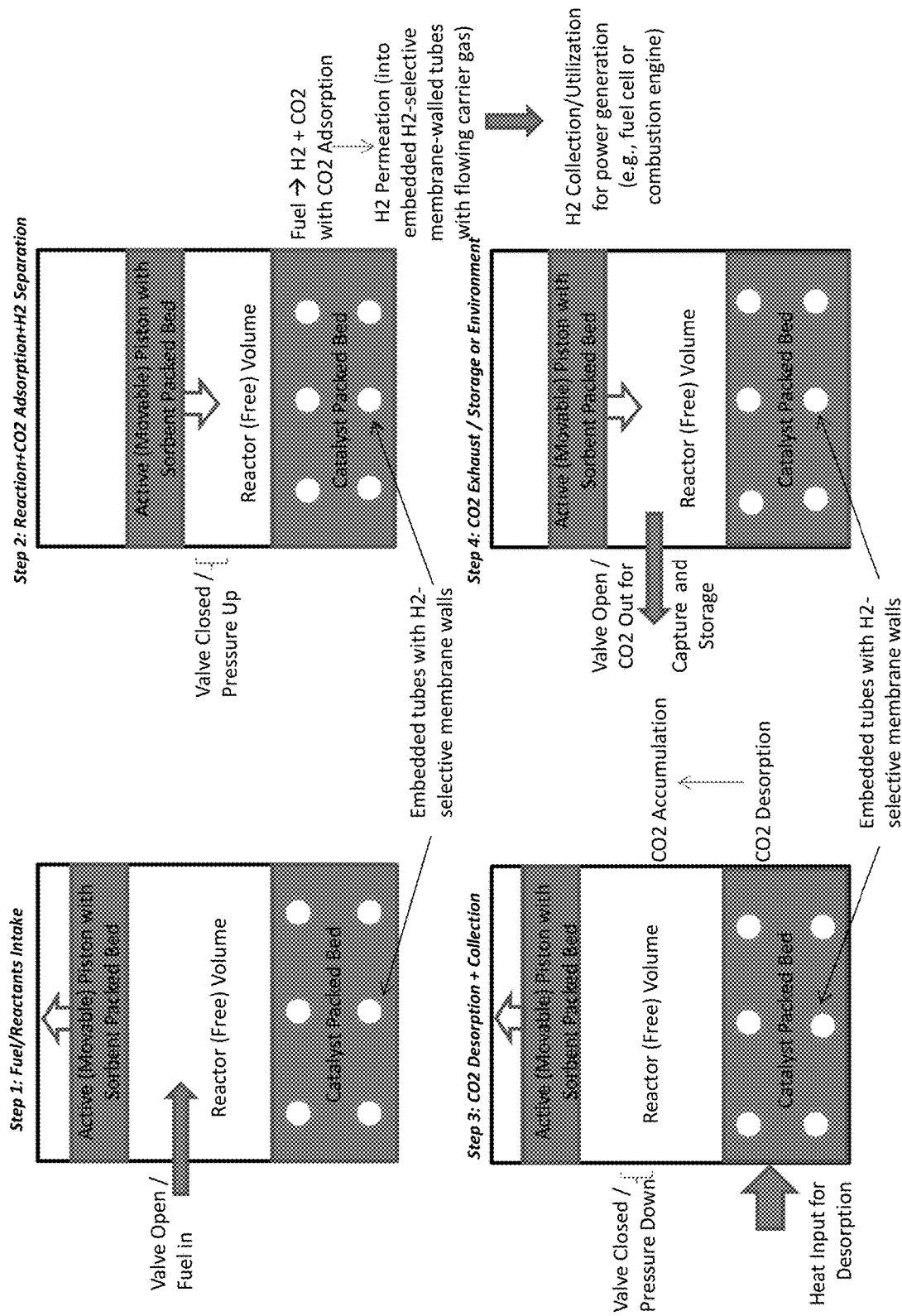
Fig. 1.6

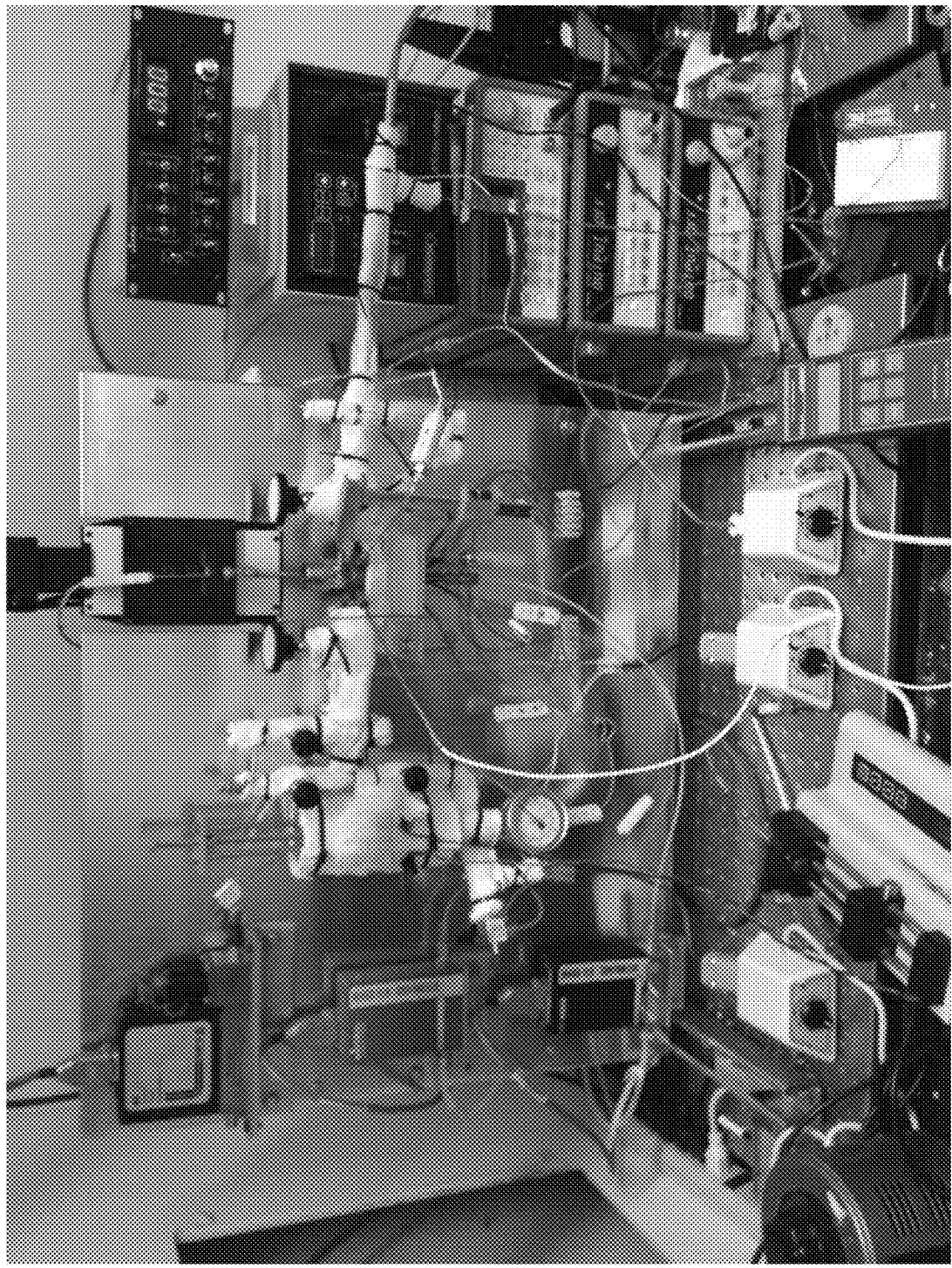
Fig. 1.7

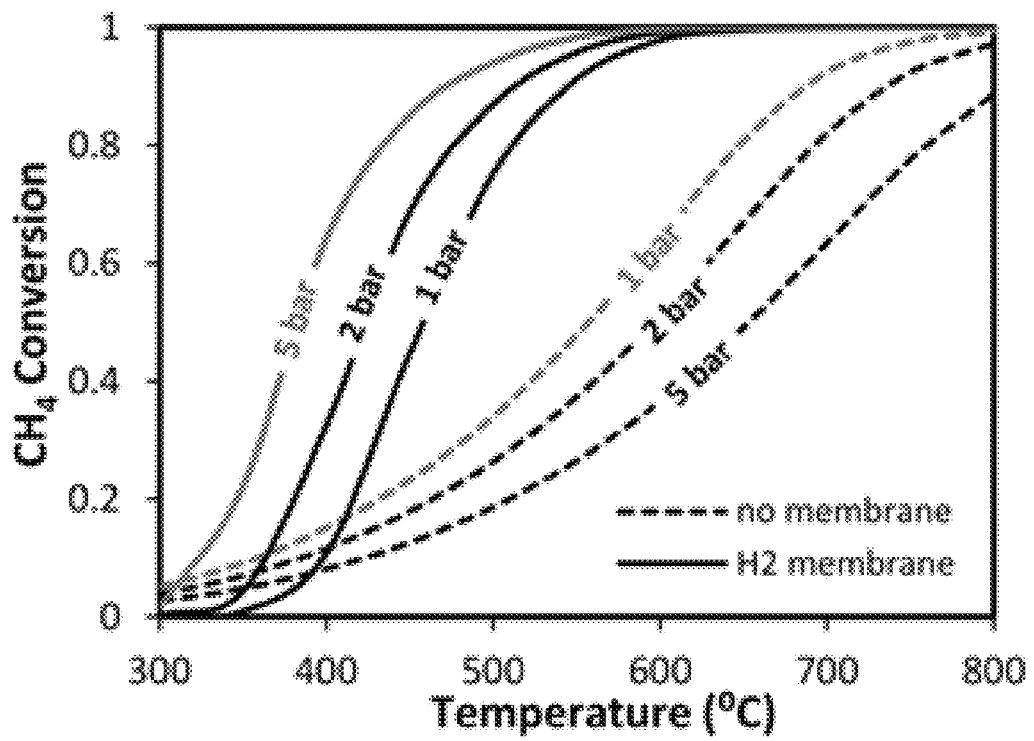
Fig. 2.1
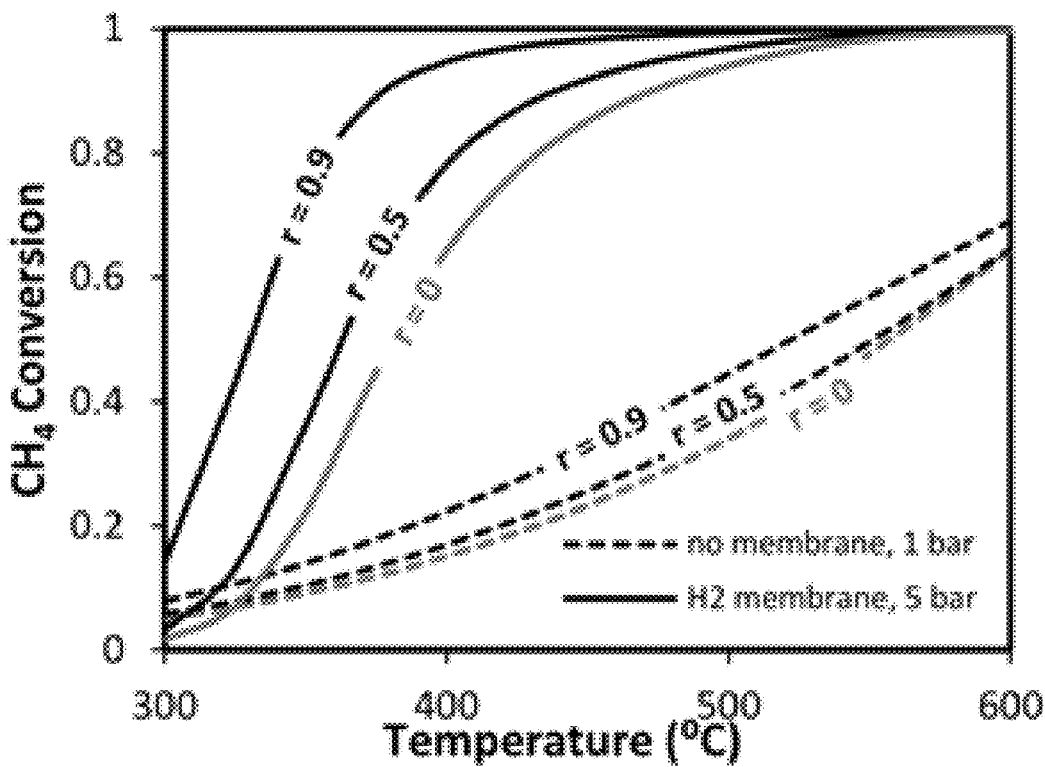
Fig. 2.2

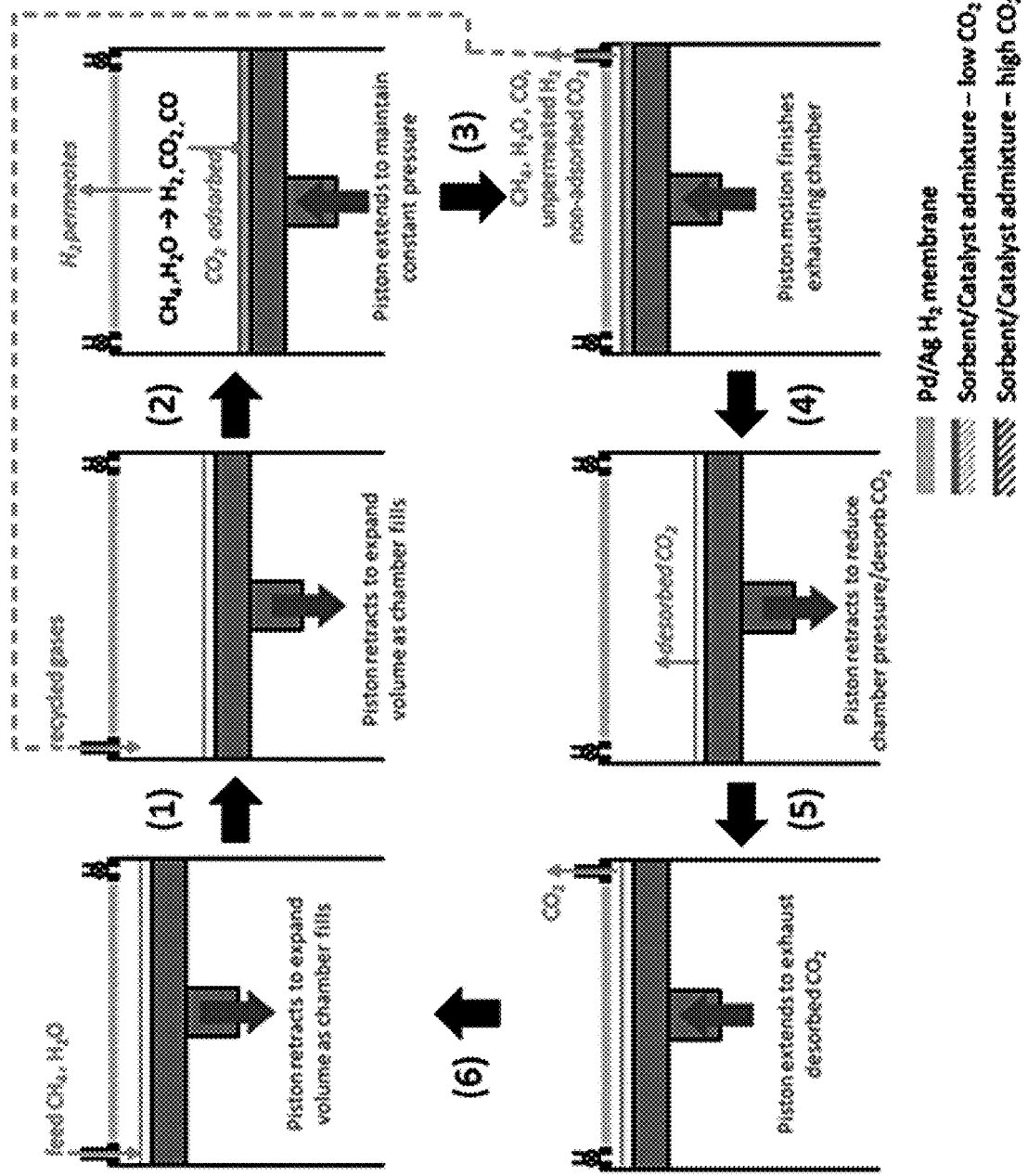
Fig. 2.3

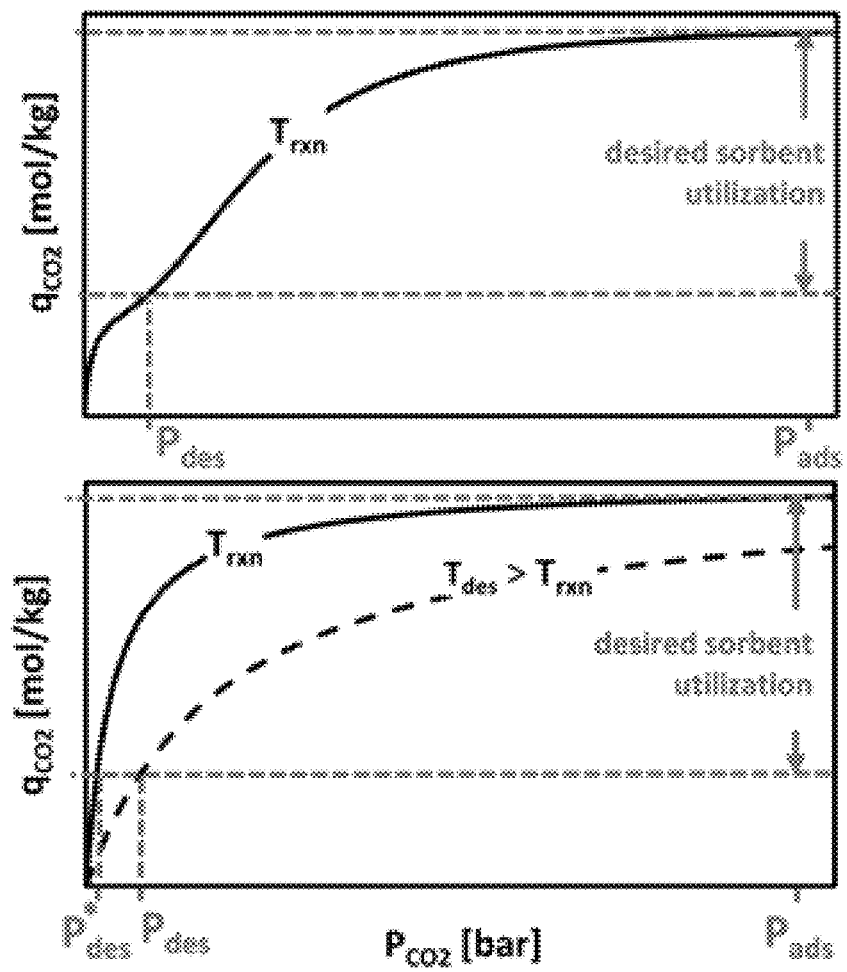
Fig. 2.4
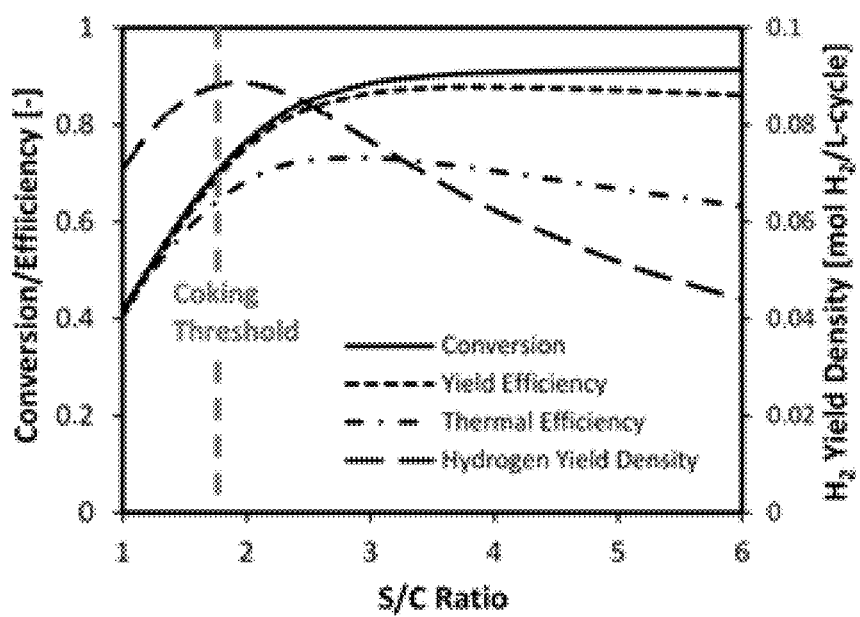
Fig. 2.5

Fig. 2.6A
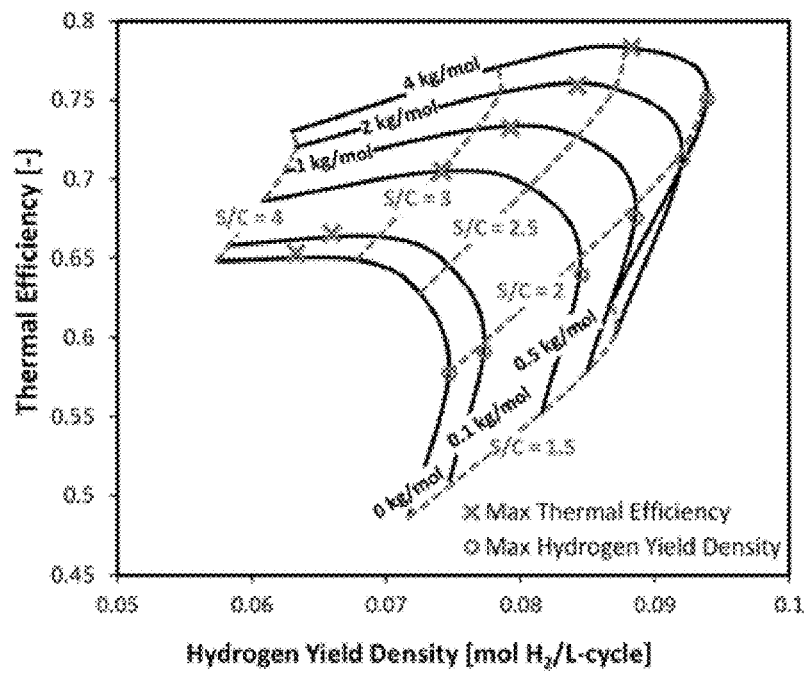
Fig. 2.6B
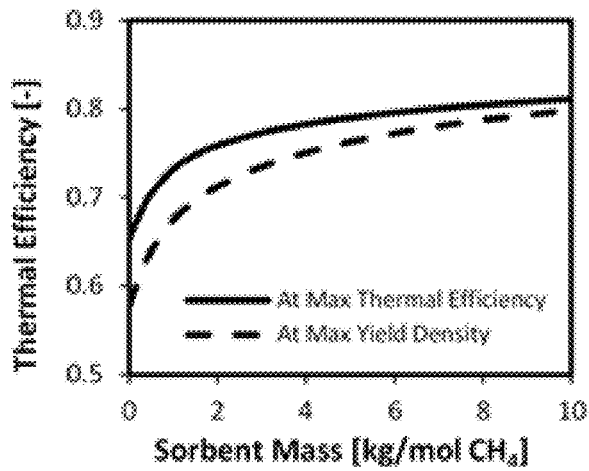
Fig. 2.6C
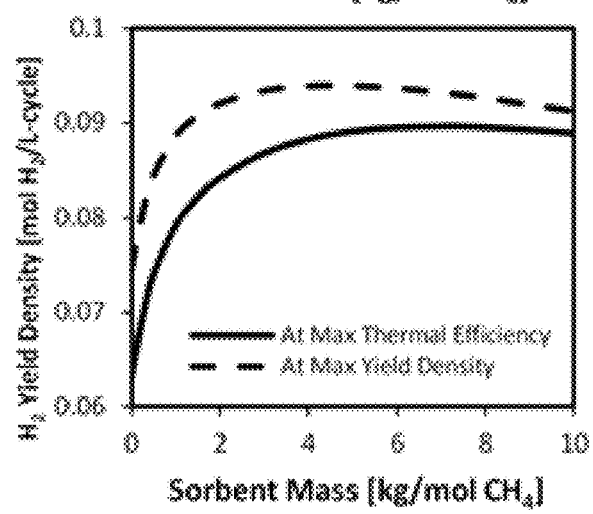

Fig. 2.7A
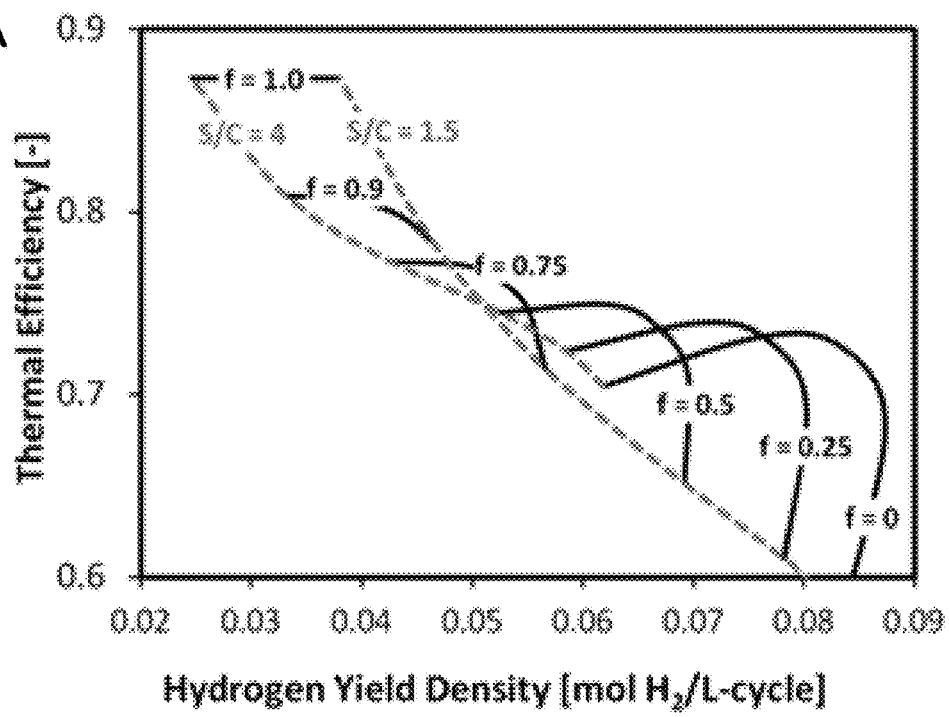
Fig. 2.7B
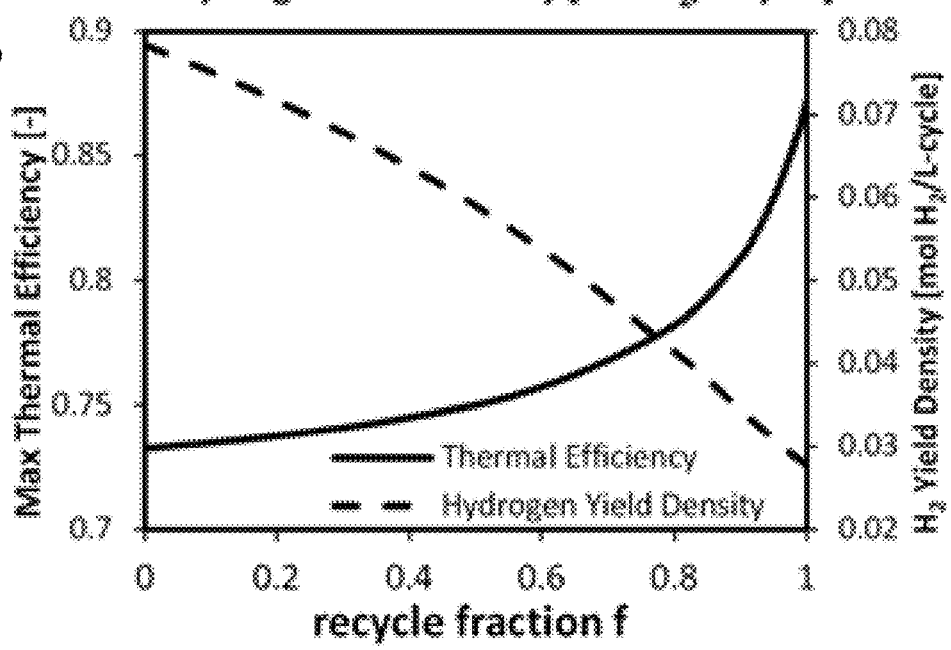

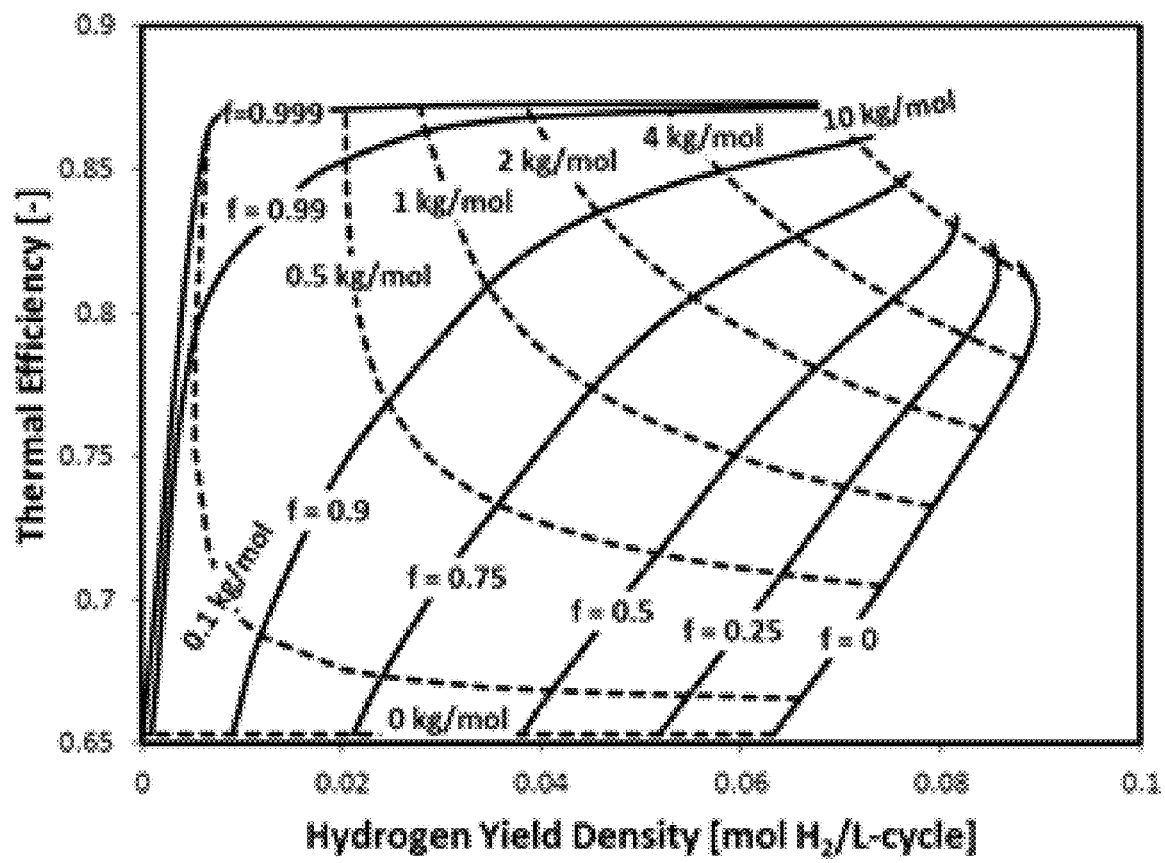
Fig. 2.8

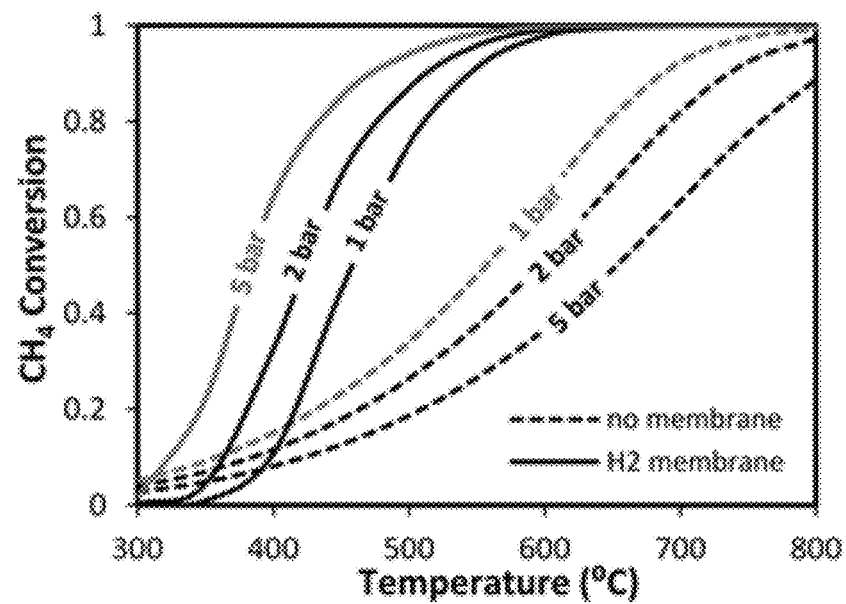
Fig. 3.1A
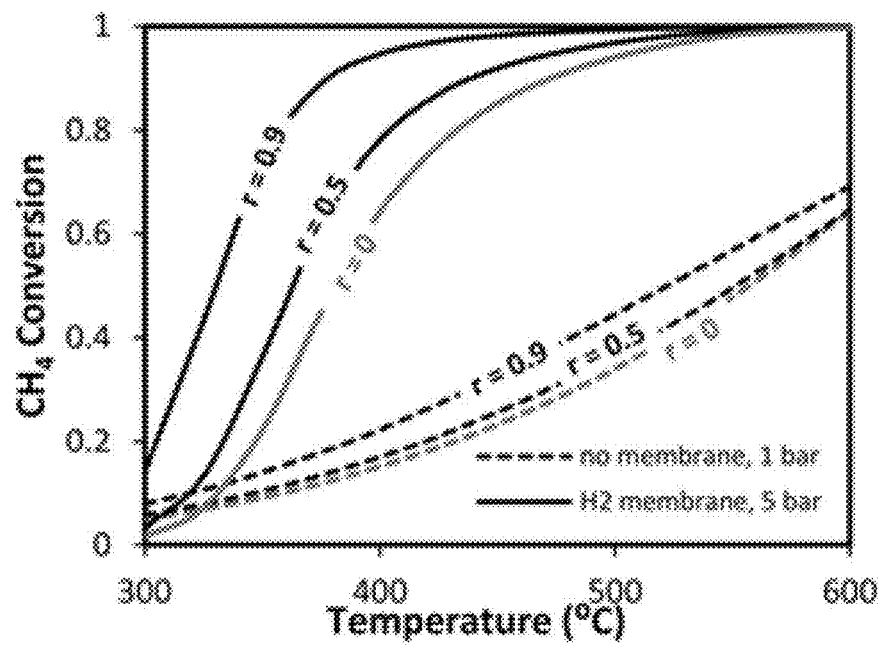
Fig. 3.1B

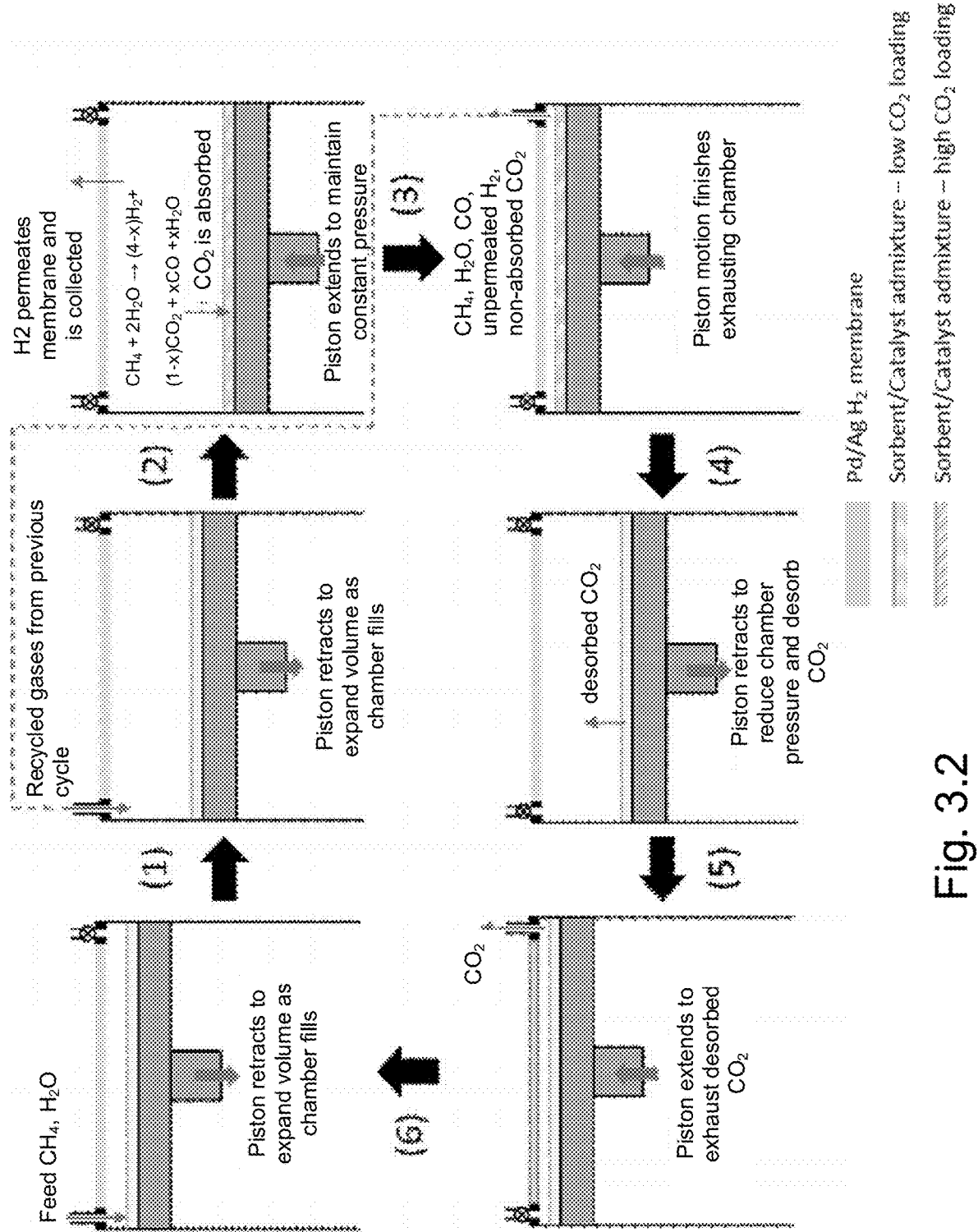
Fig. 3.2

Fig. 3.3A
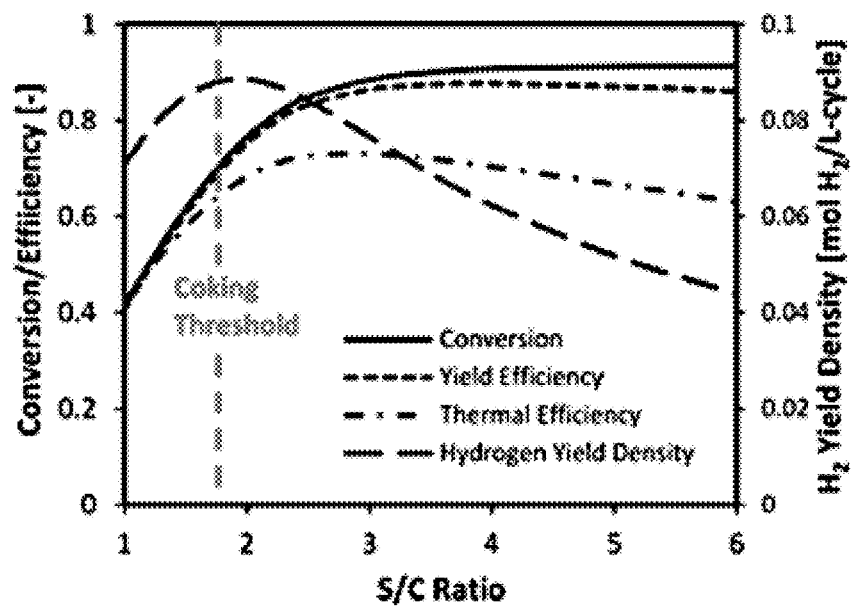
Fig. 3.3B
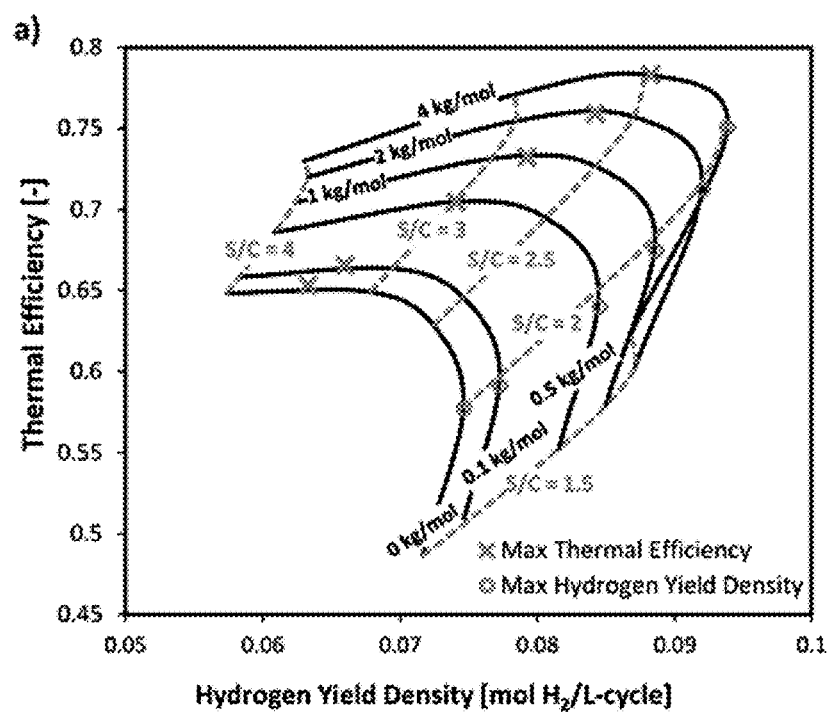

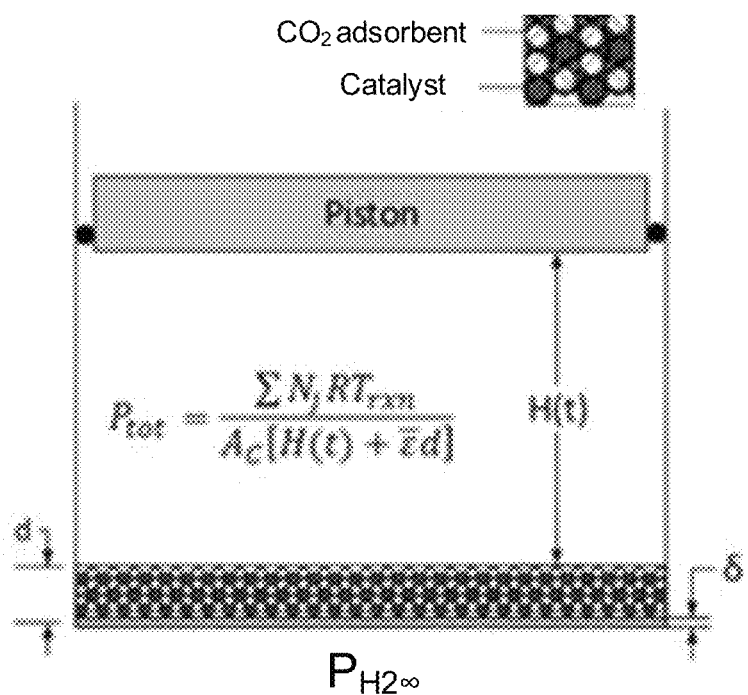
Fig. 3.4
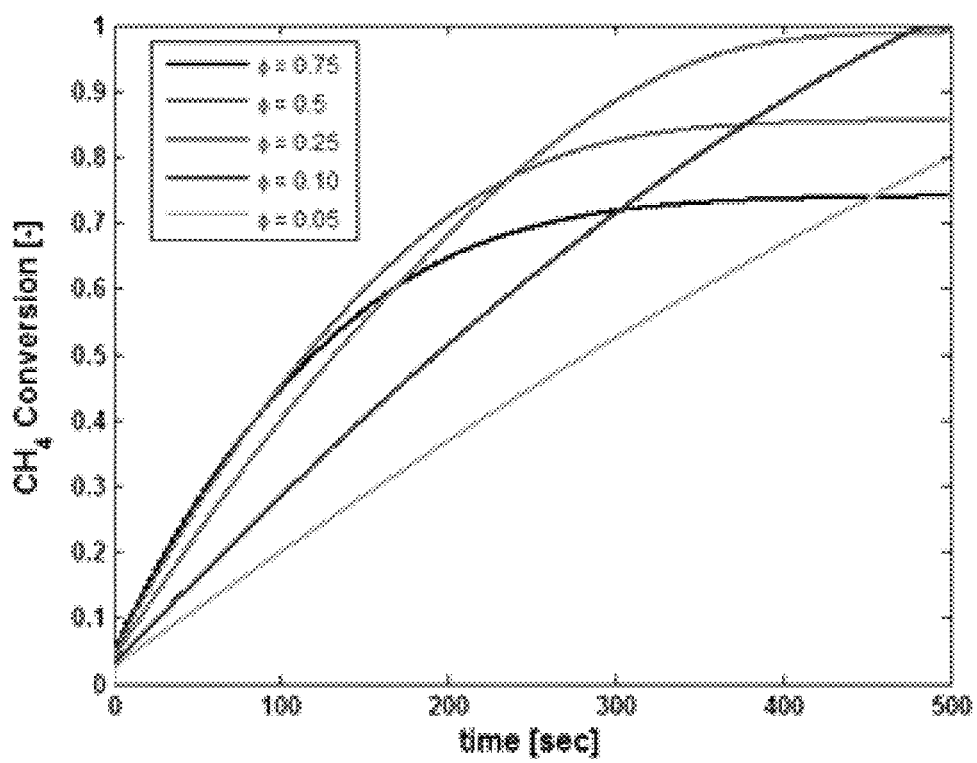
Fig. 3.5

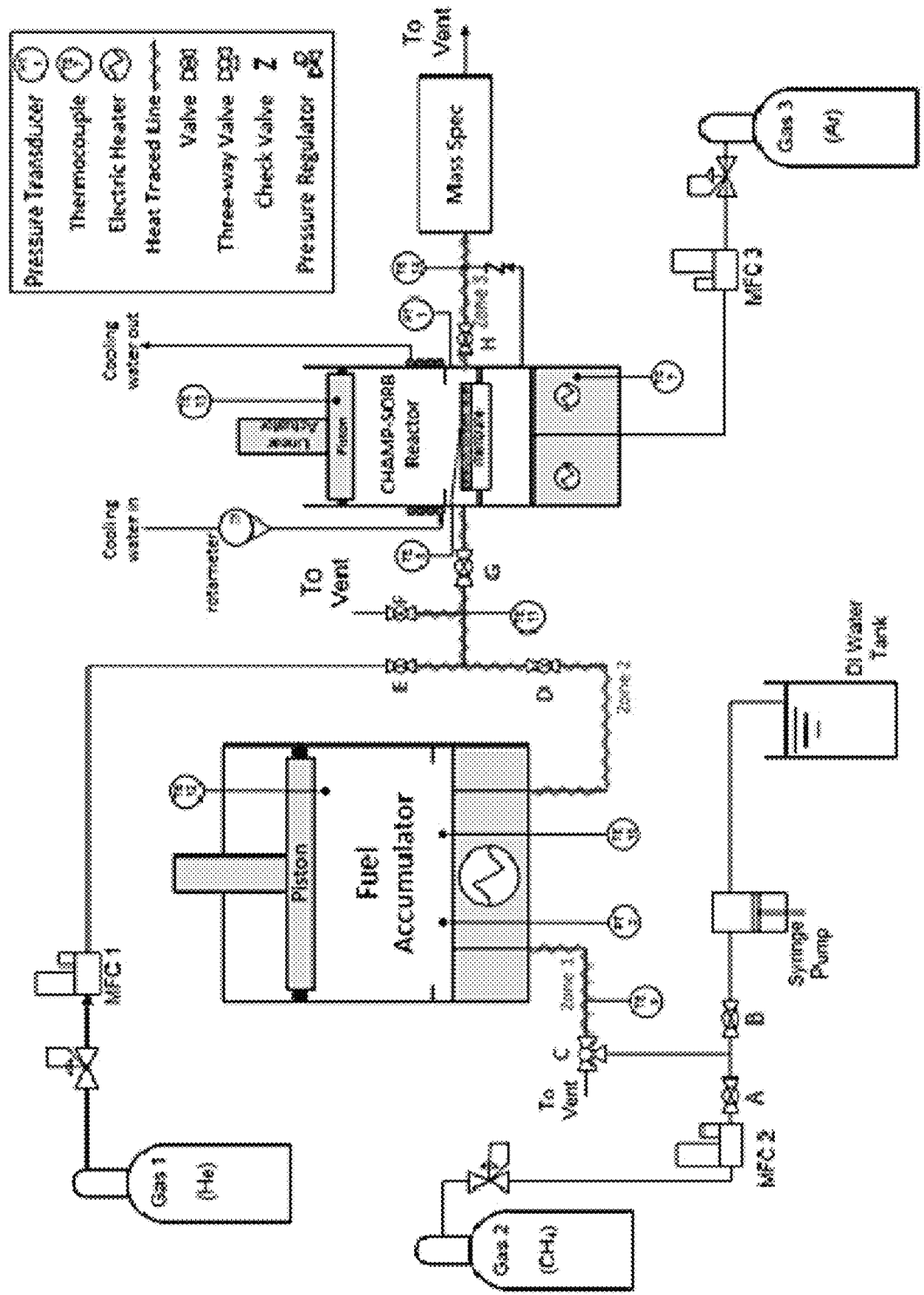
Fig. 3.6

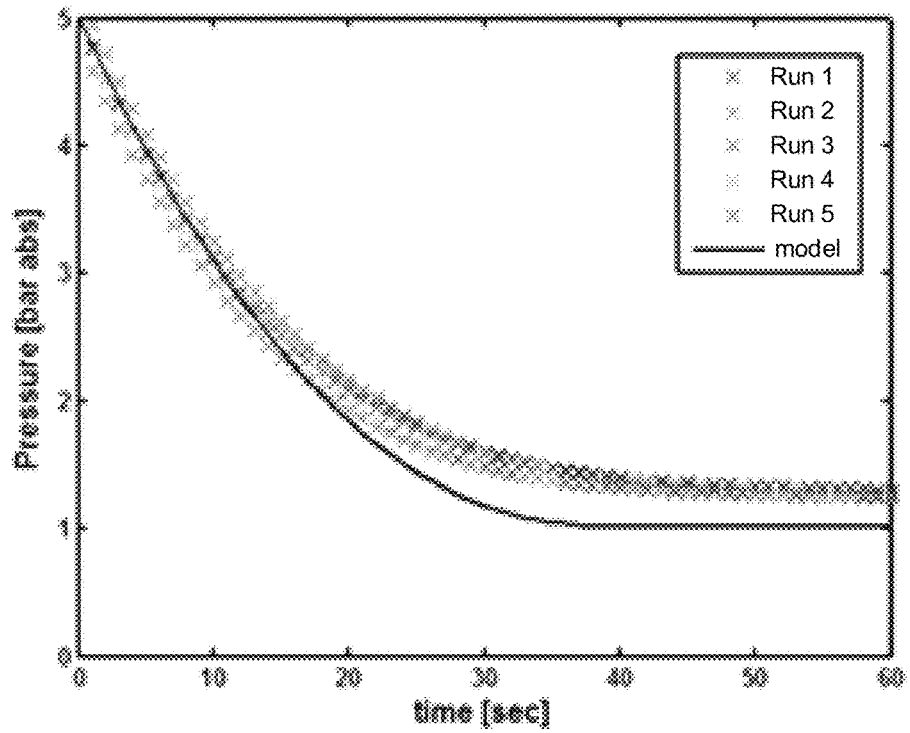
Fig. 3.7A
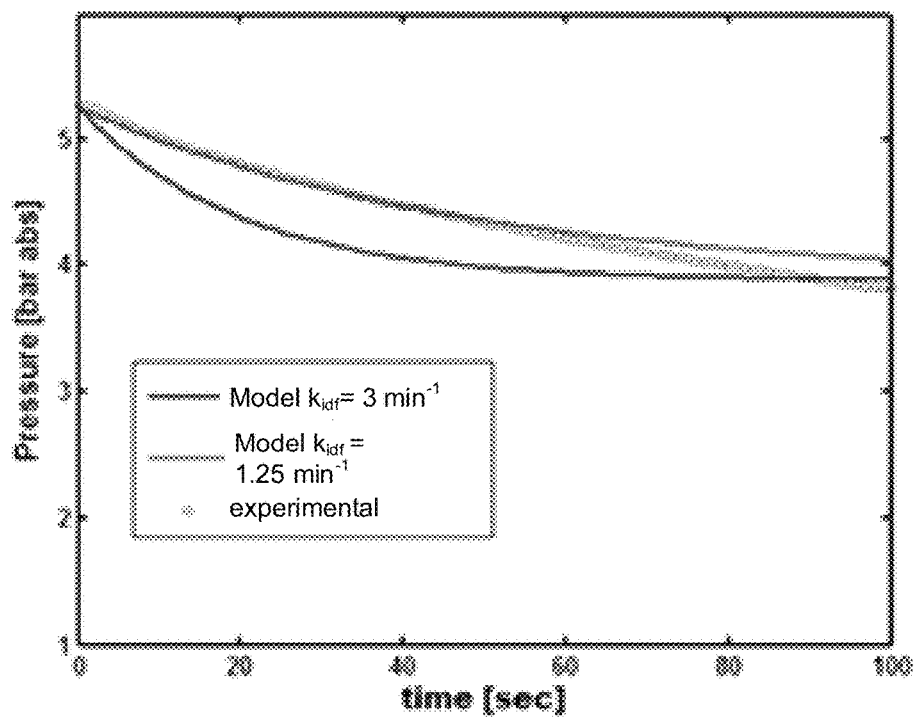
Fig. 3.7B

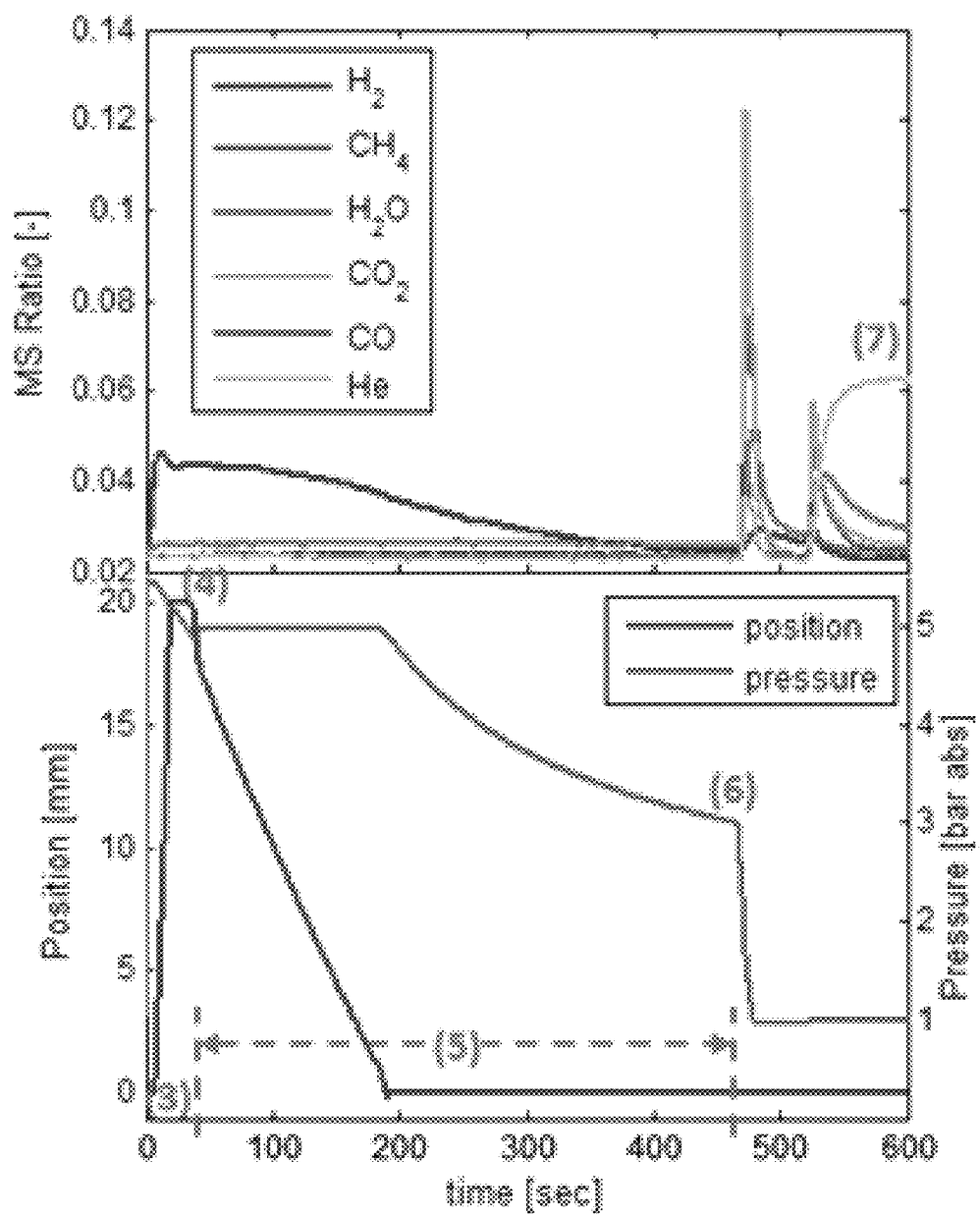
Fig. 3.8

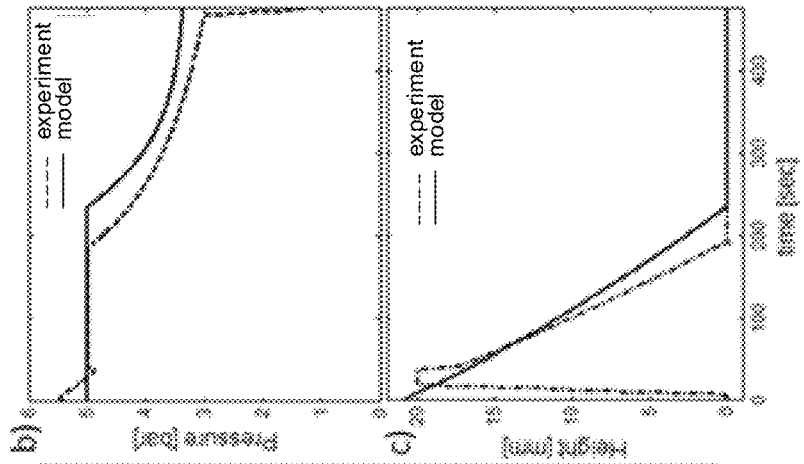
Fig. 3.9B
Fig. 3.9C
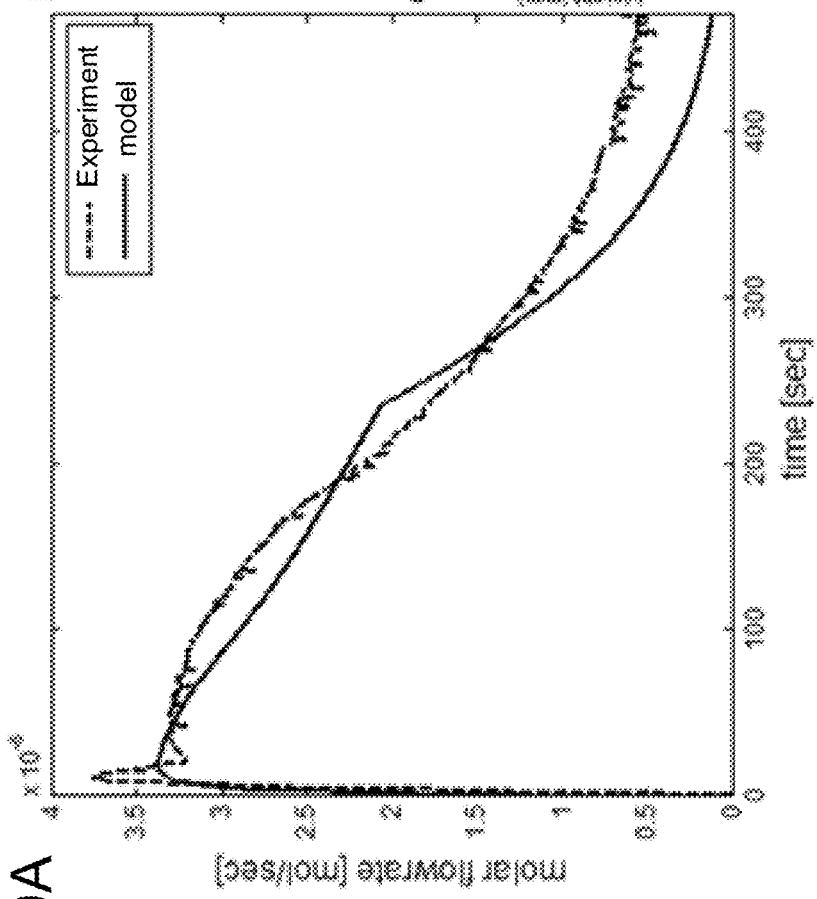
Fig. 3.9A

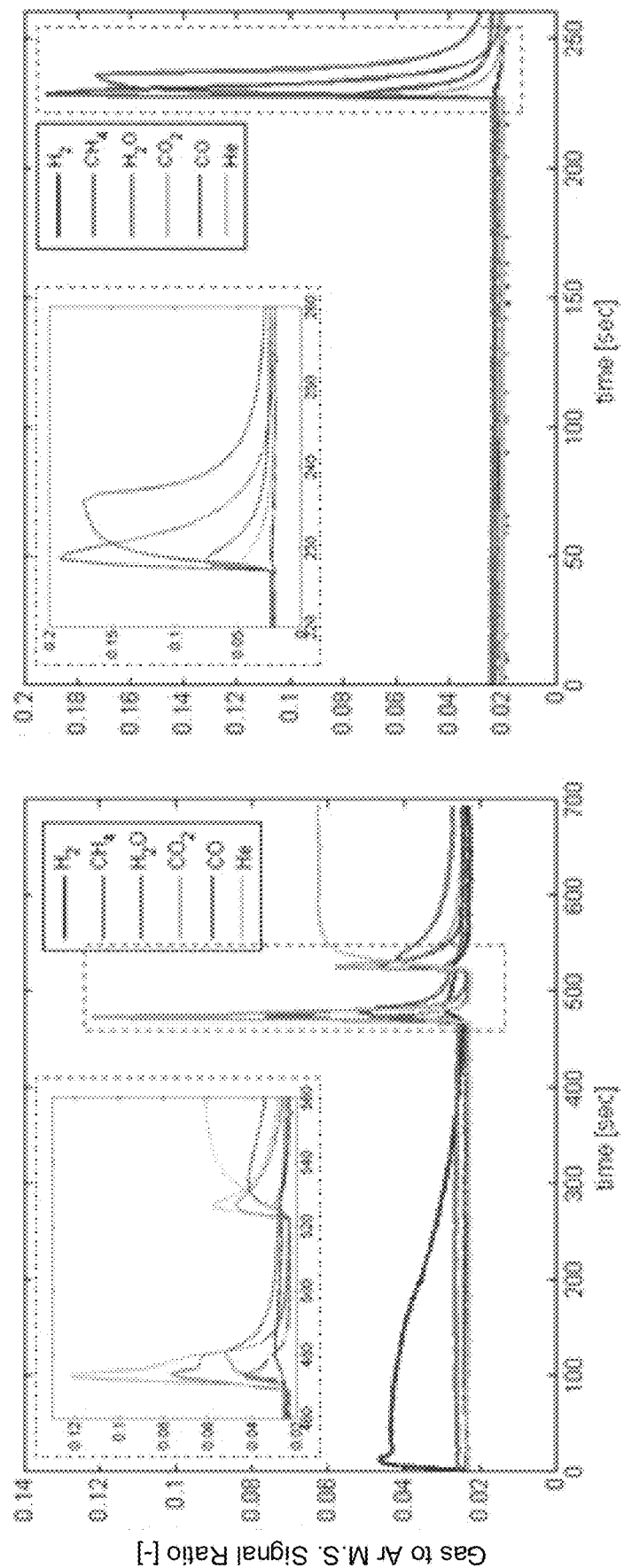
Fig. 3.10A
Fig. 3.10B

US 11,912,575 B2

1

REACTOR FOR STEAM REFORMING AND METHODS OF USE THEREOF

CLAIM OF PRIORITY TO RELATED APPLICATION

This application is a divisional application of co-pending U.S. Application entitled "REACTORS FOR FUEL REFORMING AND METHODS OF USE THEREOF", having Ser. No. 14/669,583, filed on Mar. 26, 2015, which claims priority to U.S. provisional application entitled "SORPTION-ENHANCED CHAMP REACTORS FOR DISTRIBUTED FUEL PROCESSING AND POWER GENERATION WITH INTEGRATED $CO_2$ CAPTURE" having Ser. No. 61/971,066, filed on Mar. 27, 2014, both of which are entirely incorporated herein by reference.

BACKGROUND

Natural gas has recently been touted as a bridge fuel to a low-carbon future because of its favorable hydrogen-to-carbon ratio and newly developed techniques to tap vast, previously inaccessible worldwide reserves. With its new-found abundance, additional methods of natural gas utilization are desirable, including approaches for efficient production of hydrogen in a small-scale, distributed fashion at the point of use. However, problems with technologies need to be overcome.

SUMMARY

The present disclosure provides compositions including method of producing $H_2$, variable volume reactors, methods of using variable volume reactors, and the like.

An embodiment of the present disclosure includes a method of generating $H_2$ in a variable volume reactor, among others, that includes a cycle with the following steps executed in sequence: a) introducing a hydrocarbon fuel and a gas at a ratio into the variable volume reactor; b) causing the fuel and gas to react with assistance of a catalyst to produce $H_2$ and $CO_2$ products; c) increasing a rate of fuel conversion reaction by actively decreasing a volume of the variable volume reactor, wherein $H_2$ permeates through a selectively $H_2$ permeable membrane and is removed from the variable volume reactor, wherein $CO_2$ is adsorbed by a sorbent material; d) increasing the volume of the variable volume reactor causing the $CO_2$ to be desorbed from the sorbent material by decreasing the partial pressure of $CO_2$; and e) decreasing the volume of the variable volume reactor causing the $CO_2$ to be flowed out of the variable volume reactor through a valve.

An embodiment of the present disclosure includes a reactor structure, among others, that includes: an active piston that changes a volume of a variable volume reactor; and a structure that includes at least one of: a catalyst, a sorbent material, and a $H_2$ permeable membrane, wherein the sorbent material is present in the reactor structure, wherein the volume is the space between the active piston and the structure, wherein the variable volume reactor is configured so that products, $CO_2$ and $H_2$, are formed due to reaction of fuel, wherein the $CO_2$ is adsorbed by the sorbent material, and $H_2$ permeates through the $H_2$ permeable membrane to outside the variable volume reactor, and wherein the variable volume reactor is configured so that movement of the active piston sequentially first decreases the volume and increases $H_2$ partial pressure in the reactor volume, which causes an increase of the rate of reaction and hydrogen

2 permeation through $H_2$ membrane and second increases the volume and decreases the partial pressure of $CO_2$ in the variable volume reactor, which causes the $CO_2$ to desorb from the sorbent material and be removed from the variable volume reactor using an open exhaust valve by movement of the active piston to decrease the volume and pushing the $CO_2$ out of the variable volume reactor.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1.1 is a flow chart illustrating an embodiment of the present disclosure.

FIG. 1.2 is an illustration of an embodiment of the present disclosure.

FIG. 1.3 is an illustration of another embodiment of the present disclosure.

FIG. 1.4 is an illustration of another embodiment of the present disclosure.

FIG. 1.5 is an illustration of another embodiment of the present disclosure.

FIG. 1.6 is an illustration of another embodiment of the present disclosure.

FIG. 1.7 is a digital image of a set-up of an embodiment of the present disclosure.

FIG. 2.1 illustrates the equilibrium $CH_4$ conversion for a reactor with (solid lines) and without (dashed lines) a selectively permeable $H_2$ membrane at various operating pressures (assumed uniform within the reactor).

FIG. 2.2 illustrates the $CH_4$ conversion enhancement by removal of $CO_2$ via adsorption both with (solid lines) and without (dashed lines) hydrogen separation via a membrane.

FIG. 2.3 illustrates a schematic of CHAMP-SORB reactor cycle. The reactor utilizes four strokes per cycle: (a) retracting piston to fill the reactor, (b) extending piston to produce $H_2$ via SMR at constant pressure and then opening valve to exhaust products, (c) retracting piston to desorb $CO_2$ and (d) extending piston to desorb and produce a purified $CO_2$ as the final product.

FIG. 2.4 is an illustration of impact of isotherm type on sorbent utilization and required reactor pressure and temperature. Type IV (top figure) isotherm allows a higher $CO_2$ pressure ($P_{des}$) during the desorption stage than the Type I (bottom figure) isotherm would require ($P_{des}$). The same desorption pressure can be achieved with the Type I isotherm only by incorporating a temperature swing between reaction and desorption.

FIG. 2.5 illustrates the impact of S/C ratio on conversion, yield efficiency, thermal efficiency and hydrogen yield density of CHAMP-SORB reactor. Calculations made with a sorbent mass of 1 kg/(initial mol $CH_4$) at 400° C. without any fuel regeneration.

FIGS. 2.6A-C illustrate the CHAMP-SORB reactor cyclic performance without regeneration: (A) Regime map for thermal efficiency versus cyclic hydrogen yield density at varying S/C ratios (·····) and sorbent mass ( — ); (B) Thermal efficiency and (C) Hydrogen yield density as a function of sorbent loading with S/C ratios chosen to maximize each metric.

FIGS. 2.7A and 2.7B illustrates the impact of recycle fraction on CHAMP-SORB reactor thermal efficiency and hydrogen yield density: (A) Regime map for 1 kg sorbent/mol $CH_4$; (B) Maximum thermal efficiency with optimal S/C ratio as a function of recycle fraction and corresponding yield density tradeoff.

FIG. 2.8 illustrates a regime map for CHAMP-SORB cyclic performance with exhaust recycling (all results are for different S/C ratios chosen to maximize thermal efficiency at each recycle fraction and sorbent mass combinations). Dashed lines represent foci of constant sorbent mass (per unit of added fuel) while solid lines represent foci of constant recycle fraction.

FIGS. 3.1A and 3.1B illustrate a graph of the maximum (equilibrium) $CH_4$ conversion achievable for a 2:1 S/C ratio batch of fuel for A) with $H_2$ removal only, and B) with $H_2$ and $CO_2$ removal (r=fraction of $CO_2$ removed from reactor).

FIG. 3.2 illustrates a CHAMP-SORB schematic and baseline operation sequence.

FIGS. 3.3A and B illustrate graphs of the impact of S/C ratio on CHAMP-SORB performance for A) 1 kg sorbent/mol $CH_4$ fuel, and B) for varying sorbent to fuel ratios.

FIG. 3.4 illustrates a schematic of the ideal CHAMP-SORB kinetics model schematic.

FIG. 3.5 illustrates a graph of the ideal kinetic model results with varying catalyst to mass fraction $\phi$.

FIG. 3.6 illustrates a schematic of the piping and instrumentation diagram (P&ID) for experimental CHAMP-SORB testbed.

FIGS. 3.7A and 3.7B illustrate a graph of the CHAMP-SORB sub-process experiments for A) $H_2$ permeation and B) $CO_2$ adsorption.

FIG. 3.8 illustrates a graph of the CHAMP-SORB experimental results.

FIGS. 3.9A-C illustrate a graph of the comparison of experimental data to ideal kinetic model results for A) $H_2$ molar yield rate, B) reactor pressure and C) reactor height variation with time.

FIGS. 3.10A and 3.10B illustrate a graph of a comparison of CHAMP-SORB yield A) with and B) without a functioning $CO_2$ adsorbent.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of engineering, chemistry, energy, physics, and the like, which are within the skill of the art. Such techniques are explained fully in the literature.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

The present disclosure provides compositions including methods of producing $H_2$, reactor structures, variable volume reactors, methods of using variable volume reactors, and the like.

In general, an embodiment of the present disclosure includes a method for producing $H_2$ (10), or in the alternative another gas. As shown in FIG. 1.1, a fuel and gas are introduced into a variable volume reactor (12). The fuel and gas then react to form products (e.g., $H_2$ and $CO_2$) (14). The volume in the variable volume reactor can be decreased by movement of an active piston, which increases the rate of fuel conversion (16). $H_2$ permeates through the $H_2$ permeable membrane (e.g., selectively permeable to $H_2$ or other product gas of interest) and can be stored or used outside of the variable volume reactor, and $CO_2$ (e.g., or other product gas that needs to be adsorbed) is adsorbed by a sorbent material. Subsequently, the volume of the variable reactor can be increased (e.g., movement of the active piston) to cause the $CO_2$ to be desorbed from the sorbent material (18). The $CO_2$ can be caused to flow out of the variable volume reactor through a valve upon decreasing the volume of the variable volume reactor (e.g., by movement of the active piston) (22). Steps 18 and 22 can be repeated one or more times in sequence to allow for increased $CO_2$ removal without an increase in reactor size, which can achieve substantial or complete sorbent regeneration. Alternatively or in addition to, in step 18 the sorbent material can be heated to promote desorption of $CO_2$ by increasing the rate of desorption and to reduce the equilibrium amount of $CO_2$ that the sorbent material can hold. In an embodiment, after steps 16 and before 18, unreacted fuel, unpermeated residual products, and/or non-adsorbed residual products are flowed out of the variable volume reactor and into a second variable volume reactor and steps 14 to 22 are conducted in the (a) second variable reactor. Reactant and/or products can be removed using one or valves positioned to accomplish introducing and/or removing the reactant and/or product.

In an embodiment, the fuel can include: natural gas, methane, methanol, propane, butane, gasoline, diesel, a biofuel, or a combination thereof. In an embodiment, the gas can include a vapor such as steam or air, oxygen, or a combination thereof. In an embodiment, the variable volume reactor can be cooled or heated depending upon the reactants and if the reaction is exothermic or endothermic.

In general, an embodiment of the reactor structure includes an active piston that changes a volume of a variable volume reactor and a structure that includes at least one of: a catalyst, a sorbent material, and a $H_2$ permeable membrane (e.g., or alternative gas permeable membrane if other reactant gases are produced), where the volume is the space between the active piston and the structure. In an embodiment, the variable volume reactor includes the sorbent material (e.g., in the structure, active piston, and the like). In an embodiment, the variable volume reactor is configured so that products (e.g., $CO_2$ and $H_2$, or other products if other products are formed), are formed due to reaction of fuel. In an embodiment, $CO_2$ is adsorbed by the sorbent material (e.g., the sorbent material can be selected to adsorb other product gases) and $H_2$ permeates through the $H_2$ permeable membrane to outside the variable volume reactor. In an embodiment, the variable volume reactor is configured so that movement of the active piston sequentially first decreases the volume and increases $H_2$ partial pressure in the reactor volume, which causes an increase of the rate of reaction and $H_2$ permeation through $H_2$ membrane and second increases the volume and decreases the partial pressure of $CO_2$ in the variable volume reactor, which causes the $CO_2$ to desorb from the sorbent material and be removed from the variable volume reactor using an open exhaust valve by movement of the active piston to decrease the volume and pushing the $CO_2$ out of the variable volume reactor.

In an embodiment, the variable volume reactor (also referred to as CHAMP-SORP) incorporates $CO_2$ adsorption to complement the $H_2$ membrane separation, which allows a dramatic reduction in the operating temperature (e.g., improve energy efficiency) and enhance rate of fuel conversion/hydrogen production of the reforming process. An exemplary embodiment incorporates sorbent regeneration steps in its operating cycle, thereby preventing eventual saturation of the sorbent and enabling fuel (e.g., methane/natural gas) conversion enhancement for repeated cyclic operation. In particular, the active regeneration steps deviates from the traditional pressure swing adsorption (PSA) process of conventional flow reactors, as partial pressure of the adsorbed species is reduced by expanding the reactor volume as opposed to purging a fixed bed with an inert sweep gas. In this regard, the sorbent regeneration method, that does not require a sweep gas, can function by variable-volume batch operation of variable volume reactor and is desirable because it minimizes dilution of $CO_2$ during desorption, making it more energy efficient to capture. In an embodiment, the variable volume reactor can operate in a "closed-loop" mode with partial or full recycle of unreacted reaction products with recoverable energy content, which allows maximization of thermal efficiency and provides a compelling option for applications involving $CO_2$ capture combined with power ($H_2$) generation.

Embodiments of the present disclosure using variable volume (active piston) batch operation in conjunction with combined $H_2$ removal and $CO_2$ sorption allows one to achieve one or more of the following benefits: performing methane steam reforming reaction, which typically requires temperatures>800° C., at lower temperatures (e.g., about 150 to less than 800° C. or below 500° C.) to reduce material cost and preheating energy; reducing the overall system complexity and footprint due to use of multi-functional components integrated in the same reactor system; and operation at lower steam-to-carbon (S/C) ratio down to stoichiometric values for a given hydrocarbon fuel (e.g., 2 to 1 for methane as a fuel), which improves thermal efficiency, increases volumetric $H_2$ yield density, and minimize use of excess steam.

Embodiments of the present disclosure are advantageous because it is beneficial to bring the reforming catalyst/$CO_2$-sorbent/$H_2$-membrane in close proximity (i.e., have them co-located) to each other to minimize mass transfer limitations (i.e., improving species transport from the reaction site on the catalyst to product removal at the sorbent and membrane sites). In an embodiment, it may be advantageous to segregate domains (e.g., reforming catalyst/$CO_2$-sorbent/$H_2$-membrane) depending on heat transfer requirements and thermal stability/preferred range of operating temperatures. For example, the reforming catalyst and $H_2$ permeable membrane prefer high temperatures for improved reaction kinetics and greater $H_2$ permeation rate, whereas the $CO_2$ sorbent has greater adsorption capacity and better stability at lower temperature, so it may be beneficial to segregate the catalyst/$H_2$ permeable membrane and sorbent in different domains based on temperature distribution in the reactor, which can be established using different heating/cooling arrangements.

Now having described embodiments of the present disclosure in general, additional details will be described. In an embodiment, the method of generating $H_2$ in a variable volume reactor can include a cycle (where one or more steps can be repeated) with the following steps executed in sequence: a) introducing a hydrocarbon fuel and a gas (e.g., steam, air, oxygen, or a combination thereof) at a ratio (e.g., about 2:1 to 6:1 when using steam as co-reactant for fuel reforming) into the variable volume reactor (e.g., See FIGS. 1.2-1.6 for exemplary embodiments); b) causing the fuel and gas to react with assistance of a catalyst to produce $H_2$ and $CO_2$ products; c) increasing a rate of fuel conversion reaction by actively decreasing a volume of the variable volume reactor (e.g., movement of the active piston), wherein $H_2$ permeates through a selectively $H_2$ permeable membrane and is removed from the variable volume reactor, wherein $CO_2$ is adsorbed by a sorbent material; d) increasing the volume of the variable volume reactor (e.g., movement of the active piston) causing the $CO_2$ to be desorbed from the sorbent material by decreasing the partial pressure of $CO_2$; and e) decreasing the volume of the variable volume reactor (e.g., movement of the active piston) causing the $CO_2$ to be flowed out of the variable volume reactor through a valve. In an embodiment, step c' can be added after step c and before step d, where unreacted fuel, unpermeated residual products, and/or non-adsorbed residual products can be flowed out of the variable volume reactor and into a second variable volume reactor and steps b-e can be conducted.

Additional details regarding embodiments of the method will be described in reference to various embodiments (See FIGS. 1.2-1.6). An embodiment of a structure including the variable volume reactor will be discussed followed by details regarding the method of generating $H_2$ in the variable volume reactor. This organizational approach is set forth for a number of embodiments. It should be noted that various features (e.g., sorbent material, catalyst, and the like, as well as various steps) will be introduced for one of the embodiments introduced first, and may not be repeated for sake of clarity, but the defined features are applicable for other embodiments consistent with the operation and structure of each embodiment. Embodiments of the variable volume reactor are described in FIGS. 1.2 to 1.6, and FIG. 1.7 illustrates a digital image of an embodiment of a reactor system that includes the variable volume reactor (each embodiment of the variable volume reactor could be included in such a reactor system). Additional details can be found in Examples 1 and 2.

In an embodiment as illustrated in FIG. 1.2, the reactor structure (or reactor system) can include an active piston that changes a volume of a variable volume reactor by moving. Movement of the active piston can be controlled by an external actuator, for example. The reactor structure also includes a structure that includes a catalyst domain, a sorbent material domain, and a $H_2$ permeable membrane domain. The $H_2$ permeable membrane domain extends through the structure so $H_2$ permeates through the $H_2$ permeable membrane domain from inside the variable volume reactor to outside the variable volume reactor, where the $H_2$ can be stored for future use or used to produce energy. In an embodiment, the volume is the space between the active piston and the structure.

In an embodiment, the active piston can be made of metal, stainless steel, ceramics, and the like. In an embodiment, the container including the active piston, the structure, and the variable volume reactor can be made of metal, stainless steel, ceramics, and the like.

Both the active piston and the structure form an air-tight seal to contain the gas in the variable volume reactor. One or more valves can be used to introduce and/or remove gas from the variable volume reactor. Also, one or more valves can be used to introduce and/or remove gas (e.g. carrier gas such as argon or steam or permeated $H_2$) from the other side (not the variable volume reactor) of the active piston and from the other side (not the variable volume reactor) of the structure.

In an embodiment, the variable volume reactor is configured so that products, $CO_2$ and $H_2$, are formed due to reaction of fuel with the assistance of the catalyst. $CO_2$ is adsorbed by the sorbent material.

In an embodiment, the variable volume reactor is configured so movement of the active piston to decrease the volume and to increase the partial pressure of the $H_2$ in the variable reactor volume which causes the $H_2$ to transfer through the $H_2$ selectively permeable membrane to outside of reactor.

In an embodiment, the variable volume reactor is configured so that movement of the active piston increases the volume and decreases the partial pressure of $CO_2$ in the variable volume reactor, which causes the $CO_2$ to desorb from the sorbent material and be removed from the variable volume reactor using an opening connected via a valve (e.g., an open exhaust valve) by movement of the active piston to decrease the volume and pushing the $CO_2$ out of the variable volume reactor. As mentioned herein, the steps d and e can be repeated in sequence one or more times to increase the sorbent regeneration and/or the sorbent material domain can be heated to the rate and amount of $CO_2$ desorption.

In an embodiment, the $H_2$ permeable membrane domain is embedded into a $H_2$ permeable membrane structure that extends the thickness of the structure so that $H_2$ passes through the $H_2$ permeable membrane domain. In an embodiment, the structure can include one or more $H_2$ permeable membrane structures. For example, the $H_2$ permeable membrane structure can be a hollow structure such as a tube, where the $H_2$ permeable membrane domain is disposed within the $H_2$ permeable membrane structure. In an embodiment the length of the $H_2$ permeable membrane structure is based on the thickness of the structure (about 1 micrometer to 100 micrometers), and the $H_2$ permeable membrane structure should be long enough to extend the thickness of the structure so that $H_2$ can permeate through the $H_2$ permeable membrane structure. In an embodiment, the width or diameter of the $H_2$ permeable membrane structure can be about 1 mm to 10 mm. In an embodiment, $H_2$ permeable membrane structure can be exposed to steam on the side of the structure that is outside the variable volume reactor to enhance $H_2$ permeation through the $H_2$ permeable membrane domain.

In an embodiment, the catalyst domain, the sorbent material domain, and the $H_2$ permeable membrane domain are segregated. For example, each domain may be segregated so that the temperature of each domain can be controlled independently or allowed to adjust to the temperature of its surroundings.

In an embodiment, the $H_2$ permeable membrane domain (and in other embodiments the $H_2$ permeable membrane) can be made of a material such as microporous alumina (high permeability, poor selectivity), zeolites (moderate permeability and selectivity), perovskites (low permeability, high selectivity), and dense metallic membranes (relatively high permeability, and potentially infinite selectivity), metal alloys, and combinations thereof. The material selection and design of the membrane must be such that it is mechanically robust, provides sufficient permeability and selectivity, maximum active surface area for permeation, and minimal degradation of performance under reaction conditions. In an embodiment, palladium and palladium alloy membranes, often integrated as part of the porous structure for mechanical support, provide many of these characteristics (including nearly infinite selectivity to hydrogen).

In an embodiment, the sorbent material domain (in other embodiments the sorbent material) can be a high temperature sorbent. In addition to the isotherm shape considerations, the sorbent material domain has sufficient $CO_2$ adsorption capacity at temperatures above 400° C. and selectively adsorb $CO_2$ in presence of other gases, in particular water vapor. In an embodiment, the sorbent material can adsorb more than on type of product. In an embodiment, two or more types of sorbent materials can be used to adsorb one or more types of products. In an embodiment, the sorbent material domain can be a material such as: calcium oxide, lithium zirconate, hydrotalcites, activated carbons, zeolites, organic-inorganic hybrids (e.g., amine functionalized silica), metal organic frameworks, and polymers (e.g., branch or hyperbranched polymers (e.g., an ethylene-amine hyperbranched polymer)), and a combination thereof. In an embodiment, the selection of the sorbent material can be based on one of the following: temperature range, kinetics and capacity. In an embodiment, the sorbent material domain can be $K_2CO_3$-promoted hydrotalcite (stable for up to 450° C.).

The catalyst domain (in other embodiments the catalyst) can include an oxidation catalyst, a reforming catalyst, a water-gas shift catalyst, a decomposition catalyst, a CO preferential oxidation (PROX) catalyst, and combinations thereof. In an embodiment, the catalyst domain can be a material such as: Ni, Co, Ru, Rh, Pd, or Pt, on $MgAl_2O_4$ and $Al_2O_3$—MgO supports, $CuO$—$ZnO/Al_2O_3$, $Cu$—$ZrO_2/Al_2O_3$, $Cu$—$ZnO/Al_2O_3$, $Pt/Al_2O_3$, $CuO$—$ZnO$—$Al_2O_3$—$ZrO_2+ZSM^{-5}$; Pd—Cu on $Al_2O_3$ support, Ni on $NiAl_2O_4$ support, Ni—$Al_2O_3$ and $Co/Al_2O_3$, and Ni, Ru, or Rh on $Al_2O_3$ support. In an embodiment, the catalyst can be selected based on the specific hydrocarbon fuel being reformed—some examples include: methane—transitional and noble metals (Ni, Co, Ru, Rh, Pd, Pt, etc) on $MgAl_2O_4$ and $Al_2O_3$—MgO supports; methanol—$CuO$—$ZnO/Al_2O_3$, $Cu$—$ZrO_2/Al_2O_3$, and $Cu$—$ZnO/Al_2O_3$ and $Pt/Al_2O_3$; DME (dimethyl ether)—$CuO$—$ZnO$—$Al_2O_3$—$ZrO2+ZSM-5$; propane/propene—Pd—Cu on $Al_2O_3$ support or Ni on $NiAl_2O_4$ support; gasoline—Ni—$Al_2O_3$ and $Co/Al_2O_3$; diesel and biofuels—Ni, Ru, or Rh on $Al_2O_3$ support. In particular, the oxidation catalyst can include, but is not limited to, $Pt/Al_2O_3$, $Rh/Ce/Al_2O_3$, and $Cu/ZnO/Al_2O_3$. The reforming catalyst can include, but is not limited to, $Cu/ZnO/Al_2O_3$, $Pd/Zn/Al_2O_3$, $Ni/Al_2O_3$, and the like. The water-gas shift catalyst reduces the amount of carbon monoxide in the products and produces additional hydrogen from unreacted carbon dioxide and steam. The water-gas shift catalyst can include, but is not limited to, Cu/ZnO/$Al_2O_3$, Fe—Cr/$Al_2O_3$, and the like. The decomposition catalyst can include, but is not limited to, Ni/$SiO_2$ Ni/$Al_2O_3$, and the like. The PROX catalyst can include, but is not limited to, Pt—Fe/$Al_2O_3$ and Pt—Rh/$Al_2O_3$.

In an embodiment, the weight ratio of catalyst domain to the sorbent material domain in the structure can be about 0.1:0.9 to 0.2:0.5.

It should be noted that variables such as reactor pressure, reactor temperature, the amount of catalyst used, the amount of $CO_2$ sorbent material used, and the like, depend upon the design of the reactor structure, the variable volume reactor, fuel, products, and the like. Having noted such variables, the amount of sorbent material can be chosen such that its $CO_2$ sorption capacity and kinetics of $CO_2$ sorption match the hydrogen removal rate (kinetics and total amount) by the membrane. In an embodiment, the reactor pressure can be about 1 bar to 20 bar, about 2 bar to 10 bar, or about 3 bar to 6 bar. In an embodiment, the reactor temperature can be about 200 to 1000° C., about 300 to 800° C., or about 400 to 600° C., but is generally lower than a system that flows gas to remove $CO_2$ from a sorbent bed. In an embodiment, the compression ratio (ratio of reactor volume at max and min upon piston movement) can be about 1 to 100, about 2 to 20, or about 3 to 5. In an embodiment, the ratio of the volume of catalyst domain to the total reactor volume can be about 0.01 to 1.0, about 0.05 to 0.6, or about 0.1 to 0.3. In an embodiment, the ratio of reactor volume to $H_2$ membrane surface area can be about 0.01 to 100 cm, about 0.1 to 10 cm, or about 0.5 to 1 cm. In an embodiment, the ratio of catalyst domain mass to the sorbent material mass can be about 0.1 to 0.9, about 0.2 to 0.5, or about 0.3 to 0.4.

Now having described an embodiment of the variable volume reactor, additional details regarding the method of generating $H_2$ will be described. In an embodiment, step c) includes moving the active piston to reduce the volume (e.g., reduce by about 30 to 90%) to cause an increase in $H_2$ partial pressure and permeation through the $H_2$ permeable membrane domain out of the variable volume reactor.

In an embodiment, step d) can include moving the active piston to increase the volume to cause the $CO_2$ to be desorbed from the sorbent material by reducing the partial pressure of the $CO_2$. In an embodiment, the sorbent domain can be heated to cause the $CO_2$ to be desorbed from the sorbent material by reducing the equilibrium $CO_2$ sorption capacity of the sorbent material.

In an embodiment, step e) can include moving the active piston to decrease the volume to cause the $CO_2$ to be flowed out of the of the variable volume reactor through a valve (e.g., the open exhaust valve).

In an embodiment, during step b) the catalyst and $H_2$ permeable membrane domains are heated using by a gas (e.g., steam) from contact outside of the variable volume reactor to increase the rate of reaction and the rate of $H_2$ transfer from the catalyst domain through the $H_2$ permeable membrane domain.

Now referring to FIG. 1.3, in an embodiment, the reactor structure can include an active piston that changes a volume of a variable volume reactor, a structure that includes a catalyst and a sorbent material, and a $H_2$ permeable membrane. The $H_2$ permeable membrane is positioned adjacent the structure on the side opposite side the active piston so the structure is between the active piston and the $H_2$ permeable membrane. Although the structure and the $H_2$ permeable membrane are shown as separated in FIG. 1.3, an embodiment of the present disclosure has the structure and the $H_2$ permeable membrane disposed so that they touch each other and a space is not between them.

The catalyst material, the sorbent material, and the $H_2$ permeable membrane material can be those as described herein.

In an embodiment, the ratio of the catalyst to sorbent material in the structure can be about 0.2 to 0.5.

In an embodiment, the structure can have a thickness of a centimeter to 100s of centimeters depending upon the size of the reactor structure. In an embodiment, the $H_2$ permeable membrane can have a thickness of about 10 micrometer to 50 micrometers.

The active piston, the structure, and the $H_2$ permeable membrane form an air-tight seal to contain the gas in the variable volume reactor. One or more valves can be used to introduce and/or remove gas from the variable volume reactor. Also, one or more valves can be used to introduce and/or remove gas (e.g. carrier gas such as argon or steam or permeated $H_2$) from the other side (not the variable volume reactor) of the active piston and from the other side (not the variable volume reactor) of the $H_2$ membrane.

In an embodiment, the variable volume reactor is configured so that products, $CO_2$ and $H_2$, are formed due to reaction of fuel with the assistance of the catalyst. $CO_2$ is adsorbed by the sorbent material.

In an embodiment, the variable volume reactor is configured so movement of the active piston decreases the volume and increases the partial pressure of the $H_2$ in the variable reactor volume which causes the $H_2$ to transfer (e.g., by permeation) through the structure and the $H_2$ selectively permeable membrane to outside of the variable volume reactor.

In an embodiment, the variable volume reactor is configured so that movement of the active piston increases the volume and decreases the partial pressure of $CO_2$ in the variable volume reactor, which causes the $CO_2$ to desorb from the sorbent material and be removed from the variable volume reactor using a valve (e.g., an open exhaust valve) by movement of the active piston to decrease the volume and pushing the $CO_2$ out of the variable volume reactor.

Now having described an embodiment of the variable volume reactor, additional details will be provided regarding the method of $H_2$ generation. Other features described herein are applicable to this method as long as they are consistent with this embodiment of the variable volume reactor and its operation, and such features are not repeated for sake of clarity.

In an embodiment, step c) includes moving the active piston to reduce the volume to cause the increase in $H_2$ partial pressure and increase rate of permeation through the structure and the $H_2$ permeable membrane out of the variable volume reactor.

In an embodiment, step d) includes moving the active piston to increase the volume to cause the $CO_2$ to be desorbed from the sorbent material by reducing the partial pressure of the $CO_2$. In an embodiment, the structure can be heated to cause the $CO_2$ to be desorbed from the sorbent material by reducing the equilibrium $CO_2$ sorption capacity of the sorbent material.

In an embodiment, step e) includes moving the active piston to decrease the volume to cause the $CO_2$ to be flowed out of the of the variable volume reactor through the open exhaust valve. As noted herein, steps d and e can be repeated sequentially multiple times and/or the sorbent material can be heated.

In an embodiment, during step b) the $H_2$ permeable membrane and the catalyst domain are heated from contact outside of the variable volume reactor to increase rate of reaction and to cause an increase of rate of $H_2$ transfer through the $H_2$ permeable membrane. In an embodiment, the heat can be generated from steam, for example flowing through tubes embedded into the catalyst domain where $H_2$ is being separated out.

Now additional details will be provided in regard to FIG. 1.4. In an embodiment, the reactor structure includes an active piston that changes a volume of a variable volume reactor, where the active piston includes a $H_2$ permeable membrane. In an embodiment, the active piston can be composed of material that is permeable to $H_2$, where the material is selected to achieve the desired $H_2$ transfer from inside to outside of the reactor volume as well as has the mechanical properties to operate as the active piston. In an embodiment, the active piston can include channels through the active piston that are made of $H_2$ permeable membrane. For example, one or more of the $H_2$ permeable membrane structure(s) described in reference to FIG. 1.2 could be used in the active piston. In another embodiment, the face of the piston oriented towards the variable volume reactor has a $H_2$ permeable membrane supported by a perforated plate to provide mechanical support for the thin membrane.

In addition, the reactor structure includes a catalyst structure that includes a catalyst, where the volume is the space between the active piston and the catalyst structure. The materials described herein regarding the catalyst can be used in the catalyst structure. In an embodiment, the catalyst structure can use a support (e.g., a mesh, a filter, perforated plate, etc.) to hold the catalyst material. The catalyst layer is designed so that reactants (e.g., fuel, steam) and products ($H_2$ and $CO_2$) can flow through the catalyst layer.

A $CO_2$ membrane can be disposed adjacent the catalyst structure that is on the side opposite the active piston. Also, a sorbent material layer can be disposed adjacent the $CO_2$ membrane on the side opposite the catalyst structure, where the $CO_2$ membrane is between the catalyst layer and the sorbent material layer. Although FIG. 1.4 illustrates a space between the catalyst layer and the $CO_2$ layer and between the $CO_2$ membrane and the sorbent layer, an embodiment of the present disclosure includes a design where there is no space between the catalyst layer and the $CO_2$ layer and between the $CO_2$ membrane and the sorbent layer.

The catalyst material, the sorbent material, and the $H_2$ permeable membrane material can be those as described herein.

In an embodiment, the catalyst structure can have a thickness of a centimeter to 10s of centimeters or larger depending upon the dimensions of the reactor structure. In an embodiment, the $CO_2$ membrane can have a thickness of about 10 micrometers to 1 millimeter or larger depending upon the dimensions of the reactor structure. In an embodiment, the sorbent layer can have a thickness of a centimeter to 10s of centimeters or larger depending upon the dimensions of the reactor structure.

The active piston, the catalyst layer, the $CO_2$ membrane, and the sorbent layer form an air-tight seal to contain the gas in the variable volume reactor. One or more valves can be used to introduce and/or remove gas from the variable volume reactor. Also, one or more valves can be used to introduce and/or remove gas (e.g. carrier gas such as argon or steam or permeated $H_2$) from the other side (outside of the variable volume reactor) of the active piston and from the other side (outside of the variable volume reactor) of the sorbent layer.

In an embodiment, the variable volume reactor is configured so that products, $CO_2$ and $H_2$, are formed due to reaction of fuel with the assistance of the catalyst. $CO_2$ is adsorbed by the sorbent material after its concentration is increased by selective passing through the $CO_2$ membrane.

In an embodiment, the variable volume reactor is configured so movement of the active piston decreases the volume and increases the partial pressure of the $H_2$ in the variable reactor volume which causes the $H_2$ to transfer through the $H_2$ permeable membrane to outside of variable volume reactor.

In an embodiment, the variable volume reactor is configured so that movement of the active piston increases the volume and decreases the partial pressure of $CO_2$ in the variable volume reactor, which causes the $CO_2$ to desorb from the sorbent material, pass through the $CO_2$ membrane, and be removed from the variable volume reactor using a valve (e.g., an open exhaust valve) by movement of the active piston to decrease the volume and pushing the $CO_2$ out of the variable volume reactor. As stated above, steps d and e can be repeated in sequence multiple times and/or the sorbent material can be heated.

Now having described an embodiment of the variable volume reactor, additional details will be provided regarding the method of $H_2$ generation. Other features described herein are application to this method as long as they are consistent with this embodiment of the variable volume reactor and its operation, and such features are not repeated for sake of clarity.

In an embodiment, step c) includes moving the active piston to reduce the volume to cause the increase in $H_2$ partial pressure and its permeation through the $H_2$ permeable membrane out of the variable volume reactor and to cause the increase in $CO_2$ partial pressure and its permeation through the $CO_2$ permeable membrane to pre-concentrate $CO_2$ in contact with the sorbent structure to increase equilibrium $CO_2$ sorption capacity by the sorbent material.

In an embodiment, step d) includes moving the active piston to increase the volume of the variable volume reactor to cause the $CO_2$ to be desorbed from the sorbent material by reducing the partial pressure of the $CO_2$.

In an embodiment, step d) includes heating the sorbent domain to cause the $CO_2$ to be desorbed from the sorbent material by reducing the equilibrium $CO_2$ sorption capacity of the sorbent material.

In an embodiment, step e) includes moving the active piston to decrease the volume of the variable volume reactor to cause the $CO_2$ to be flowed out of the of the variable volume reactor through the open exhaust valve.

In an embodiment, in step b) the $H_2$ permeable membrane is heated from contact outside of the variable volume reactor to cause $H_2$ transfer through the $H_2$ permeable membrane.

In an embodiment, during step b) the catalyst domain is heated from contact outside of the variable volume reactor to cause an increase of rate of reaction.

Now the embodiment corresponding to FIG. 1.5 will be described. In an embodiment, the reactor structure includes an active piston that changes a volume of a variable volume reactor, where the active piston includes a $H_2$ permeable membrane. The active piston in FIG. 1.5 is the same as the active piston in FIG. 1.4. The reactor structure can include a structure that includes a catalyst and a sorbent material. This structure is the same as the structure described in reference to FIG. 1.3.

The catalyst material, the sorbent material, and the $H_2$ permeable membrane material can be those as described herein.

In an embodiment, the catalyst structure can have a thickness of a centimeter to 10s of centimeters or more depending upon the dimensions of the reactor structure. In an embodiment, the $CO_2$ membrane can have a thickness of millimeters to 10s of millimeters or more depending upon the dimensions of the reactor structure. In an embodiment, the sorbent layer can have a thickness of centimeter to 10s of centimeters or more depending upon the dimensions of the reactor structure.

The active piston, the catalyst layer, the $CO_2$ membrane, and the sorbent layer form an air-tight seal to contain the gas in the variable volume reactor. One or more valves can be used to introduce and/or remove gas from the variable volume reactor. Also, one or more valves can be used to introduce and/or remove gas (e.g. carrier gas such as argon or steam or permeated $H_2$) from the other side (not in variable volume reactor) of the active piston and from the other side (not in variable volume reactor) of the sorbent layer.

In an embodiment, the variable volume reactor is configured so that products, $CO_2$ and $H_2$, are formed due to reaction of fuel with the assistance of the catalyst. $CO_2$ is adsorbed by the sorbent material.

In an embodiment, the variable volume reactor is configured so movement of the active piston to decrease the volume and increase the partial pressure of the $H_2$ in the variable reactor volume, which causes the $H_2$ to transfer through the $H_2$ permeable membrane to outside of the variable volume reactor.

In an embodiment, the variable volume reactor is configured so that movement of the active piston increases the volume and decreases the partial pressure of $CO_2$ in the variable volume reactor, which causes the $CO_2$ to desorb from the sorbent material and be removed from the variable volume reactor using a valve (e.g., an open exhaust valve) by movement of the active piston to decrease the volume and pushing the $CO_2$ out of the variable volume reactor. As stated above, steps d and e can be repeated in sequence multiple times and/or the sorbent material can be heated.

Now having described an embodiment of the variable volume reactor, additional details will be provided regarding the method of $H_2$ generation. Other features described herein are applicable to this method as long as they are consistent with this embodiment of the variable volume reactor and its operation, and such features are not repeated for sake of clarity.

In an embodiment, step c) includes moving the active piston to reduce the volume to cause the increase in $H_2$ partial pressure and the rate of $H_2$ permeation through the $H_2$ permeable membrane out of the variable volume reactor.

In an embodiment, step d) includes moving the active piston to increase the volume of the variable volume reactor to cause the $CO_2$ to be desorbed from the sorbent material.

In an embodiment, step d) includes heating the sorbent domain to cause the $CO_2$ to be desorbed from the sorbent material by reducing the equilibrium $CO_2$ sorption capacity of the sorbent material.

In an embodiment, step e) includes moving the active piston to decrease the volume to cause the $CO_2$ to be flowed out of the of the variable volume reactor through the open exhaust valve.

In an embodiment, during step b) the $H_2$ permeable membrane and the catalyst are heated from contact outside of the variable volume reactor to increase the rate of reaction and to cause $H_2$ transfer through the $H_2$ permeable membrane.

Now the embodiment corresponding to FIG. 1.6 will be described. In an embodiment, the reactor structure includes an active piston that changes a volume of a variable volume reactor, where the active piston includes a sorbent material; and a structure that includes a catalyst domain and a $H_2$ permeable membrane domain. In an embodiment, the active piston can be composed of material that is sorbent material, where the material is selected to achieve the desired $CO_2$ adsorption as well as has the mechanical properties to operate as the active piston.

The structure includes a catalyst domain and a $H_2$ permeable membrane domain. The structure is similar to the structure in FIG. 1.2 except that the structure does not include the sorbent material domain. The $H_2$ permeable membrane domain extends through the structure so the $H_2$ permeates through the $H_2$ permeable membrane domain from inside the variable volume reactor to outside the variable volume reactor, where the $H_2$ can be stored for future use or used to produce energy. In an embodiment, the volume is the space between the active piston and the structure.

In an embodiment, the active piston can be made of metal, stainless steel, ceramics, and the like and covered by the sorbent material. In an embodiment, the active piston layer can be made of the sorbent material.

Both the active piston and the structure form an air-tight seal to contain the gas in the variable volume reactor. One or more valves can be used to introduce and/or remove gas from the variable volume reactor. Also, one or more valves can be used to introduce and/or remove gas (e.g. carrier gas such as argon or steam or permeated $H_2$) from the other side (not in the variable volume reactor) of the active piston and from the other side (not in the variable volume reactor) of the structure.

This embodiment is similar to the one described in FIG. 1.2, except the structure combines catalyst and $H_2$ permeable membrane domain and an active piston, which includes sorption material and separated from the catalyst and $H_2$ permeable membrane via variable volume reactor volume. Otherwise, the embodiments are very similar or the same. One advantage of this embodiment is that spatially separating the $CO_2$ sorbent domain from the catalyst domain and the $H_2$ permeable membrane domain mitigates the thermal effect, as the catalyst and $H_2$ permeable membrane benefit from heating during step b) of reaction/permeation, whereas $CO_2$ sorbent benefits from lower temperature during step b) as the equilibrium $CO_2$ sorption capacity increases with a decrease in temperature.

The catalyst material, the sorbent material, and the $H_2$ permeable membrane material can be those as described herein.

In an embodiment, the structure can have a thickness of a centimeter or 10s of centimeters or more depending on the dimensions of the reactor structure.

The active piston and the structure form an air-tight seal to contain the gas in the variable volume reactor. One or more valves can be used to introduce and/or remove gas from the variable volume reactor. Also, one or more valves can be used to introduce and/or remove gas (e.g. carrier gas such as argon or steam or permeated $H_2$) from the other side (not the variable volume reactor) of the active piston and from the other side (outside of the variable volume reactor) of the sorbent layer.

In an embodiment, the variable volume reactor is configured so that products, $CO_2$ and $H_2$, are formed due to reaction of fuel with the assistance of the catalyst. $CO_2$ is adsorbed by the sorbent material.

In an embodiment, the variable volume reactor is configured so movement of the active piston decreases the volume and increases the partial pressure of the $H_2$ in the variable reactor volume, which causes the $H_2$ to transfer through the $H_2$ permeable membrane to outside of variable volume reactor.

In an embodiment, the variable volume reactor is configured so that movement of the active piston increases the volume and decreases the partial pressure of $CO_2$ in the variable volume reactor, which causes the $CO_2$ to desorb from the sorbent material and be removed from the variable volume reactor using a valve (e.g., an open exhaust valve) by movement of the active piston to decrease the volume thereby pushing the $CO_2$ out of the variable volume reactor. As stated above, steps d and e can be repeated in sequence and/or the sorbent material can be heated.

Now having described an embodiment of the variable volume reactor, additional details will be provided regarding the method of $H_2$ generation. Other features described herein are applicable to this method as long as they are consistent with this embodiment of the variable volume reactor and its operation, and such features are not repeated for sake of clarity.

In an embodiment, step c) includes moving the active piston to reduce the volume to cause the increase in $H_2$ partial pressure and permeation through the $H_2$ permeable membrane domain out of the variable volume reactor.

In an embodiment, step d) includes moving the active piston to increase the volume to cause the $CO_2$ to be desorbed from the sorbent material by reducing the partial pressure of the $CO_2$.

In an embodiment, step d) includes heating the sorbent domain to cause the $CO_2$ to be desorbed from the sorbent material by reducing the equilibrium $CO_2$ sorption capacity of the sorbent material.

In an embodiment, step e) includes moving the active piston to decrease the volume to cause the $CO_2$ to be flowed out of the of the variable volume reactor through the open exhaust valve.

In an embodiment, during step b) a structure including catalyst and $H_2$ permeable membrane domains is heated using steam from contact outside of the variable volume reactor to increase the rate of reaction and the rate of $H_2$ transfer from the catalyst domain through the $H_2$ permeable membrane domain.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

Example 1

Combined reaction-separation processes are a widely explored method to produce hydrogen from endothermic steam reforming of hydrocarbon feedstock at a reduced reaction temperature and with fewer unit operation steps, both of which are key requirements for energy efficient, distributed hydrogen production. This example introduces a new class of variable volume batch reactors for production of hydrogen from catalytic steam reforming of methane that operates in a cycle similar to that of an internal combustion engine. It incorporates a $CO_2$ adsorbent and a selectively permeable hydrogen membrane for in situ removal of the two major products of the reversible steam methane reforming reaction. Thermodynamic analysis is employed to define an envelope of ideal reactor performance and to explore the tradeoff between thermal efficiency and hydrogen yield density with respect to critical operating parameters, including sorbent mass, steam to methane ratio and fraction of product gas recycled. Particular attention is paid to contrasting the variable volume batch-membrane reactor approach to a conventional fixed-bed reaction-separation approach. The results indicates that the proposed reactor is a viable option for low temperature distributed production of hydrogen from methane, the primary component of natural gas feedstock, including the possibility for low-energy-input $CO_2$ capture.

Introduction

Natural gas has recently been touted as a bridge fuel to a low-carbon future because of its favorable hydrogen-to-carbon ratio and newly developed techniques to tap vast, previously inaccessible worldwide reserves [1, 2]. With its newfound abundance, additional methods of natural gas utilization are desirable, including approaches for efficient production of hydrogen in a small-scale, distributed fashion at the point of use. Distributed hydrogen production helps overcome one of the primary barriers to the implementation of a so-called "hydrogen economy": the lack of a large-scale hydrogen delivery infrastructure[3]. [4-8] Owing to these distribution challenges, presently 95% of worldwide hydrogen production is captive (i.e., co-located production and usage) [9]. Implementation of efficient small-scale hydrogen production facilities from methane, the primary component of natural gas, at the point of use would allow extension of the captive production strategy to industrial/residential co-generation [10, 11] and on-vehicle [12] applications. To understand the challenges associated with this strategy, it is instructive to first briefly discuss the established large-scale industrial processes and consider the difficulties of scaling-down a similar approach for distributed hydrogen production.

Steam methane reforming (SMR) is an industrially mature technology that is the primary route of hydrogen production worldwide from natural gas, accounting for 95% of the hydrogen produced in the United States [13, 14]. The SMR process consists of the strongly endothermic reverse methanation reaction, Eq. (1, Example 1), and moderately exothermic water gas shift (WGS) reaction, Eq. (2, Example 1):

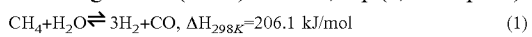

$$CH_4 + H_2O \rightleftharpoons 3H_2 + CO, \Delta H_{298K} = 206.1 \text{ kJ/mol} \quad (1)$$

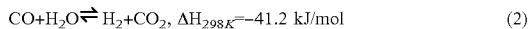

$$CO + H_2O \rightleftharpoons H_2 + CO_2, \Delta H_{298K} = -41.2 \text{ kJ/mol} \quad (2)$$

The combined reaction is endothermic and stoichiometrically defines the maximum $H_2$ yield for a given quantity of $CH_4$:

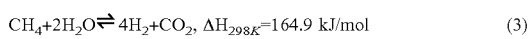

$$CH_4 + 2H_2O \rightleftharpoons 4H_2 + CO_2, \Delta H_{298K} = 164.9 \text{ kJ/mol} \quad (3)$$

Reactions (1-3, Example 1) occur in parallel, typically over a nickel catalyst [15].

Because reverse methanation is endothermic while the WGS reaction is exothermic and both reactions are equilibrium limited for typical reactor conditions, it is impossible to achieve complete conversion of $CH_4$ into $CO_2$ and $H_2$ in a single stage of a conventional continuous flow reactor [16]. To shift the equilibrium of the strongly endothermic reverse methanation reaction in a favorable direction of greater hydrogen yield, large-scale industrial steam reformers utilize an initial reactor stage that operates at a highly elevated temperature in a range of 800-900° C. The reformer is also fed with excess of steam ($H_2O$), i.e., a high steam to carbon (S/C) molar ratio, to promote further $CH_4$ conversion and to minimize catalyst coking. While the stoichiometry of the combined reaction, given by Eq. (3, Example 1), requires a S/C ratio of only 2, industrial SMR processes typically operate at a S/C ratio of between 3 and 6.

Because of the high operating temperature of the initial SMR reactor stage, which is thermodynamically unfavorable for conversion of CO to $CO_2$ via the exothermic WGS reaction, the effluent gas from a single stage reactor typically contains an unacceptably large 8-10% CO on a dry basis [13, 14]. To substantially reduce the CO concentration and to produce additional $H_2$, one or two subsequent low-temperature reactors are utilized with conditions favorable for the exothermic WGS reaction. For applications where extremely pure hydrogen is required, such as PEM fuel cells where CO concentrations above 20 ppm can poison the Pt catalyst [17], additional product purification is achieved via pressure swing adsorption (PSA) of residual carbon monoxide from the effluent of the low temperature WGS reactor. With numerous sequential unit operations, including intermediate heat exchangers for thermal management of the reagent/product streams between active (reaction/separation) units, as well as a need for high temperature operating conditions, it is clear that industrial SMR is capital intensive, technologically complex and challenging, and requires a large footprint; yet, it is currently the most cost-effective method of commercial scale hydrogen production [3].

On-site, localized production of production of hydrogen from methane at lower (and dynamically variable) throughputs, which can be used in conjunction with the current natural gas distribution infrastructure, places stringent demand on the complexity/cost, energy (thermal) efficiency and footprint of fuel processing strategy. Straight-forward miniaturization of the conventional industrial approach is not practical for scale-down because of the excessive operating temperature (with associated cost and thermal efficiency penalty) and at best linear footprint reduction with production capacity for multi-unit equipment (with possible "non-scalable" component bottlenecks). Thus, to effectively implement SMR processes in smaller-scale distributed applications, the following requirements must be met:

Lower operating temperature to reduce material cost and preheating energy requirements;

Multifunctional components (e.g., combined reaction/separation step, elimination of dedicated low temperature WGS reactors) to reduce the overall system complexity and footprint;

Operation at lower S/C ratio to improve thermal efficiency, to increase volumetric $H_2$ yield density, and to avoid use of excess steam, which may not be as readily available as it would be in a large-scale industrial plant.

Combined reaction-separation processes are an attractive means to reduce the required SMR operating temperature and increase the practicality of on-site hydrogen generation [18, 19]. By Le Chatelier's principle, selective removal of $H_2$ and/or $CO_2$ from the reactor shifts equilibrium toward greater fuel conversion and $H_2$ yield, thereby circumventing the thermodynamic equilibrium limitations of the SMR process. This results in a suitable level of conversion that can be achieved at much lower temperature, and even potential removal of subsequent WGS and PSA purification steps. Moreover, the in situ removal of the reversible reactions' products enhances the forward reaction kinetics by increasing instantaneous concentrations of the reagents, which can further reduce the required reactor volume for a given $H_2$ yield, thus increasing the power density. Two SMR reaction-separation processes that have been extensively investigated are packed-bed catalytic $H_2$ membrane reactors [20-23] and $CO_2$ sorption-enhanced reactors [11, 24-31]. Reactors incorporating $CO_2$ sorption, termed SE-SMR, produce an improvement in $CH_4$ conversion at temperatures below 500° C.; however, high S/C ratios (and thus large quantities of readily available steam) are required to achieve suitably high conversion, which is undesirable for distributed applications. Relatively little attention has been paid to reactor systems that incorporate combined $H_2$ membrane separation and in situ $CO_2$ sorption, with the exception of the work of Harale, et al. [32, 33].

The $CO_2/H_2$ Active Membrane Piston (CHAMP) concept is a variable volume batch-membrane reactor recently proposed for hydrogen production via steam reforming of hydrocarbons [34, 35]. The CHAMP operates in a cycle similar to the Internal Combustion (IC) engine, aiming to dynamically maintain the optimal conditions (pressure, temperature, and residence time) for (1) transport of reactants to the catalyst, (2) reaction kinetics at the catalyst, and (3) selective permeation of $H_2$ through a membrane. In particular, to counteract the effects of fuel depletion and reduction in reactor pressure due to permeation, strategic compression of the CHAMP reactor volume is utilized to increase the concentration of the remaining fuel and hydrogen, thereby providing additional driving force for reaction and permeation. Initial studies of the CHAMP reactor, utilizing methanol as a potential on-vehicle feedstock, demonstrated advantageous performance as compared to a traditional packed-bed continuous flow reactor in terms of the CHAMP's ability to overcome heat and mass transport limitations as well as to match transient $H_2$ product yield with its demand without sacrificing conversion or yield efficiency [34, 35].

The example investigates the use of methane as a feedstock in a CHAMP reactor, and to include selective $CO_2$ sorption to complement the membrane $H_2$ separation as part of the multi-functional fuel processing strategy to further enhance reactor performance. The remaining of this example explores the $H_2$ and $CO_2$ separation requirements to achieve desired conversion of $CH_4$ at low temperature. One of most important findings is that conversion above 90% at a temperature as low as 400° C. and low S/C ratios can only be achieved through a combination of both $H_2$ membrane separation and $CO_2$ removal by sorption. This is in contrast to the previous CHAMP studies involving methanol, where full conversion at low temperatures was possible with a hydrogen membrane alone because the methanol-steam reforming reaction is much less endothermic. In addition, this example describes how the CHAMP concept can be extended to include $CO_2$ sorption into a new reactor design termed CHAMP-SORB. Also the desired sorbent characteristics and their impact on the CHAMP-SORB reactor performance are discussed. Lastly, a thermodynamic framework for calculating the thermal efficiency of the entire CHAMP-SORB cycle. This section also reports the results of the energy efficiency analysis as function of the key process variables (pressure, temperature, S/C ratio, and sorbent mass), including the possibility of regenerative fuel processing to further increase the fuel conversion. The results are summarized in terms of regime maps for CHAMP-SORB operation, which can be effectively used as design tools for the matching the capabilities of the CHAMP-SORB cycle to the desired application requirements.

$CO_2/H_2$ Separation Requirements for Low Temperature SMR

Before considering a specific design of CHAMP class reactor that can achieve low temperature SMR with in situ separation of reaction products, it is useful to first investigate the degree of separation required to achieve high $CH_4$ conversion at low temperature in a general sense (i.e., without consideration of reactor type). During a combined reaction/permeation/adsorption process, the initial number of moles of each species j, $N_j^0$, evolves to a final value $N_j$ according to species conservation:

$$N_j = N_j^0 + (1-r_j)\Sigma_i \varepsilon_i v_{ij} - N_{j,perm} \quad (4)$$

where $r_j$ is the fraction of produced species j that is adsorbed from the gas phase of the reactor, $\varepsilon_i$ is the extent of reaction i, $v_{ij}$ is the stoichiometric coefficient of the $j^{th}$ component of reaction i, and $N_{j,perm}$ is the number of moles of species j that permeates out from the reactor. The parameter $r_j$ is non-zero for $j=CO_2$ only when considering $CO_2$ sorption, while the parameter $N_{j,perm}$ is non-zero for $j=H_2$ only for the case of hydrogen removal through membrane separation.

If the reactions proceed to equilibrium, the reverse methanation, Eq. 5, Example 1, and water gas shift, Eq. 6, Example 1, reactions must satisfy the following constraints:

$$K_1(T) = \frac{y_{H_2}^3 y_{CO}}{y_{CH_4} y_{H_2O}} \cdot \left[\frac{P_{rxn}}{P_{ref}}\right]^2 \quad (5)$$

$$K_2(T) = \frac{y_{H_2} y_{CO_2}}{y_{CO} y_{H_2O}} \quad (6)$$

where the equilibrium constants for reverse methanation ($K_1$) and WGS ($K_2$) are calculated as function of the reaction temperature using empirical correlations [36]. Lastly, if a selectively permeable $H_2$ membrane is present, the final $H_2$ partial pressure in the reactor must be equal to the hydrogen pressure on the permeate side of the membrane ($P_{H_2,perm}$). In the case of no membrane, this constraint reduces to a vanishing rate of $H_2$ permeation, i.e., $$P_{H_2,perm} = y_{H_2} \cdot P_{rxn} \text{ (with membrane)}$$

or $$N_{H_2,perm} = 0 \text{ (without membrane)} \quad (7)$$

Impact of Hydrogen Removal Via Membrane Separation on Equilibrium Conversion

FIG. 2.1 shows the equilibrium $CH_4$ conversion at various pressures as a function of temperature of an initially pure methane-steam mixture with S/C ratio of 2. For cases with a membrane, the $H_2$ partial pressure on the permeate side of the membrane is held constant at 0.2 bar by an inert sweep gas or consumption in an appropriate (electro)chemical device. Without a membrane, reaction temperatures in excess of 700° C. are required to achieve a conversion of greater than 90%, while the same can be achieved at less than 500° C. with a membrane reactor at 5 bar reaction pressure.

It is important to note that without a membrane, conversion decreases with increasing pressure, as is expected from Le Chatelier's principle because an increasing number of moles result from the overall reaction. In contrast, with a membrane conversion increases with increasing pressure because of the additional removal of $H_2$ from the reaction chamber at higher pressures due to increased driving force for permeation across the membrane. This is important because it enables operation at higher pressure to increase the volumetric $H_2$ yield density without hurting the final achievable $CH_4$ conversion. Also when coupled with $CO_2$ adsorption operating at higher pressure with $H_2$ removal enables a higher $CO_2$ partial pressure and thus more favorable conditions for increased quantity of $CO_2$ adsorption.

While increased reaction pressure is always favorable for equilibrium conversion with a membrane, the maximum pressure is limited by the mechanical strength of the membrane; this limit is arbitrarily set to be 5 bar.

At very low temperatures, the conversion without a membrane actually exceeds that of the membrane case. This is an artifact of setting the equilibrium hydrogen partial pressure on the retentate side to a fixed value equal to that of the permeate side. At low temperatures, so little hydrogen is produced by the chemical reactions that in order to satisfy Eq. (7, Example 1), hydrogen from the retentate side must actually permeate into the reactor (i.e., $N_{H_2,perm} < 0$) to achieve equilibrium. The additional back-permeated hydrogen inhibits the equilibrium extent of the reactions and reduces the conversion as compared to the case without a membrane.

Equilibrium Conversion Enhancement with $CO_2$ Sorption

FIG. 2.2 illustrates the supplemental increase in $CH_4$ conversion which can be achieved by incorporating $CO_2$ adsorption. Calculations are made at 5 bar pressure for the case with a membrane and 1 bar without a membrane, because each represents the highest possible conversion without sorption within the pressure range considered. For each case, methane conversion with removal (r) of 50% and 90% of the produced $CO_2$ is plotted. With 90% $CO_2$ removal and $H_2$ separation via membrane, it is possible to achieve 90% $CH_4$ conversion at temperatures below 400° C. In contrast, without a membrane even removing a large fraction of the produced $CO_2$ does not result in conversions close to 90% in the temperature range considered (up to 600° C.).

Comparing the magnitude of conversion enhancement associated with $CO_2$ removal with and without a hydrogen permeable membrane, it is clear there is a synergistic effect in combining $CO_2$ sorption with $H_2$ removal. The use of a hydrogen membrane also appears to have a more significant impact on achievable conversion at a given temperature than $CO_2$ removal; this is to be expected because 3-to-4 molecules of $H_2$ are produced per molecule of $CH_4$ consumed while less than 1 molecule of $CO_2$ is produced (with the exact value of $H_2$ and $CO_2$ production depending on the extent of reverse methanation vs. WGS reaction). A key result of SMR thermodynamic equilibrium analysis is that both a hydrogen permeable membrane and $CO_2$ sorption are required for the CHAMP reactor to achieve a desirable conversion level (>90%) with methane as feedstock at temperatures as low as 400° C.

CHAMP Reactor with $CO_2$ Sorption

The equilibrium calculations for sorption requirements are general and made without consideration for how $CO_2$ is removed from the system or the type of reactor (batch or continuous flow). This section describes a particular embodiment of a modified CHAMP reactor, termed CHAMP-SORB, which can facilitate low temperature hydrogen production via SMR with selective $CO_2$ adsorption incorporated. It also discusses how the sorption isotherm's shape will impact the reactor performance and identifies the most appropriate sorbent option that matches with batch-mode operation of the CHAMP-SORB reactor.

CHAMP-SORB Reactor Process Description

FIG. 2.3 illustrates the steps of the proposed cyclic CHAMP-SORB reactor with $CO_2$ adsorption. In contrast to the basic CHAMP embodiment [34], which utilizes only one intake and one reaction/exhaust stroke, the CHAMP-SORB reactor operates in a four-stroke cycle. Proceeding clockwise from top left in FIG. 2.3a the reactor is first filled with a mixture of $CH_4$ and $H_2O$, as well as recycled products from the previous cycle (if desired). The mixture then undergoes the steam-methane reforming reaction, which is enhanced by permeation of $H_2$ through the membrane and adsorption of $CO_2$. During this step, the piston moves upwards to maintain constant pressure as selected species are removed from the gas phase via adsorption and permeation, and the temperature is maintained by heating the sorbent/catalyst admixture layer (not shown). After the SMR reaction has proceeded sufficiently, the exhaust valve opens and the upstroke is completed to fully exhaust the chamber. As denoted by the dotted line, part or all of the exhaust gases can be recycled to the filling downstroke of the next CHAMP cycle if losses of residual hydrogen and unconverted methane upon exhaust are to be minimized. This recycling has a positive impact on thermal efficiency of the reactor, but can come at a significant cost to volumetric $H_2$ yield density. Once the chamber is exhausted, a second downstroke expands the chamber volume to reduce pressure and to facilitate desorption of $CO_2$, with heat addition to maintain temperature during the endothermic desorption process. Lastly a second upstroke exhausts the desorbed $CO_2$ from the reaction chamber, allowing it to be captured if desired. Note that $CO_2$ may not be fully removed during the desorption step and this sorbent loading will then be carried over to the start of the subsequent cycle.[37]

To model the cyclic performance of the CHAMP-SORB reactor, species conservation is solved at each of the states 1-6 labeled in FIG. 2.3a. It is assumed that the reaction/permeation/adsorption and desorption steps both proceed fully to equilibrium and that sufficient heat is added to maintain isothermal conditions. It is also assumed that the filling processes 6-1-2 is fast enough that no $CO_2$ adsorption/desorption or SMR reaction occurs during this step. Similarly no change in sorbent loading is assumed to occur in the $CO_2$ exhaust step 5-6. Lastly, the system is modeled as if the chamber can be completely exhausted (i.e., neglecting any dead volume) at states 4 and 6 when the piston is fully extended and the top of the sorbent/catalyst admixture layer reaches the membrane; this assumption is valid with a thin layer of sorbent but as the sorbent volume increases the amount of gas contained within the sorbent void fraction may become significant.

In addition to solving the species balance, it is necessary to determine the required heat and work inputs for each step of the process to enable calculation of the overall thermal efficiency as a function of key process variables (temperature, pressure, S/C ratio, sorbent mass and recycle fraction). In doing so it is assumed that all expansion or compression steps are frictionless, quasi-equilibrium processes. The volume expansion during desorption step is assumed to occur slowly enough that the $CO_2$ loading of the sorbent remains in equilibrium with the surrounding gas. Supplementary document S1 details the full set of equations and solution procedure for the species balance at each state 1-6, along with the required heat and boundary work inputs for each process.

Impact of Sorption Isotherm Shape on CHAMP-SORB Performance

Because the sorbent loading from a previous cycle is carried over to the next, the amount of $CO_2$ removed by adsorption during the reaction process 2-3 is equivalent to the amount desorbed during the volume expansion process 4-5. This removed quantity of $CO_2$, $N_{CO_2,des}$, is equal to the mass of sorbent, $m_{sorb}$, multiplied by the difference in mass-based sorbent loading, $q_{CO_2}$, between state 3 (with high loading at "low" reaction temperature $T_3=T_{rxn}$ and "high" adsorption pressure $P_3=P_{ads}$) and state 5 (with low loading at "high" desorption temperature $T_5=T_{des}$ and "low" desorption pressure $P_5=P_{des}$).

$$N_{CO_2,des}=m_{sorb}[q_{CO_2}(T_{rxn},P_{ads})-q_{CO_2}(T_{des},P_{des})] \quad (8)$$

The shape of the adsorption isotherm will then have significant impact on the achievable $CO_2$ removal and the effective sorbent utilization. To illustrate this impact, FIG. 2.2 shows two isotherms with identical saturation capacity at high $CO_2$ pressure and the same slope in the low-pressure Henry's region at a given temperature. The bottom isotherm is a classic Type I Langmuir isotherm while the top isotherm is Type IV by Brunauer classification [38], with two inflection points and a concave up region at moderate pressure which is often used to represent a multi-layer adsorption behavior. To achieve a desired sorbent utilization under isothermal conditions, the pressure in the chamber for the Langmuir isotherm must be brought lower ($P^*_{des}$) than would be required for the sorbent with the Type IV isotherm ($P_{des}$). Alternatively, if the same desorption pressure (e.g., $P_{des}$) were desired for the Langmuir isotherm, combined temperature/pressure swing would have to be utilized ($T_{des}>T_{rxn}$) in order to achieve the same amount of $CO_2$ desorption.

Desorption pressure is critical for the cyclic CHAMP-SORB reactor, which relies on volume expansion alone to achieve the desired pressure swing. As such, the desorbed $CO_2$ remains in the reactor chamber, and the required expansion volume (state 5 in FIG. 2.3a) is related to the $CO_2$ desorption pressure by the ideal gas equation of state:

$$P_{des} = \frac{N_{CO_2,des}RT}{V_5} \quad (9)$$

As the required desorption pressure to achieve a desired sorbent utilization goes to zero, the required desorption volume approaches infinity. For distributed applications where a small footprint is required, a realistic practical limit on the desorption volume is that it matches the maximum volume of the system when filled with fuel at state 2. Comparing the isotherms of FIG. 2.2, a sorbent with a Type IV isotherm is preferred for the batch reactors such CHAMP-SORB because it leads to a less stringent low pressure requirement for adequate desorption than would be required for a Type I isotherm sorbent.

Comparison Between CHAMP-SORB and Traditional SE-SMR with PSA Regeneration

Because the utility of a sorbent is lost when it becomes saturated, sorption-enhanced (SE) reaction processes are inherently transient whether a variable volume batch or fixed bed flow arrangement is used. The traditional approach to SE-SMR employs at least two fixed bed reactor units operating out of phase, with one regenerating while the other is producing hydrogen. When PSA is used for sorbent regeneration, $CO_2$ desorption is accomplished by reducing reactor pressure below that of the reaction/adsorption step, followed by flushing the chamber with a purge gas and then repressurizing with a portion of the $H_2$ product gas. During the purge and repressurization step, the flow is in the reverse direction to that of the reaction/adsorption step to push the $CO_2$ sorbent loading front towards the entrance of the reactor, ensuring that essentially pure $H_2$ product (on a dry basis) occupies the reactor volume at the end of desorption/regeneration phase, which is then pushed out the reactor when the flow direction is again switched and the subsequent reaction step begins [39]. For applications where $CO_2$ sequestration is desired, steam has been proposed as the most suitable purge gas because it can be easily condensed out from the mixture; however it has been shown that an extremely high ratio of purge gas to desorbed $CO_2$ (greater than 60:1) is required to fully regenerate the sorbent [26]. A similar approach using temperature swing adsorption (TSA) at constant pressure as opposed to PSA has been proposed, but it still requires a significant amount of purge steam in a ~6:1 ratio with respect to $H_2$ product [11]. Accounting for the 1 to (3 or 4) ratio of $CO_2$ to $H_2$ produced by the overall SMR reaction, this equates to a roughly 20:1 ratio of purge gas to desorbed $CO_2$. As explained in the introduction section of this paper, this can be problematic for distributed and size-constrained applications where steam may be less readily available and its use would be detrimental from the reaction yield density prospective. Additionally, the energy required to generate steam in the ratios described above can dramatically lower the process energy efficiency.

The CHAMP-SORB offers additional benefits over the traditional SE-SMR process in that it does not require purge gas when desorbing the $CO_2$. Because the catalyst/sorbent admixture only fills a small portion of the reactor, it is possible to exhaust most of the gas by moving the piston to a position corresponding to minimum reactor volume. The purity of the $H_2$ product is ensured by membrane separation, so small amounts of residual $CH_4$, CO, and $CO_2$ carried over to a subsequent cycle are not an issue. The CHAMP-SORB does have a disadvantage, however, in that regeneration of the sorbent is limited by the presence of desorbed $CO_2$ in the reactor chamber. This limitation can be seen in the coupling of Eqs. (8, Example 1) and (Eq. 9, Example 1): as the volume is expanded, more $CO_2$ is desorbed according to the adsorption isotherm, which in turn limits the reduction in chamber pressure associated with the expansion process. Because the desorbed $CO_2$ remains in the chamber it is not possible to fully regenerate the sorbent in the CHAMP-SORB reactor when the reactor volume at the end of the expansion/desorption step, which is capped by the initial volume occupied by the feed gas during the intake step. This is in contrast to a traditional PSA process, where the desorbed $CO_2$ is continuously exhausted from the reactor with a non-adsorbing purge species, and it is possible to fully regenerate the sorbent with sufficient purge gas flow.

The regeneration behavior of the CHAMP-SORB reactor has an interesting impact on the level of mass-based sorbent utilization, defined as the difference in loading between the adsorption and desorption steps and illustrated in FIG. 2.2, as additional sorbent is incorporated in the reactor. If total reactor pressure is sufficiently high, the sorbent loading (per unit mass of sorbent) at the end of the reaction/adsorption step, $q_{CO_2}(T_{rxn}, P_{ads})$, remains nearly constant, regardless of sorbent mass, because the $CO_2$ partial pressure is high enough to fully saturate the sorbent. When the piston is moved to the system's maximum volume state to induce desorption, as more sorbent is present more $CO_2$ will be released into the gas phase according to Eq. (8, Example 1). This in turn means that, as indicated by Eq. (9, Example 1), the $CO_2$ pressure at the end of the desorption step will be higher as more sorbent is added to the reactor. The $CO_2$ desorption pressure and sorbent loading at state 5, $q_{CO_2}(T_{des}, P_{des})$, are linked by the adsorption isotherm, with loading monotonically increasing with pressure regardless of whether the isotherm is Type I or IV. As such, higher $CO_2$ desorption pressure corresponds to higher sorbent loading at the end of the desorption step (less complete desorption per unit mass) and thus lower specific sorbent utilization. There is therefore a diminishing returns associated with increasing the sorbent mass, in that adding more sorbent results in a lower effective working capacity.

Selection of $CO_2$ Sorbent

Having discussed the general impact of the sorption isotherm on the CHAMP-SORB performance, specific high temperature sorbents are now considered to determine the most appropriate option for this application based on the currently available materials as reported in the literature. In addition to the isotherm shape considerations, the sorbent must have sufficient $CO_2$ adsorption capacity at temperatures above 400° C. and selectively adsorb $CO_2$ in presence of other gases, in particular water vapor. The sorbent must also have relatively fast kinetics and cyclic stability over many adsorption/desorption cycles. Several review papers outline the various sorbent options for SMR, including calcium oxides, lithium zirconate and hydrotalcites [40, 41]. Though possessing high $CO_2$ capacity, CaO has poor cyclic stability and is more suited for temperature swing adsorption, requiring high regeneration temperatures. Lithium zirconate similarly is more suited for TSA, and it also suffers from relatively slow kinetics which is not considered in this paper but is an important consideration. Hydrotalcites have lower $CO_2$ capacities than the other options, but they are well suited for PSA and have excellent cyclic stability and adequate kinetics in the 400-600° C. temperature range.

The $CO_2$ adsorption properties of hydrotalcite-like compounds are sensitive to their preparation, in particular the Mg/Al ratio and degree of impregnation with alkali metals such as potassium or cesium carbonate [42]. Because the capacity is specific to the preparation method, many studies have reported variations in sorption capacity and other characteristics [31, 43-47]. Of these, only one measured the sorption isotherm beyond a $CO_2$ pressure of 1 bar, probably because higher $CO_2$ pressures are not relevant to conventional flow-through SMR reactors. However, data in this pressure range is critical for the CHAMP-SORB reactor, which can achieve high $CO_2$ partial pressure conditions as the $CH_4$ and $H_2O$ are depleted by the SMR reaction and $H_2$ is removed from the reaction chamber via membrane permeation. The sorption isotherm reported by Lee et al. contains data up to 3 bar and is of Type IV, owing to a proposed mechanism which combines monolayer adsorption with a multi-layer chemical complexation reaction [44]. Because it contains data at the required high $CO_2$ partial pressures, this isotherm is utilized in the CHAMP-SORB cyclic calculations are provided.

Results and Discussion

As outlined in the introduction, two key performance metrics for a small-scale distributed reactor, such as the CHAMP-SORB, are thermal (energy) efficiency and volumetric yield density. The thermal efficiency calculation is based on the ratio of heating values of the $H_2$ product to the $CH_4$ fuel, with the required heat and work inputs during all stages of the CHAMP-SORB cycle also accounted for (note that all calculations follow a sign convention that the work input is negative):

$$\eta_{th} = \frac{LHV_{H_2} \cdot N_{H_2,perm}}{LHV_{CH_4} \cdot N_{CH_4,1} + \sum Q_{in} - \sum W_{b,out}} \quad (10)$$

The energy required to increase the temperature and pressure of the initial mixture of liquid $H_2O$ and gaseous $CH_4$ from a standard state (25° C., 1 bar) to the elevated reaction temperature and pressure are included in the heat and work components of Eq. (10, Example 1) [48]. The energy penalty associating with generating steam can become a significant factor in the overall thermal efficiency of the process, as the enthalpy of vaporization of one mole of liquid water at STP is ca. 20% of the endothermic heat of the reverse methanation reaction for one mole of $CH_4$ [26]. The hydrogen yield density is defined as the amount of $H_2$ permeated through the membrane in a given cycle divided by the maximum volume of the system. The maximum volume occurs at state 2 in FIG. 2.3a, because the reactor contains the largest amount of gas species at this point (the final volume of the low pressure desorption step is constrained to match this volume). Both the volume of gas and the solid volume of the sorbent are included when determining the maximum volume for the yield density calculation:

$$V_{max} = V_2 = \Sigma_j N_{j,2} v_{j,2}(T_{rxn}, P_{rxn}) + (1-\varepsilon_t) \cdot m_{sorb}/\rho_{sorb} \quad (11)$$

where $\varepsilon_t$ is the total porosity and $\rho_{sorb}$ is the density of the hydrotalcite sorbent taken from Ding and Alpay [43], and $v_{j,2}$ is the specific volume of species j at the reaction (state 2) temperature and pressure.

Two additional metrics that are considered in assessing the CHAMP-SORB performance are hydrogen yield efficiency and $CH_4$ conversion. The yield efficiency is defined as the actual amount of $H_2$ permeated through the reactor divided by the maximum possible $H_2$ yield if all the carbon in the introduced $CH_4$ were oxidized to $CO_2$ (as opposed to some CO), which according to the stoichiometry of Eq. (3, Example 1) is four times the number of moles of $CH_4$ fed. The $CH_4$ conversion is defined in a traditional sense of moles reacted divided by moles fed; however, it is important to note that when part of the exhaust gas mixture from the previous cycle is recycled, the moles of $CH_4$ fed only includes the quantity of new fuel that is added ($N_{CH_4,1}$), not the total moles of fuel present after recycle ($N_{CH_4,2}$). As a result, the general expression for $CH_4$ conversion is:

$$X_{CH_4} = \frac{N_{CH_4,2} - N_{CH_4,3}}{N_{CH_4,1}} \quad (12)$$

CHAMP-SORB Performance without Fuel Recycling

The first case considered is for baseline operation with no exhaust gas recirculation (recycling) from the previous cycle. If this is the case, states 1 and 2 in FIG. 2.3 are identical ($N_{j,1} = N_{j,2}$). FIG. 2.5 is a representative plot that shows how the thermal efficiency, hydrogen yield density, yield efficiency and conversion vary with S/C ratio at a fixed reaction temperature, pressure and mass of sorbent.

As expected from the Le Chatelier's principle, operating with more steam has a favorable impact on $CH_4$ conversion. Conversion monotonically increases with S/C ratio, an effect that is particularly pronounced for S/C ratios less than 3. Yield efficiency, however, trends closely with $CH_4$ conversion at low S/C ratios but reaches a maximum and actually tails off at S/C ratios greater than 4. This is due to a dilution effect of excess steam in the reactor chamber: even as more $H_2$ is produced at higher levels of $CH_4$ conversion, the hydrogen partial pressure is reduced due to an accumulation of non-permeating, non-adsorbing species in the chamber such that the additional $H_2$ cannot permeate out of the reactor. The dilution effect at high S/C ratios has a more pronounced effect on the hydrogen yield density due an extra volume required for additional steam in the feed, with yield density tailing off significantly with additional steam above a S/C ratio of 2. Operating at low S/C ratios, where $H_2O$ becomes the limiting reactant, is also detrimental to yield density. As such, the optimal S/C ratio for hydrogen yield density is approximately 2, which corresponds to the stoichiometry of the combined SMR reaction given by Eq. (3, Example 1).

Determining the optimal S/C ratio for maximum thermal efficiency is not as straightforward as matching the stoichiometry of the combined SMR reaction for maximum yield density. The increase in conversion/yield efficiency with excess steam and the energetic penalty associated with generating steam are competing factors which lead to a maximum thermal efficiency at a S/C ratio of 2.8 for the conditions of FIG. 2.5. Below this optimal S/C ratio, operating with additional steam is favorable because the lower heating value of the extra $H_2$ produced outweighs the extra energy input required. Operating above the optimal S/C ratio, however, yields increasingly less $H_2$ and the energetic cost of vaporizing additional water decreases the overall cycle's thermal efficiency.

Because the CHAMP-SORB reactor thermal efficiency and $H_2$ yield density analysis shows favorable operation at lower S/C ratios than typically found in industrial or sorption-enhanced SMR applications, it is important to consider the potential issue of catalyst deactivation through carbon deposition [49]. Carbon deposition on a catalyst can occur at high temperatures through the endothermic decomposition of methane ($CH_4 \rightleftharpoons C + 2H_2$) and at lower temperatures by the exothermic Boudouard reaction ($2CO \rightleftharpoons C + CO_2$) [50]. Methane decomposition is not likely at the lower CHAMP-SORB operating temperatures, but the possibility of low temperature carbon deposition through the Boudouard reaction is possible and more likely to occur at lower S/C ratios [25]. Snoeck et al. experimentally determined an expression for the "coking threshold" (i.e., the ratio of $CO_2$ to CO concentrations above which the net rate of carbon formation becomes zero) which can be used to determine a critical S/C ratio below which there will be a risk of catalyst deactivation through coking [51]. For the conditions of FIG. 2.5, this coking threshold corresponds to a S/C ratio of 1.75. It can therefore be concluded that it is possible to operate the CHAMP-SORB at S/C ratios low enough to optimize $H_2$ yield density without risking coking of the catalyst. While this result is specific to the conditions of FIG. 2.5, the coking threshold is monitored during all calculations presented in the following sections and is determined to be sufficiently low in all of these cases to not be a limiting factor in optimization.

FIG. 2.6A-C summarize the simultaneous impact of varying the S/C ratio and amount of sorbent on the two key performance metrics, thermal efficiency and hydrogen yield density, at a temperature of 400° C. and pressure of 5 bar. The solid curves in FIG. 2.6A indicate lines of constant sorbent mass (per mole of $CH_4$ fed), while dashed curves are lines of constant S/C ratio. The same trend is seen as in FIG. 2.5, with increasing thermal efficiency and yield density at S/C ratios less than 2, followed by a region of decreasing yield density but increasing thermal efficiency at intermediate S/C ratios, and finally decreasing both the yield density and thermal efficiency at high S/C ratios. It can also be seen in FIG. 2.6A that the S/C ratio corresponding to maximum yield density (marked by circles in the plot) always occurs at or just slightly below 2 regardless of sorbent amount. This is in contrast to the S/C ratio corresponding to maximum thermal efficiency (marked by crosses), which decreases with increasing sorbent amount because the increased capacity to selectively remove $CO_2$ reduces the amount of required excess steam to enhance the conversion. The diminishing returns associated with including additional sorbent, the reasons for which were discussed, can also be seen in FIG. 2.6B and FIG. 2.6C, as increasingly more sorbent is required to provide the same benefit in thermal efficiency and yield density. The thermal efficiency and yield density both increase with additional sorbent at low sorbent levels; however, at very high sorbent amounts (greater than 4 kg/mol $CH_4$), the yield density can actually decrease with increasing sorbent mass. This occurs specifically at low S/C ratios and is due to the fact that the volume occupied by the sorbent becomes significant relative to the volume of gas in the reactor.

For each specific sorbent mass, the point corresponding to maximum thermal efficiency is labeled with an "x" and maximum yield density with an "o." The loci of these points are plotted on FIG. 2.6B and FIG. 2.6C, illustrating the impact of optimizing S/C ratio for thermal efficiency versus hydrogen yield density on each of these parameters, with additional data included beyond 4 kg/mol of sorbent. While FIG. 2.6B shows that thermal efficiency continues to monotonically increase with increasing amount of sorbent, according to FIG. 2.6C hydrogen yield density eventually tails off at high sorbent loadings regardless of whether the S/C ratio is chosen to maximize thermal efficiency or yield density.

CHAMP-SORB Reactor Performance with Fuel Recycling

At the end of the reaction/permeation/adsorption step, the residual gas in the reactor consists of some unreacted $CH_4$ as well as trace CO and unpermeated $H_2$. All of these are valuable, energy-carrying products, and because most of the hydrogen product is already separated from this mixture it is possible to recycle the residual gas from the CHAMP-SORB reactor exhaust to improve fuel utilization. To model this "closed-loop" mode of operation with product recycling, a recycle fraction (f), defined as the percentage of gas at the end of the reaction step that is recycled ($N_{j,2}=N_{j,1}+fN_{j,3}$), is introduced. The recycle fraction can take values between zero (no recycle) and unity (full recycle). In the case of full recycle, the reactor fully converts all $CH_4$ and $H_2O$ introduced and outputs pure $H_2$ during the reaction step and pure $CO_2$ when the chamber is exhausted after the desorption step, resulting in a "closed-loop" operation.

FIG. 2.2 illustrates the impact of increasing the recycle fraction for a CHAMP-SORB cycle at 400° C., 5 bar with a specific sorbent mass of 1 kg/mol $CH_4$ while changing the S/C ratio. The thermal efficiency versus hydrogen yield density curve for f=0 in FIG. 2.2A matches its counterpart in FIG. 2.6A, but as the recycle fraction is increased the curves gradually flatten out. The reason for this flattening is that the impact of lower conversion and hydrogen yield on thermal efficiency penalty at low S/C ratios is "softened" due to recycling of unconverted $CH_4$, as opposed to wasting it by exhausting without recycle. Similarly, the drop off in thermal efficiency at high S/C ratios is less severe with fuel recycling because a portion of the excess steam is carried over from the previous cycle and less energy of vaporization is required to generate new steam. As the regeneration fraction is increased from 0 to 1, the general trend is that thermal efficiency increases while hydrogen yield density decreases due to the added volume occupied by the recycled gas and carried over through the cycle. This tradeoff is further illustrated in FIG. 2.2B, which depicts thermal efficiency and corresponding hydrogen yield density as a function of recycle fraction where at all points the S/C ratio is chosen to optimize efficiency.

When the full amount of residual gas is carried over to the next cycle (i.e., f=1.0), the thermal efficiency becomes a constant value regardless of S/C ratio. This result can be understood by recognizing that the amount of gaseous $CO_2$, CO and $H_2$ must be equal at the beginning and end of the reaction/permeation/adsorption step (states 2 and 3, respectively, in FIG. 2.3A) during cyclic operation because only $CH_4$ and $H_2O$ are added to the reactor from one cycle to the next. To keep the CO quantity constant, the reverse methanation and WGS reactions must proceed to equal extents because carbon monoxide is neither permeated nor adsorbed out from the reaction chamber. As such, the net overall reaction must match that of Eq. (3, Example 1), and therefore all the $CO_2$ and $H_2$ produced must be removed from the gas phase by adsorption and permeation, respectively, for their quantities to remain equivalent from state 2 to 3. Ultimately, this fixes the proportion of permeated $H_2$ to added (new fuel increment) $CH_4$ (4:1) and $H_2O$ (2:1) for each CHAMP-SORB cycle, regardless of the operating S/C ratio after the recycled gas is introduced to the chamber at the start of the reaction/permeation/adsorption step. As a result, the thermal efficiency approaches a fixed value with full regeneration, as the heating value of $CH_4$ along with the heat required to preheat the fuel and maintain isothermal conditions during cyclic operation are always held in fixed proportion relative to the heating value of $H_2$ that is permeated from the reactor.

The reasoning above holds true regardless of sorbent mass, so it is expected that this constant thermal efficiency with full regeneration should remain unchanged with varying sorbent amount at a given reaction temperature and pressure. This is confirmed by the results in FIG. 2.8, which is a regime map of thermal efficiency versus hydrogen yield density for varying the sorbent mass and recycle fraction (with the S/C ratio implicitly varied at each data point to maximize thermal efficiency). The curve for 100% recycle is not plotted because the optimal S/C ratio for maximum thermal efficiency is arbitrary when the efficiency is constant, but the curve for 99.9% shows that the thermal efficiency reaches a constant value equal to that of FIG. 2.2A for all non-zero sorbent amounts.

Moving along lines of constant recycle fraction in FIG. 2.8, an increase in the sorbent amount increases both thermal efficiency and hydrogen yield density until the volume occupied by the sorbent becomes significant relative to the gas volume of the reactor chamber. Beyond this point additional sorbent continues to increase thermal efficiency while hurting yield density, in agreement with previously observed trends. The sorbent mass at which hydrogen yield density is negatively impacted does grow, however, with increasing recycle fraction because the added volume of the recycled gases delays the deleterious effect of solid volume occupied by the sorbent. Another important result of FIG. 2.8 is that the thermal efficiency's benefit of exhaust recycling is only present when there is some non-vanishing amount of sorbent. This is because without a sorbent to perturb the equilibrium state of the recycled gases, there is no conversion enhancement associated with recycling. Therefore, adding an increasing amount of exhaust gas in the absence of a sorbent only serves to decrease the hydrogen yield density while keeping thermal efficiency constant. Lastly, as more sorbent is added to the reactor an increasingly smaller fraction of residual products needs to be recycled in order to achieve the same thermal efficiency, while the associated hydrogen yield density penalty becomes lessened.

CONCLUSIONS

A new class of variable volume batch-membrane reactor with integrated $CO_2$ sorption, termed CHAMP-SORB, is introduced to produce hydrogen from methane feedstock with consideration given to constraints imposed by distributed applications if natural gas is used as a primary source of methane. It is shown that both $H_2$ and $CO_2$ separation is required to be able to achieve desirable conversion levels at temperatures as low as 400° C. with low S/C ratios, which are desirable for greater thermal efficiency and hydrogen yield density. The CHAMP-SORB reactor has advantages over traditional SE-SMR approaches in that it does not require a purge gas for sorbent regeneration and is more scalable to different hydrogen generation demands; however this comes with a constraint on maximum achievable sorbent utilization because the desorbed $CO_2$ remains in the reactor as the volume is expanded rather than is continuously purged as is in the case of continuous flow SE-SME reactors. A "closed-loop" mode of the CHAMP-SORB reactor operation with partial or full recycle of unreacted reaction products with recoverable energy content is introduced, which allows one to maximize thermal efficiency and provides a compelling option for applications involving $CO_2$ capture combined with power ($H_2$) generation.

Regime maps for the reactor quasi-equilibrium operation of the CHAMP-SORB reactor, with and without product recycle, are reported which explore the tradeoff between thermal efficiency and hydrogen yield density at a given temperature and pressure, as a function of sorbent mass, S/C ratio and recycle fraction. The analysis yielded the following fundamental insights and recommendations:

The optimal S/C ratio in the feed that maximizes hydrogen yield density is approximately 2 regardless of sorbent mass. S/C ratios above 2 are desired for maximum thermal efficiency; however, with increasing sorbent mass less excess steam is required for optimal thermal efficiency because of the incremental equilibrium shift provided by the additional $CO_2$ sorption.

There is a diminishing return on sorbent utilization and $CH_4$ conversion enhancement as more sorbent is added due to the nature of sorbent regeneration into a fixed volume environment of the batch reactor without use of an inert carrier gas. Further, initially increasing the sorbent amount increases both thermal efficiency and yield density of the variable-volume batch reactor, but eventually yield density suffers when the fraction of reactor volume occupied by adsorbent becomes significant relative to the gas volume.

Increasing "degree of recycling", i.e., the fraction of unreacted reactants and un-separated products at the end of each cycle that is fed back to the reactor for the next consecutive cycle, increases thermal efficiency of the process up to its maximum at 100% recycling, but there is an associated reduction in hydrogen yield density due to a carry-over volume associated with the recycled, rather than simply exhausted, product stream. Importantly, the improvement in process thermal efficiency is not only due to mitigation of a waste of unreacted fuel especially at low S/C ratios, but also owes to a decrease in the energy input required for extra steam production especially at high S/C ratios when the fuel conversion is intrinsically high.

The thermal efficiency benefit of incorporating recycling is only present when $CO_2$ sorption is incorporated into the CHAMP reactor operation. As more sorbent is added, a lesser degree of recycling is required to achieve a desired level of thermal efficiency, albeit at the expense of simultaneous reduction in hydrogen yield density.

As the recycle fraction approaches unity, the thermal efficiency converges to a constant value, irrespective of either the sorbent mass or post-recycle S/C ratio, because $H_2$ and $CO_2$ are produced in a fixed proportion relative to the consumed $CH_4$ and $H_2O$.

The thermodynamic analysis in this paper shows that CHAMP-SORB cycle is a viable option for low temperature distributed production of hydrogen via sorption-enhanced steam methane reforming, and establishes a thermodynamic envelope for ideal reactor performance. With inclusion of reaction kinetics and heat/mass transfer effects, a comprehensive analytical methodology for the CHAMP-SORB class of reactors should allow determination of practically-relevant performance characteristics, such as hydrogen yield density, reactor throughput and scalability, to further assess the application potential of this new fuel processing approach.

REFERENCES FOR EXAMPLE 1

[1] Paltsev S, Jacoby H D, Reilly J M, Ejaz Q J, Morris J, O'Sullivan F, et al. The future of US natural gas production, use, and trade. Energy Policy. 2011; 39:5309-21.

[2] Kargbo D M, Wilhelm R G, Campbell D J. Natural gas plays in the Marcellus shale: Challenges and potential opportunities. Environ Sci Technol. 2010; 44:5679-84.

[3] Fletcher J, Callaghan V. Evaluation Cost of Distributed Production of Hydrogen from Natural Gas-Independent Review. NREL/BK-150-40382, October; 2006.

[4] Garland N L, Papageorgopoulos D C, Stanford J M. Hydrogen and Fuel Cell Technology: Progress, Challenges, and Future Directions. Energy Procedia. 2012; 28:2-11.

[5] Kelly N A, Gibson T L, Cai M, Spearot J A, Ouwerkerk D B. Development of a renewable hydrogen economy: Optimization of existing technologies. Int J Hydrogen Energy. 2010; 35:892-9.

[6] Rosen M A. Advances in hydrogen production by thermochemical water decomposition: A review. Energy. 2010; 35:1068-76.

[7] Adams B D, Chen A. The role of palladium in a hydrogen economy. Materials Today. 2011; 14:282-9.

[8] Züttel A, Borgschulte A, Schlapbach L. Hydrogen as a future energy carrier: John Wiley & Sons; 2011.

[9] Lattin W C, Utgikar V P. Transition to hydrogen economy in the United States: A 2006 status report. Int J Hydrogen Energy. 2007; 32:3230-7.

[10] Barreto L, Makihira A, Riahi K. The hydrogen economy in the 21st century: a sustainable development scenario. Int J Hydrogen Energy. 2003; 28:267-84.

[11] Lee K B, Beaver M G, Caram H S, Sircar S. Novel thermal-swing sorption-enhanced reaction process concept for hydrogen production by low-temperature steam-methane reforming. Ind Eng Chem Res. 2007; 46:5003-14.

[12] Damm D L, Fedorov A G. Conceptual study of distributed $CO_2$ capture and the sustainable carbon economy. Energy Convers Manage. 2008; 49:1674-83.

[13] Baade W F, Parekh U N, Raman V S. Hydrogen. Kirk-Othmer Encyclopedia of Chemical Technology: John Wiley & Sons, Inc.; 2000.

[14] Rostrup-Nielsen J R. Production of Synthesis Gas. Catal Today. 1993; 18:305-24.

[15] Xu J G, Froment G F. Methane steam reforming, methanation and water-gas shift 1. Intrinsic kinetics. AIChE J. 1989; 35:88-96.

[16] Harrison D P. Sorption-enhanced hydrogen production: A review. Ind Eng Chem Res. 2008; 47:6486-501.
[17] Okada O, Yokoyama K. Development of polymer electrolyte fuel cell cogeneration systems for residential applications. Fuel Cells (Weinheim, Ger). 2001; 1:72-7.
[18] Barelli L, Bidini G, Gallorini F, Servili S. Hydrogen production through sorption-enhanced steam methane reforming and membrane technology: A review. Energy. 2008; 33:554-70.
[19] Ritter J A, Ebner A D. State-of-the-art adsorption and membrane separation processes for hydrogen production in the chemical and petrochemical industries. Separ Sci Technol. 2007; 42:1123-93.
[20] Uemiya S, Sato N, Ando H, Matsuda T, Kikuchi E. Steam reforming of methane in a hydrogen-permeable membrane reactor. Appl Catal. 1991; 67:223-30.
[21] Shu J, Grandjean BPA, Kaliaguine S. Methane steam reforming in asymmetric Pd—Ag and Pd—Ag/porous SS membrane reactors. Appl Catal A-Gen. 1994; 119:305-25.
[22] Marin P, Patino Y, Diez F V, Ordonez S. Modelling of hydrogen perm-selective membrane reactors for catalytic methane steam reforming. Int J Hydrogen Energy. 2012; 37:18433-45.
[23] Saric M, van Delft Y C, Sumbharaju R, Meyer D F, de Groot A. Steam reforming of methane in a bench-scale membrane reactor at realistic working conditions. Catal Today. 2012; 193:74-80.
[24] Hufton J R, Mayorga S, Sircar S. Sorption-enhanced reaction process for hydrogen production. AIChE J. 1999; 45:248-56.
[25] Ding Y, Alpay E. Adsorption-enhanced steam-methane reforming. Chem Eng Sci. 2000; 55:3929-40.
[26] Reijers H T J, Valster-Schiermeier S E A, Cobden P D, van den Brink R W. Hydrotalcite as $CO_2$ sorbent for sorption-enhanced steam reforming of methane. Ind Eng Chem Res. 2005; 45:2522-30.
[27] Lee K B, Beaver M G, Caram H S, Sircar S. Effect of reaction temperature on the performance of thermal swing sorption-enhanced reaction process for simultaneous production of fuel-cell-grade $H_2$ and compressed $CO_2$ from synthesis gas. Ind Eng Chem Res. 2008; 47:6759-64.
[28] Beaver M G, Caram H S, Sircar S. Sorption enhanced reaction process for direct production of fuel-cell grade hydrogen by low temperature catalytic steam-methane reforming. J Power Sources. 2010; 195:1998-2002.
[29] Halabi M H, de Croon M H J M, van der Schaaf J, Cobden P D, Schouten J C. A novel catalyst-sorbent system for an efficient $H_2$ production with in-situ $CO_2$ capture. Int J Hydrogen Energy. 2012; 37:4987-96.
[30] Halabi M H, de Croon M H J M, van der Schaaf J, Cobden P D, Schouten J C. Kinetic and structural requirements for a $CO_2$ adsorbent in sorption enhanced catalytic reforming of methane—Part I: Reaction kinetics and sorbent capacity. Fuel. 2012; 99.
[31] Halabi M H, de Croon M H J M, van der Schaaf J, Cobden P D, Schouten J C. High capacity potassium-promoted hydrotalcite for $CO_2$ capture in $H_2$ production. Int J Hydrogen Energy. 2012; 37.
[32] Harale A, Hwang H T, Liu P K T, Sahimi M, Tsotsis T T. Experimental studies of a hybrid adsorbent-membrane reactor (HAMR) system for hydrogen production. Chem Eng Sci. 2007; 62:4126-37.
[33] Harale A, Hwang H T, Liu P K T, Sahimi M, Tsotsis T T. Design aspects of the cyclic hybrid adsorbent-membrane reactor (HAMR) system for hydrogen production. Chem Eng Sci. 2010; 65:427-35.
[34] Damm D L, Fedorov A G. Comparative assessment of batch reactors for scalable hydrogen production. Ind Eng Chem Res. 2008; 47:4665-74.
[35] Damm D L, Fedorov A G. Batch reactors for hydrogen production: Theoretical analysis and experimental characterization. Ind Eng Chem Res. 2009; 48:5610-23.
[36] Twigg M. Catalyst Handbook Wolfe. New York. 1989.
[37] Marcano J G S, Tsotsis T T. Catalytic membranes and membrane reactors. Weinheim, Germany: Wiley-VCH; 2002.
[38] Brunauer S, Deming L S, Deming W E, Teller E. On a theory of the van der Waals adsorption of gases. J Am Chem Soc. 1940; 62:1723-32.
[39] Carvill B T, Hufton J R, Anand M, Sircar S. Sorption-enhanced reaction process. AIChE J. 1996; 42:2765-72.
[40] Choi S, Drese J H, Jones C W. Adsorbent materials for carbon dioxide capture from large anthropogenic point sources. ChemSusChem. 2009; 2:796-854.
[41] Lee K B, Beaver M G, Caram H S, Sircar S. Reversible chemisorbents for carbon dioxide and their potential applications. Ind Eng Chem Res. 2008; 47.
[42] Oliveira ELG, Grande C A, Rodrigues A E. $CO_2$ sorption on hydrotalcite and alkali-modified (K and Cs) hydrotalcites at high temperatures. Sep Purif Technol. 2008; 62:137-47.
[43] Ding Y, Alpay E. Equilibria and kinetics of $CO_2$ adsorption on hydrotalcite adsorbent. Chem Eng Sci. 2000; 55:3461-74.
[44] Lee K B, Verdooren A, Caram H S, Sircar S. Chemisorption of carbon dioxide on potassium-carbonate-promoted hydrotalcite. J Colloid Interf Sci. 2007; 308:30-9.
[45] Ebner A D, Reynolds S P, Ritter J A. Nonequilibrium kinetic model that describes the reversible adsorption and desorption behavior of $CO_2$ in a K-promoted hydrotalcite-like compound. Ind Eng Chem Res. 2007; 46:1737-44.
[46] Du H, Ebner A D, Ritter J A. Pressure dependence of the nonequilibrium kinetic model that describes the adsorption and desorption behavior of $CO_2$ in K-promoted hydrotalcite like compound. Ind Eng Chem Res. 2010; 50:412-8.
[47] Hutson N D, Attwood B C. High temperature adsorption of $CO_2$ on various hydrotalcite-like compounds. Adsorption. 2008; 14:781-9.
[48] Lutz A E, Bradshaw R W, Keller J O, Witmer D E. Thermodynamic analysis of hydrogen production by steam reforming. Int J Hydrogen Energy. 2003; 28:159-67.
[49] Bartholomew C H. Mechanisms of catalyst deactivation. Appl Catal A-Gen. 2001; 212:17-60.
[50] Rostrup-Nielsen J R, Anderson J, Boudart M. Catalysis science and technology, vol. 5. by J R Anderson and M Boudart, Springer, Berlin. 1984.
[51] Snoeck J W, Froment G F, Fowles M. Steam/$CO_2$ reforming of methane. Carbon filament formation by the boudouard reaction and gasification by $CO_2$, by $H_2$, and by steam: Kinetic study. Ind Eng Chem Res. 2002; 41:4252-65.

Example 2

Although abundant petroleum and coal have enabled the production of affordable primary power and transportation fuels over the past century, the recent emergence of natural gas as a significant fossil fuel resource has dramatically changed the energy landscape.[1] With its favorable hydrogen-to-carbon ratio coupled with recently developed techniques to tap vast reserves that were previously not economically viable, natural gas has been touted by many as a bridge fuel to a low-carbon energy future and as a potential means to minimize dependence on foreign oil for transportation fuel.[2,3] To make full use of this promising resource, new chemical conversion processes that are optimized for natural gas feedstock must be developed. A process that can efficiently produce hydrogen in a small-scale, distributed fashion by steam reforming of natural gas is one such technology that would have a far-reaching impact, as it could eliminate the requirement for a large-scale hydrogen delivery infrastructure and aid the diffusion of hydrogen-powered technology into society.[4,5] Such a process could effectively utilize the existing natural gas distribution infrastructure and would pair well with localized natural gas production from shale gas wells.[1]

Hydrogen production from natural gas feedstock via the steam-methane reforming (SMR) process is a mature industrial technology;[6,7] yet miniaturizing this process for distributed production has proven problematic. Owing to the strongly endothermic nature of the process, reaction temperatures in excess of 900° C. are traditionally employed in large-scale SMR reactors to overcome the thermodynamic limitations of the process. For a distributed reactor system, a maximum operating temperature below 500° C. is desired to improve safety and reduce material cost and preheating energy requirements. Furthermore, in a conventional large-scale fuel processing plant, multiple sequential unit operations are required after the primary reforming reaction step to first convert unwanted CO into $H_2$ through the water gas shift (WGS) reaction, and then purify the $H_2$ product using various separation techniques.[8] In addition to resulting in an excessively large footprint, with decreasing system size the sequential unit operation approach has an increasingly deleterious effect on performance because the relative impact of system losses and cost of balance-of-plant components become more pronounced.[9] Lastly, although the stoichiometry of the overall SMR process only requires a 2:1 molar $H_2O$ to $CH_4$ feed (S/C ratio), industrial SMR processes frequently operate at S/C ratios of between 3-6:1 to enhance $CH_4$ conversion and to minimize catalyst coking.[8] In distributed applications, operating at S/C ratios closer to 2:1 are desired as excess steam is less readily available, is energetically costly, and reduces the volumetric $H_2$ yield density.

Combined reaction-separation approaches are a promising means to overcome the SMR process scale-down limitations.[10-16] By Le Chatelier's principle, in situ removal of $H_2$ and/or $CO_2$ from the reactor shifts equilibrium toward greater fuel conversion and $H_2$ yield, potentially producing a suitable level of conversion at much lower temperature and allowing removal of subsequent WGS and purification unit operations. To this end, this PhD research focuses on the advancement of the $CO_2/H_2$ Active Membrane Piston (CHAMP) variable volume, batch-membrane reactor concept to incorporate selective $CO_2$ adsorption and enable distributed $H_2$ production from natural gas feedstock. The CHAMP reactor, operating in a cycle similar to the Internal Combustion (IC) engine, has proven capable of dynamically maintaining optimal reaction conditions for transport of reactants to the catalyst, reaction kinetics at the catalyst, and $H_2$ membrane separation. Specifically, as fuel is depleted and reactor pressure is reduced due to permeation, strategic compression using the "active" piston is employed to increase the concentration of the remaining fuel and hydrogen, thereby providing additional driving force for reaction and permeation. Because the residence time and thermodynamic state (pressure and temperature) in the variable-volume batch reactor can be actively controlled to allow reaction and separation to proceed at an enhanced rate and to a desired level of completion, the CHAMP offers flexibility for various desired $H_2$ throughputs not possible with traditional large-scale steady-state flow reactors. Previously, theoretical and experimental studies on CHAMP performance were carried out using only $H_2$ separation and with methanol ($CH_3OH$) as feedstock due to its relatively low reaction temperature, which established the fundamental feasibility and promise of the approach.[17,18]

This Example focuses on developing the CHAMP reactor concept further by (1) incorporating $CO_2$ adsorption to complement the $H_2$ membrane separation and (2) reforming $CH_4$ as opposed to $CH_3OH$. This enhanced reactor concept, termed CHAMP-SORB, incorporates sorbent regeneration steps in its operating cycle, thereby preventing eventual saturation of the sorbent and enabling $CH_4$ conversion enhancement for repeated cyclic operation. In particular, the active regeneration steps will deviate from the traditional pressure swing adsorption (PSA) process, as partial pressure of the adsorbed species is reduced by expanding the reactor volume as opposed to purging a fixed bed with an inert sweep gas. This sorbent regeneration method is desirable because it minimizes dilution of $CO_2$ during desorption, making it more energy efficient to capture.

The overarching goal of the proposed work is to develop a practical and scalable method of producing hydrogen at the point of use for fuel cell vehicles and residential power applications. Distributed hydrogen production, also known as forecourt production, is a promising approach to overcome one of the primary barriers to a sustainable hydrogen economy: the present lack of a large-scale hydrogen delivery infrastructure. Because the distribution of hydrogen is both costly and technically challenging, at present roughly 95% of worldwide hydrogen production is captive (i.e., production and usage are collocated).[19] Implementation of efficient, small-scale hydrogen production from methane, the primary component of natural gas, at the point of use would allow application of this captive production strategy for residential co-generation[4,5] and vehicle refueling stations.[20]

Steam-methane reforming (SMR) is the most prevalent large-scale industrial method of $H_2$ production, accounting for 95% of production in the United States.[6,7] The SMR process consists of (1, Example 2) the strongly endothermic reverse methanation reaction, (2, Example 2) the moderately exothermic water gas shift (WGS) reaction, and (3, Example 2) the overall steam methane reforming reaction which is a linear combination of (1, Example 2) and (2, Example 2):

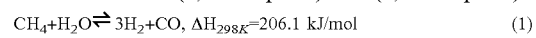
$$CH_4+H_2O \rightleftharpoons 3H_2+CO, \Delta H_{298K}=206.1 \text{ kJ/mol} \tag{1}$$

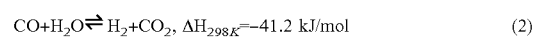
$$CO+H_2O \rightleftharpoons H_2+CO_2, \Delta H_{298K}=-41.2 \text{ kJ/mol} \tag{2}$$

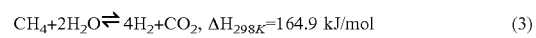
$$CH_4+2H_2O \rightleftharpoons 4H_2+CO_2, \Delta H_{298K}=164.9 \text{ kJ/mol} \tag{3}$$

The three reactions occur in parallel, typically in a packed-bed continuous flow reactor over a nickel catalyst.[21] Because reactions (1, Example 2) and (2, Example 2) are both reversible with opposing heats of reaction (resulting in the forward reaction direction being favored in different temperature ranges), complete conversion of $CH_4$ into $CO_2$ and $H_2$ is not possible at a single operating temperature.[8] As such, large-scale industrial steam reformers utilize an initial reactor stage that operates at approximately 800-900° C. to promote the forward direction of the strongly endothermic reverse methanation reaction, followed by lower temperature reactor(s) with conditions favorable for the exothermic WGS reaction. Excess steam is also employed, often a steam to carbon (S/C) molar ratio ranging between 3:1 and 6:1, to further shift equilibrium of all three reactions towards greater $H_2$ production. Final $H_2$ purification is achieved via pressure swing adsorption or other separation techniques.

With numerous sequential unit operations and the need for high temperature operating conditions, conventional industrial scale SMR is not particularly feasible for localized production of hydrogen from methane at lower (and dynamically variable) throughputs. Such applications place a premium on energy (thermal) efficiency, cost, and minimizing the footprint of the fuel processing strategy.

Reactor Design:

Combined reaction-separation processes are one promising means to meet the aforementioned process requirements for distributed SMR.[22,23] In-process removal of $H_2$ and/or $CO_2$ from the reactor shifts equilibrium toward greater fuel conversion and $H_2$ yield and creates conditions in which a suitable level of conversion is achieved at a reduced temperature and without the need for steam in excess of the stoichiometric 2:1 S/C ratio. Furthermore, the in situ separation of $H_2$ eliminates the need for a separate purification unit by combining this operation within the main reactor. Finally, maintaining an elevated reactor pressure using a variable volume approach allows the driving force for reaction, permeation, and adsorption to be maintained throughout the process. Before designing a specific reactor for low temperature SMR, first the amount of separation required to achieve high $CH_4$ conversion at low temperature can be estimated in a limiting case (i.e., without consideration of reactor type and ignoring heat/mass transfer effects) by solving the following set of species conservation and thermodynamic equilibrium equations:

$$N_j = N_j^0 + (1 - r_1) \sum_i \varepsilon_i v_{ij} - N_{j,perm} \quad (4)$$

$$K_1(T) = \frac{y_{H_2}^3 y_{CO}}{y_{CH_4} y_{H_2O}} \cdot \left[\frac{P_{rxn}}{P_{ref}}\right]^2 \quad (5)$$

$$K_2(T) = \frac{y_{H_2} y_{CO_2}}{y_{CO} y_{H_2O}} \quad (6)$$

$$\left.\begin{array}{l} P_{H_2,perm} = y_{H_2} \cdot P_{tot} \text{(with membrane)} \\ \text{or} \\ N_{H_2,perm} = 0 \text{(without membrane)} \end{array}\right\} \quad (7)$$

Eq. (4, Example 2) represents species conservation during a combined reaction/permeation/adsorption process, where the initial number of moles of each species j, $N_j^0$, evolves to a final value $N_j$. In this equation, $r_j$ represents the fraction of produced species j that is adsorbed from the gas phase, $\varepsilon_i$ is the extent of reaction i, $v_{ij}$ is the stoichiometric coefficient of the $j^{th}$ component of reaction i, and $N_{j,perm}$ (only non-zero for j=$H_2$) represents the number of moles of species j that permeates out of the reactor. Eqs. (5, Example 2) and (6, Example 2) represent the chemical equilibrium constraint for the reverse methanation and WGS reactions, respectively, where the equilibrium constants for reverse methanation ($K_1$) and WGS ($K_2$) are calculated as function of the reaction temperature using empirical correlations.[24] Lastly, if a selectively permeable $H_2$ membrane is present, the final $H_2$ partial pressure in the reactor ($y_{H_2} \cdot P_{tot}$) must be equal to the hydrogen pressure on the permeate side of the membrane ($P_{H_2,perm}$), or in the case of no $H_2$ membrane the amount of $H_2$ permeation becomes zero.

FIG. 3.1A-B show the impact of temperature, pressure, and in situ removal of $H_2/CO_2$ via membrane permeation and adsorption on the equilibrium conversion of a 2:1 ratio of $H_2O:CH_4$. In the case of a membrane, the $H_2$ partial pressure on the permeate side ($P_{H_2,perm}$) is held constant at 0.2 bar by an inert sweep gas or consumption in an appropriate (electro)chemical device.[17] FIG. 3.1A considers conversion without $CO_2$ adsorption and illustrates that without a membrane, reaction temperatures in excess of 700° C. are required to achieve a conversion of greater than 90%. However, the same level of conversion can be achieved at ca. 500° C. with a membrane reactor at 5 bar reaction pressure because of the equilibrium shift due to $H_2$ removal. FIG. 3.1B illustrates that combining 90% $CO_2$ removal with $H_2$ membrane separation, a temperature of only 400° C. is required to achieve 90% $CH_4$ conversion. Furthermore, without an $H_2$ membrane, removing a large fraction of the produced $CO_2$ does not provide much conversion enhancement at all; it is clear there is a synergistic effect in combining $CO_2$ sorption with $H_2$ membrane permeation.

A key takeaway from the SMR thermodynamic equilibrium analysis is that both a hydrogen permeable membrane and $CO_2$ sorption are required for the CHAMP reactor to achieve a desirable SMR conversion level (>90%) at temperatures as low as 400° C. This insight motivates this research proposal to modify the original CHAMP reactor, which only utilized $H_2$ membrane separation, to incorporate $CO_2$ adsorption.

The cyclic CHAMP-SORB reactor, incorporating both an infinitely selective to hydrogen Pd/Ag membrane and $CO_2$ adsorbent material as guided by the preliminary thermodynamic calculations, is depicted in FIGS. 3.1A and B illustrate graphs of the maximum (equilibrium) $CH_4$ conversion achievable for a 2:1 S/C ratio batch of fuel for A) with $H_2$ removal only, and B) with $H_2$ and $CO_2$ removal (r=fraction of $CO_2$ removed from reactor).

FIG. 3.2 illustrates the reactor operates as follows: it is first filled with a mixture of $CH_4$ and $H_2O$, as well as recycled products from the previous cycle (if desired). The mixture then undergoes the SMR reaction, which is enhanced by permeation of $H_2$ through the membrane and adsorption of $CO_2$. Simultaneously, the piston moves upwards to maintain reactor pressure as $H_2$ and $CO_2$ are removed from the gas phase.

After the reaction has proceeded sufficiently, the exhaust valve opens and the upstroke is completed. As denoted by the red dotted line, part or all of the exhaust gases can be recycled to the filling downstroke of the next CHAMP cycle if losses of residual hydrogen and unconverted methane upon exhaust are to be minimized. Once the chamber is exhausted, a second expansion stroke increases the chamber volume to reduce pressure and to facilitate desorption of $CO_2$, with heat addition (not shown) to maintain temperature during the endothermic desorption process. Lastly a second upstroke exhausts the desorbed $CO_2$ from the reaction chamber, allowing it to be captured if desired.

While both packed-bed catalytic $H_2$ membrane reactors[12,13,16,25] and $CO_2$ sorption-enhanced reactors[5,14,15,26-28] have been studied extensively for distributed SMR, relatively little attention has been paid to reactor systems that incorporate combined $H_2$ membrane separation with $CO_2$ sorption. Only the work of Harale, et al.[29,30] considered the combination of both techniques, but it did not utilize a batch process with variable volume to facilitate sorbent regeneration as proposed here.

A series of studies have been conducted thus far to assess the viability of the proposed CHAMP-SORB concept, including thermodynamic analysis, kinetic modeling of an ideal reactor (assuming no transport limitations), and testbed validation of the main components and overall system performance.

Thermodynamic Modeling

The first step in assessing the viability of the proposed CHAMP-SORB reactor is to establish the thermodynamic bounds for its ideal cyclic operation by performing equilibrium calculations at each of the states 1-6 labeled in FIG. 3.1 illustrates a graph of the maximum (equilibrium) $CH^4$ conversion achievable for a 2:1 S/C ratio batch of fuel for a) with H2 removal only, and b) with $H^2$ and $CO^2$ removal (r=fraction of $CO_2$ removed from reactor).

FIG. 3.2 illustrates the assumption that the reaction/permeation/adsorption and desorption steps proceed fully to equilibrium and that sufficient heat is added to maintain isothermal conditions. $K_2CO_3$-promoted hydrotalcite is chosen as the sorbent for use in the model because of its near-infinite selectivity towards $CO_2$ adsorption in the presence of steam, and its ability to adsorb at temperatures up to 520° C.[31-34] Full details of the modeling process can be found in our recently published study,[35] while here only the key findings are summarized.

Two key performance metrics are utilized to evaluate the performance of the CHAMP-SORB reactor during the thermodynamic modeling: thermal energy efficiency ($\eta_{th}$) and volumetric $H_2$ yield density. The thermal efficiency calculation is based on the ratio of lower heating values (LHV) of the $H_2$ product to the $CH_4$ fuel. As shown in Eq. (8, Example 2), the required heat and work inputs during all stages of the CHAMP-SORB cycle are included in the efficiency calculation. Included in this is the energy required to increase the temperature and pressure of the initial mixture of liquid $H_2O$ and gaseous $CH_4$ from a standard state (25° C., 1 bar) to the elevated reaction temperature and pressure.[36] Additionally considered are $CH_4$ conversion as well as $H_2$ yield efficiency (defined as number of moles of $H_2$ permeated divided by the maximum possible $H_2$ yield, or four times the number of initial moles of $CH_4$ according to the reaction stoichiometry).

$$\eta_{th} = \frac{LHV_{H_2} \cdot N_{H_2,perm}}{LHV_{CH_4} \cdot N_{CH_4,1} + \sum Q_{in} - \sum W_{b,out}} \quad (8)$$

FIG. 3.3A illustrates the results of the CHAMP-SORB thermodynamic modeling at a given ratio of sorbent to fuel (in this case 1 kg/initial mol $CH_4$) at 400° C. and 5 bar. Operation at a higher S/C ratio has a favorable impact on $CH_4$ conversion, which monotonically increases with S/C. Yield efficiency, however, trends closely with $CH_4$ conversion at low S/C ratios but actually tails off at high S/C as the extra steam in the reactor lowers the $H_2$ partial pressure, thereby reducing the driving permeation force. $H_2$ yield density is even more strongly impacted by the dilution effect, as the volume required for additional steam in the feed significantly reduces the yield density as S/C ratio increases above 2. A S/C ratio of 2.8 is required to maximize $\eta_{th}$, as the increase in conversion gained through a favorable shift in equilibrium due to excess steam and the energetic required to generate that steam are competing factors. Below the optimal S/C ratio of 2.8, increasing the amount of steam present is favorable because the LHV of the extra $H_2$ produced outweighs the extra energy input required; however, beyond this S/C ratio the additional $H_2$ production is outweighed by the energetic cost of vaporizing additional $H_2O$.

FIG. 3.3B shows the impact of varying sorbent amounts on the overall CHAMP-SORB performance. As more sorbent is added, the required S/C ratio to maximize $\eta_{th}$ and $H_2$ yield density begin to converge (S/C for optimal $\eta_{th}$ decreases from 3.5 to 2.4 with additional sorbent, while the optimal S/C for $H_2$ yield density remains constant at roughly 2).

Ideal Reactor Kinetic Modeling

Having established the thermodynamic viability of the CHAMP-SORB reactor concept, the kinetics of chemical reaction, $CO_2$ adsorption and $H_2$ permeation must next be considered. An ideal reactor model is developed to better understand the chemical timescales governing the key processes. The following simplifications are made: (1) spatially uniform species concentration, (2) isothermal conditions, (3) negligible intra-particle diffusion limitations (i.e. catalyst effectiveness factor[37] of unity), (4) adsorption process can be described by a linear driving force approach,[38,40] and (5) $H_2$ permeation process is diffusion limited and can be modeled by Sievert's law.[39,40] The transient reactor behavior can be modeled using a set of coupled ordinary differential equations (9-12, Example 2) and a relationship for total pressure ($P_{tot}$) from the ideal gas equation of state Eq. (13, Example 2):

$$\frac{dN_j}{dt} = \bar{\rho} A_c d\phi \sum_{i=1}^{3} v_{ij} r_i - \frac{dN_{j,p}}{dt} - \bar{\rho} A_c d(1-\phi) \frac{dq_j}{dt} \quad (9)$$

$$\frac{dN_{H_2,p}}{dt} = A_c \frac{D_{mem}}{\delta} \left( P_{H_2}^{1/2} - P_{H_2,\infty}^{1/2} \right) \quad (10)$$

$$\frac{dq_{CO_2}}{dt} = (\bar{\rho} A_c d)(1-\phi) k_{ldf} \left[ q_{eq} - q_{CO_2} \right] \quad (11)$$

$$\frac{dH}{dt} = \frac{R_u T_{rxn}}{A_c P_{tot}} \sum_{j=1}^{5} \frac{dN_j}{dt} \quad (12)$$

$$P_{tot} = \frac{\sum N_j R_u T_{rxn}}{A_c [H(t) + \bar{\varepsilon} d]} \quad (13)$$

where $dN_j/dt$ is the time-rate of change of each of the 5 species considered ($CH_4$, $H_2O$, $H_2$, $CO_2$, CO), $dN_{j,p}/dt$ is the permeation rate of species j (only non-zero for j=$H_2$), $dq_j/dt$ is the rate of adsorption of species j per unit mass of sorbent (only non-zero for j=$CO_2$), and dH/dt is the piston velocity required to maintain constant pressure. The species generation due to reaction, the first term on the right side of Eq. (9, Example 1), is the product of the mass of the catalyst ([$\bar{\rho} A_c d\phi$], where $\bar{\rho}$ is the sorbent/catalyst mixture density, $A_c$ is the cross sectional area, d is the catalyst/sorbent layer thickness, and $\phi$ is the ratio of catalyst mass to total sorbent and catalyst mass) with the sum over all reactions of the stoichiometric coefficient of each reaction ($v_{ij}$) and the individual reaction rates ($r_i$). Reaction rates are calculated as functions of temperature and species concentration according to the model of Xu and Froment.[21,41]

TABLE 1

| Ideal kinetic model simulation parameters | |
| --- | --- |
| $P_0$ | 5 bar |
| $T_{rxn}$ | 400° C. |
| $A_c$ | 2.41 cm² |
| $H_0$ | 25 mm |
| d | 1 mm |
| $\delta$ | 50 μm |

TABLE 1-continued

Ideal kinetic model
simulation parameters

| | |
|---|---|
| $D_{mem}$ | $5.21 \times 10^{-8} \dfrac{mol}{m \cdot s \cdot bar^{1/2}}$ |
| $P_{H_2,\infty}$ | 0.2 bar |
| $k_{ldf}$ | 3 min$^{-1}$ |

The membrane diffusion coefficient ($D_{mem}$) is taken from experiments conducted by McLeod et al.[42] The linear driving force coefficient for adsorption ($k_{LDF}$) and equilibrium $CO_2$ loading ($q_{eq}$) as a function of temperature and $CO_2$ partial pressure are taken from a study on $K_2CO_3$-promoted hydrotalcite by Lee et al.[33] These values, as well as those of other design parameters (chosen to match the experimental testbed) are listed in Table 1, Example 2. The preliminary purely kinetic modeling aims to both capture the dynamics of the relevant chemical processes and to better understand the impact of catalyst mass fraction, φ. To that end, a series of simulations were performed with varying catalyst mass fraction at a reaction temperature of 400° C. with an initial pressure of 5 bar (absolute) and a 2:1 initial S/C ratio (no other species initially present). The numerical solution was carried out using MATLAB's ode 15s differential equation solver.

FIG. 3.5 demonstrates the impact of catalyst mass fraction on $CH_4$ conversion rates. For a given catalyst/sorbent layer thickness, if the catalyst mass fraction φ is 0.75, the conversion initially is relatively fast due to more catalyst sites available to facilitate the reaction. However, as the reaction progresses there is not enough sorbent capacity to effectively remove $CO_2$ and the conversion reaches an equilibrium value of approximately 72%. Conversely, if there is much more sorbent than catalyst (φ=0.10 or 0.05), the reaction is initially much slower but eventually reaches near full conversion. For the geometry and under the ideal conditions considered here, a catalyst mass fraction of approximately 0.25 best balances the need for catalyst to promote the SMR reaction with sufficient $CO_2$ adsorption capacity.

Experimental Testbed Demonstration

The final aspect of preliminary work conducted to demonstrate the viability of the proposed research is a bench-scale demonstration of the CHAMP-SORB concept. FIG. 3.6 illustrates the experimental apparatus, including a piston-cylinder fuel accumulator to hold and deliver a $CH_4$/steam mixture at the appropriate S/C ratio and a quadrupole mass spectrometer (Hiden HPR-20) to analyze the reactor yield. The accumulator, CHAMP-SORB reactor and all lines/valves in between are thermally insulated and heated with electric resistance heaters to maintain sufficient temperatures above the steam saturation point. The membrane and catalyst/sorbent layer are heated to 400° C., controlled by a Harrick 24V automatic temperature controller. The reactor piston is sealed against the cylinder bore using a perfluoroelastomer o-ring with a maximum temperature of 330° C., necessitating the use of cooling water metered through a rotometer at 1 gallon/hr flowing through stainless steel tubing wrapped around the reactor cylinder to preserve the seal. To obtain a fuel mixture at 5 bar absolute total pressure with the appropriate S/C ratio, the accumulator is first heated to 200° C. and filled with $CH_4$ at 1.66 bar. At this point, the heat tracing on the inlet line ("zone 1") is turned off such that the temperature is approximately 25° C. Next, a precise amount of $H_2O$ (calculated such that 5 bar total pressure will be reached after vaporization) is injected into the accumulator by the syringe pump. Finally, valve C is closed and power is supplied to the zone 1 heater to vaporize the water.

$CO_2$ adsorption on the $K_2CO_3$-promoted hydrotalcite and $H_2$ permeation across the membrane were first characterized to ensure the component sub-processes occur as anticipated. The hydrotalcite sorbent was promoted with 22% by weight $K_2CO_3$ using the incipient wetness procedure[43] and was crushed and sieved to a diameter range of 0.124-0.297 mm to minimize intra-particle diffusion resistance. For adsorption validation, a 0.25 g layer of sorbent is used in the reactor. A 50 μm thick 77% Pd/23% Ag membrane (Alfa Aesar) was activated by heating to 650° C. for 3 hours[44] prior to installation in the reactor. The CHAMP-SORB reactor, initially containing Argon at atmospheric pressure, was filled to approximately 5 bar total pressure with either (a) $H_2$ or (b) $CO_2$ and the pressure decay was recorded to estimate the permeation or adsorption rate. For both sub-process validation experiments, the results are compared to predictions using the ideal kinetics model developed with initial conditions modified to match that of the specific experiment (i.e., 1 bar Ar/4 bar $H_2$ for permeation test, 1 bar Ar/4 bar $CO_2$ for adsorption test).

FIGS. 3.7A and B illustrate a graph the results of the sub-process validation runs and comparison with the kinetics model predictions. FIG. 3.7A illustrates a graph of the reactor is filled with $H_2$ multiple times with repeatable pressure decay results. The kinetics model matches the experimental results well up until the pressure drops below 2 bar, at which point the experimental permeation rate slows down relative to the modeling results. This is most likely due to large transport resistances for $H_2$ in the dead volume in the inlet/outlet valves, where it can take longer for $H_2$ to diffuse to the membrane surface and permeate.

FIG. 3.7B illustrates a graph of the drop in pressure vs. time of the reactor due to $CO_2$ adsorption. The kinetics model of Lee et al.[33] reports a linear driving force coefficient of 3 min$^{-1}$ for this particular adsorbent, however, a coefficient of 1.25 min$^{-1}$ appears to fit the experimental data better. The driving force coefficients are of the same order of magnitude, however, and previous experiments have shown variations in the adsorbent performance based on synthesis method,[45] so some deviation is expected.

In addition to sub-function validation, the full CHAMP-SORB concept has also been experimentally demonstrated. During the CHAMP-SORB reaction, Argon at a flowrate of 200 sccm was swept across the backside of the membrane (controlled by MFC 3 in FIG. 3.6) to carry the permeated $H_2$ to the mass spectrometer for analysis. The Ni-based catalyst (HiFuel 110, Alfa Aesar) was crushed and sieved to a diameter range of 0.124-0.297 mm, a value chosen to eliminate intra-particle diffusion resistance based on results reported in Xu et al.[21] Prior to installation in the CHAMP-SORB reactor, the catalyst was first reduced in packed bed reactor with a continuous flow of pure $H_2$ at 650° C. for 4 hours, per the supplier's instructions. During the reduction process, the effluent of this reducing reactor was monitored for $H_2O$ content using the mass spectrometer to confirm that nickel oxide on the surface was properly reduced to active Ni. A catalyst mass of 0.1 g was loaded in the reactor, along with 0.25 g of sorbent.

The following test procedure was followed using the setup illustrated in FIG. 3.6 to generate the experimental data shown FIG. 3.8:

(1) Valves E, G and H were opened and the piston was moved to minimum volume as 15 sccm of Helium flows through the reactor to purge the system.
(2) Accumulator piston was moved by the displacement required to allow final pressure to reach 5 bar.
(3) Valves E and H were closed and valve D was opened to send fuel to the CHAMP-SORB reactor.
(4) The reactor piston was moved to maximum volume and the inlet valve G was closed, isolating the system.
(5) As reaction/adsorption/permeation process occurred, the piston was moved downward to maintain constant pressure using closed loop feedback, and the mass spectrometer measured hydrogen production rate; simultaneously, valve D was closed and valves E & F were opened to purge the feed line with He.
(6) Valve H was slowly opened to send remaining contents inside the reactor to the mass spectrometer.
(7) Valve G was opened to send 15 sccm of purge He to flush out remaining reactor contents.

The corresponding steps from the test procedure are marked on FIG. 3.8 at the time at which they occur. The top plot of FIG. 3.8 shows the ratio of a given gas species detected by the mass spectrometer relative to the Argon signal. During step (5), only $H_2$ was detected by the mass spectrometer because the reactor outlet valve was closed and only hydrogen can permeate across the membrane. When the outlet valve was opened, the mixture content of the reactor was sent to the mass spectrometer, providing a snapshot of the reactor contents at the end of the experiment. In the experiment shown, the reactor contained predominately $CO_2$, combined with some unreached $CH_4/H_2O$ and non-permeated $H_2$.

The pressure and position curves in FIG. 3.8 illustrate a graph of the illustrate one of the experimental limitations of the CHAMP-SORB testbed: presence of a substantial dead volume occupied by the inlet/outlet valves. The closed-loop PID control, implemented using Labview and a Newmark NLS4-series linear actuator, can reliably maintain the pressure at 5 bar for the first half of step (5), at which point the piston reached its minimum displacement. The system volume is non-zero at this point, however, because of the valve volume. From this point onward, the pressure drops in the system as $H_2$ continues to permeate out of the reactor and no further compression can be applied. The dead volume of the reactor was characterized at room temperature by measuring the change in pressure as a function of piston position; using this data and the ideal gas equation of state, the dead volume is calculated to be 3.97 cm$^3$ out of a total maximum volume of 8.79 cm$^3$. The ideal kinetic model is modified to include this dead volume and used to compare with experimental results for molar $H_2$ yield rate, reactor pressure, and piston position.

The comparison between simulation and experimental results are summarized in FIGS. 3.9A-C, which illustrate a graph of the experimental $H_2$ yield rate is determined using mass spec calibration curves obtained prior to the full CHAMP-SORB test. Overall, the model performs remarkably well (considering its minimal use of any empirical parameters) in describing the complex CHAMP-SORB reaction/permeation/adsorption process. The piston does reach its minimum volume position earlier in the experiment than is predicted by the model; however, this is likely due to a slow leak that was observed in the reactor (on average 0.2 bar/min with no reaction or permeation).

The final part of the preliminary experimental work is a demonstration of the impact of $CO_2$ adsorption on the CHAMP-SORB performance. FIGS. 3.7A and B illustrate a graph of the CHAMP-SORB sub-process experiments for A) $H_2$ permeation and B) $CO_2$ adsorption.

FIG. 3.8 illustrates a graph of the CHAMP-SORB experimental results.

FIGS. 3.9A-C illustrate graphs of the comparison of experimental data to ideal kinetic model results for A) $H_2$ molar yield rate, B) reactor pressure and C) reactor height variation with time.

FIGS. 3.10A and 3.10B show the comparison between (A) a fully functioning sorbent and (B) a sorbent not properly promoted with $K_2CO_3$ that has essentially zero $CO_2$ capacity. The insets of these figures show in more detail the relative quantities of the species present at the end of the cycle. Note that FIGS. 3.7A and B illustrate graphs of the CHAMP-SORB sub-process experiments for A) $H_2$ permeation and B) $CO_2$ adsorption.

FIG. 3.8 illustrates a graph of the CHAMP-SORB experimental results.

FIG. 3.9A-C illustrate a graph of the comparison of experimental data to ideal kinetic model results for A) H2 molar yield rate, B) reactor pressure and C) reactor height variation with time.

FIGS. 3.10A and B illustrate a graph of showing essentially no $H_2$ can be detected by the mass spec as permeated during the reaction process, and at the end of the cycle (around 220 sec), mostly $CH_4$ and $H_2O$ are present in the exhausted reactor mixture, with the next highest amount of species being actually CO rather than $CO_2$. In the case of the functioning sorbent, there is minimal CO present in the reactor at the end of the cycle, indicating that the sorbent is effectively promoting the WGS reaction, Eq. (2, Example 2), in the forward direction.

REFERENCES FOR EXAMPLE 2

1. Rao V. Shale Gas, The Promise and the Peril: RTI Press; 2012.
2. Paltsev S, Jacoby H D, Reilly J M, et al. The future of US natural gas production, use, and trade. *Energy Policy.* 2011; 39(9):5309-5321.
3. Kargbo D M, Wilhelm R G, Campbell D J. Natural gas plays in the Marcellus shale: Challenges and potential opportunities. *Environ Sci Technol.* 2010; 44(15):5679-5684.
4. Barreto L, Makihira A, Riahi K. The hydrogen economy in the 21st century: a sustainable development scenario. *Int J Hydrogen Energy.* March 2003; 28(3):267-284.
5. Lee K B, Beaver M G, Caram H S, Sircar S. Novel thermal-swing sorption-enhanced reaction process concept for hydrogen production by low-temperature steam-methane reforming. *Ind Eng Chem Res.* 2007/07/01 2007; 46(14):5003-5014.
6. Baade W F, Parekh U N, Raman V S. Hydrogen. *Kirk-Othmer Encyclopedia of Chemical Technology*: John Wiley & Sons, Inc.; 2000.
7. Rostrup-Nielsen J R. Production of Synthesis Gas. *Catal Today.* Dec. 31, 1993; 18(4):305-324.
8. Harrison D P. Sorption-enhanced hydrogen production: A review. *Ind Eng Chem Res.* September 2008; 47(17): 6486-6501.
9. Varady M J, Fedorov A G. Fuel reformation and hydrogen generation with direct droplet impingement reactors: model formulation and validation. *Ind Eng Chem Res.* 2011; 50(16):9502-9513.
10. Ding Y, Alpay E. Adsorption-enhanced steam-methane reforming. *Chem Eng Sci.* September 2000; 55(18):3929-3940.

11. Hufton J R, Mayorga S, Sircar S. Sorption-enhanced reaction process for hydrogen production. *AIChE J.* February 1999; 45(2):248-256.
12. Saric M, van Delft Y C, Sumbharaju R, Meyer D F, de Groot A. Steam reforming of methane in a bench-scale membrane reactor at realistic working conditions. *Catal Today*. Oct. 15 2012; 193(1):74-80.
13. Marin P, Patino Y, Diez F V, Ordonez S. Modelling of hydrogen perm-selective membrane reactors for catalytic methane steam reforming. *Int J Hydrogen Energy*. December 2012; 37(23):18433-18445.
14. Halabi M H, de Croon M H J M, van der Schaaf J, Cobden P D, Schouten J C. A novel catalyst-sorbent system for an efficient $H_2$ production with in-situ $CO_2$ capture. *Int J Hydrogen Energy*. March 2012; 37(6):4987-4996.
15. Halabi M H, de Croon M H J M, van der Schaaf J, Cobden P D, Schouten J C. Kinetic and structural requirements for a $CO_2$ adsorbent in sorption enhanced catalytic reforming of methane—Part I: Reaction kinetics and sorbent capacity. *Fuel*. September 2012; 99.
16. Shu J, Grandjean B P A, Kaliaguine S. Methane steam reforming in asymmetric Pd—Ag and Pd—Ag/porous S S membrane reactors. *Appl Catal A-Gen*. Nov. 24, 1994; 119(2):305-325.
17. Damm D L, Fedorov A G. Batch reactors for hydrogen production: Theoretical analysis and experimental characterization. *Ind Eng Chem Res*. Jun. 17 2009; 48(12):5610-5623.
18. Damm D L, Fedorov A G. Comparative assessment of batch reactors for scalable hydrogen production. *Ind Eng Chem Res*. Jul. 16, 2008; 47(14):4665-4674.
19. Lattin W C, Utgikar V P. Transition to hydrogen economy in the United States: A 2006 status report. *Int J Hydrogen Energy*. October 2007; 32(15):3230-3237.
20. Damm D L, Fedorov A G. Conceptual study of distributed $CO_2$ capture and the sustainable carbon economy. *Energy Convers Manage*. June 2008; 49(6):1674-1683.
21. Xu J G, Froment G F. Methane steam reforming, methanation and water-gas shift 1. Intrinsic kinetics. *AIChE J*. January 1989; 35(1):88-96.
22. Barelli L, Bidini G, Gallorini F, Servili S. Hydrogen production through sorption-enhanced steam methane reforming and membrane technology: A review. *Energy*. April 2008; 33(4):554-570.
23. Ritter J A, Ebner A D. State-of-the-art adsorption and membrane separation processes for hydrogen production in the chemical and petrochemical industries. *Separ Sci Technol*. 2007/04/01 2007; 42(6):1123-1193.
24. Twigg M. Catalyst Handbook Wolfe. New York. 1989.
25. Uemiya S, Sato N, Ando H, Matsuda T, Kikuchi E. Steam reforming of methane in a hydrogen-permeable membrane reactor. *Appl Catal*. Jan. 3, 1991; 67(2):223-230.
26. Lee K B, Beaver M G, Caram H S, Sircar S. Effect of reaction temperature on the performance of thermal swing sorption-enhanced reaction process for simultaneous production of fuel-cell-grade $H_2$ and compressed $CO_2$ from synthesis gas. *Ind Eng Chem Res*. 2008/09/03 2008; 47(17):6759-6764.
27. Beaver M G, Caram H S, Sircar S. Sorption enhanced reaction process for direct production of fuel-cell grade hydrogen by low temperature catalytic steam-methane reforming. *J Power Sources*. Apr. 2 2010; 195(7):1998-2002.
28. Halabi M H, de Croon M H J M, van der Schaaf J, Cobden P D, Schouten J C. High capacity potassium-promoted hydrotalcite for $CO_2$ capture in $H_2$ production. *Int J Hydrogen Energy*. March 2012; 37(5).
29. Harale A, Hwang H T, Liu P K T, Sahimi M, Tsotsis T T. Experimental studies of a hybrid adsorbent-membrane reactor (HAMR) system for hydrogen production. *Chem Eng Sci*. 8//2007; 62(15):4126-4137.
30. Harale A, Hwang H T, Liu P K T, Sahimi M, Tsotsis T T. Design aspects of the cyclic hybrid adsorbent-membrane reactor (HAMR) system for hydrogen production. *Chem Eng Sci*. Jan. 1, 2010; 65(1):427-435.
31. Ding Y, Alpay E. Equilibria and kinetics of $CO_2$ adsorption on hydrotalcite adsorbent. *Chem Eng Sci*. September 2000; 55(17):3461-3474.
32. Ding Y, Alpay E. High Temperature Recovery of CO2 from Flue Gases Using Hydrotalcite Adsorbent. *Process Safety and Environmental Protection*. 1//2001; 79(1):45-51.
33. Lee K B, Verdooren A, Caram H S, Sircar S. Chemisorption of carbon dioxide on potassium-carbonate-promoted hydrotalcite. *J Colloid Interf Sci*. April 2007; 308(1):30-39.
34. Hutson N D, Attwood B C. High temperature adsorption of $CO_2$ on various hydrotalcite-like compounds. *Adsorption*. December 2008; 14(6):781-789.
35. Anderson D M, Kottke P A, Fedorov A G. Thermodynamic analysis of hydrogen production via sorption-enhanced steam methane reforming in a new class of variable volume batch-membrane reactor. *Int J Hydrogen Energy*. Oct. 22, 2014; 39(31):17985-17997.
36. Lutz A E, Bradshaw R W, Keller J O, Witmer D E. Thermodynamic analysis of hydrogen production by steam reforming. *Int J Hydrogen Energy*. February 2003; 28(2):159-167.
37. Rawlings J B, Ekerdt J G. *Chemical reactor analysis and design fundamentals*: Nob Hill Pub, Llc; 2002.
38. Sircar S, Hufton J R. Why does the Linear Driving Force model for adsorption kinetics work? *Adsorption*. January 2000; 6(2):137-147.
39. Sieverts A. Palladium and Hydrogen I. *Z Phys. Chem.* 1914; 88:103-127.
40. Sieverts A. Palladium and hydrogen. II. *Zeitschrift fur Physicalische Chemie*. 1914; 88(451-78):121-122.
41. Xu J G, Froment G F. METHANE STEAM REFORMING 0.2. DIFFUSIONAL LIMITATIONS AND REACTOR SIMULATION. *AIChE J*. January 1989; 35(1):97-103.
42. McLeod L, Degertekin F, Fedorov A. Effect of microstructure on hydrogen permeation through thermally stable, sputtered palladium-silver alloy membranes. *Appl. Phys. Lett*. 2007; 90(26):261905-261905-261903.
43. Walspurger S, Boels L, Cobden P D, Elzinga G D, Haije W G, van den Brink R W. The Crucial Role of the K+-Aluminium Oxide Interaction in K+-Promoted Alumina-and Hydrotalcite-Based Materials for CO2 Sorption at High Temperatures. *ChemSusChem*. 2008; 1(7):643-650.
44. Jewett D, Makrides A. Diffusion of hydrogen through palladium and palladium-silver alloys. *Trans. Faraday Soc.* 1965; 61:932-939.
45. Ebner A D, Reynolds S P, Ritter J A. Understanding the Adsorption and Desorption Behavior of CO2 on a K-Promoted Hydrotalcite-like Compound (HTlc) through Non-equilibrium Dynamic Isotherms. *Ind Eng Chem Res*. 2006/08/01 2006; 45(18):6387-6392.
46. Damm D L, Fedorov A G. Local thermal non-equilibrium effects in porous electrodes of the hydrogen-fueled SOFC. *J Power Sources*. 2006; 159(2):1153-1157.

47. Hines A, Maddox R. Mass transfer: fundamentals and applications. 1985. New Jersey: PTR Prentice-Hall Incorporated.
48. Deen W M. *Analysis of Transport Phenomena* (*Topics in Chemical Engineering*). Vol 3: Oxford University Press, New York; 1998.
49. Bird R B, Stewart W E, Lightfoot E N. *Transport phenomena*: John Wiley & Sons; 2007.
50. Patankar S. *Numerical heat transfer and fluid flow*: CRC Press; 1980.
51. Pletcher R H, Tannehill J C, Anderson D. *Computational fluid mechanics and heat transfer*: CRC Press; 2012.
52. Parks G B, R. Cornish, J. and Remick R. Hydrogen Station Compression, Storage, and Dispensing Technical Status and Costs. In: Laboratory NRE, ed2014.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A variable volume reactor, comprising:
   a reactor chamber adapted to receive a fuel and a gas in a free volume of the reactor chamber;
   a structure disposed within the reactor chamber, the structure comprising a catalyst selected to assist a reaction of the fuel and the gas and one or more $H_2$ permeable membrane structures, each $H_2$ permeable membrane structure formed as a hollow tube; and
   an active piston movable within the reactor chamber that changes the free volume of the reactor chamber, the free volume being the space between the active piston and the structure, the active piston comprising a sorbent material selected to achieve $CO_2$ adsorption;
   wherein the variable volume reactor is configured so that products, $CO_2$ and $H_2$, are formed due to the reaction of the fuel, wherein the $CO_2$ is adsorbed by the sorbent material, and the $H_2$ permeates through the $H_2$ permeable membrane to outside the variable volume reactor, and wherein the active piston is moveable within the reactor chamber such that:
   a first movement of the active piston decreases the free volume and increases $H_2$ partial pressure in the free volume, which causes an increase of the rate of reaction and hydrogen permeation through $H_2$ membrane, and
   a second movement of the active piston increases the free volume and decreases the partial pressure of $CO_2$ in the variable volume reactor, which causes the $CO_2$ to desorb from the sorbent material, and
   a third movement of the active piston decreases the free volume to remove the $CO_2$ out of the variable volume reactor using an open exhaust valve.

2. A variable volume reactor, comprising:
   a reactor chamber adapted to receive a fuel and a gas in a free volume of the reactor chamber;
   a structure disposed within the reactor chamber, the structure comprising a catalyst layer, a sorbent material layer, and an $CO_2$ permeable membrane disposed between the catalyst layer and the sorbent material layer, the catalyst selected to assist a reaction of the fuel and the gas, and the sorbent material selected to achieve $CO_2$ adsorption;
   an active piston movable within the reactor chamber that changes the free volume of the reactor chamber, the free volume being the space between the active piston and the structure, the piston comprising an $H_2$ permeable membrane; and
   wherein the variable volume reactor is configured so that products, $CO_2$ and $H_2$, are formed due to the reaction of the fuel, wherein the $CO_2$ is adsorbed by the sorbent material, and the $H_2$ permeates through the $H_2$ permeable membrane to outside the variable volume reactor, and wherein the active piston is moveable within the reactor chamber such that:
   a first movement of the active piston decreases the free volume and increases $H_2$ partial pressure in the free volume, which causes an increase of the rate of reaction and hydrogen permeation through $H_2$ membrane, and
   a second movement of the active piston increases the free volume and decreases the partial pressure of $CO_2$ in the variable volume reactor, which causes the $CO_2$ to desorb from the sorbent material, and
   a third movement of the active piston decreases the free volume to remove the $CO_2$ out of the variable volume reactor using an open exhaust valve.

* * * * *